US011764887B2

(12) United States Patent
Sudo

(10) Patent No.: US 11,764,887 B2
(45) Date of Patent: Sep. 19, 2023

(54) WIRELESS COMMUNICATION DEVICE AND NOTIFICATION METHOD

(71) Applicant: Panasonic Corporation, Osaka (JP)

(72) Inventor: Hiroaki Sudo, Kanagawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 40 days.

(21) Appl. No.: 17/636,414

(22) PCT Filed: Aug. 21, 2020

(86) PCT No.: PCT/JP2020/031596
§ 371 (c)(1),
(2) Date: Feb. 18, 2022

(87) PCT Pub. No.: WO2021/033762
PCT Pub. Date: Feb. 25, 2021

(65) Prior Publication Data
US 2022/0286217 A1   Sep. 8, 2022

(30) Foreign Application Priority Data

Aug. 22, 2019  (JP) ................................. 2019-152013
Nov. 11, 2019  (JP) ................................. 2019-204190

(51) Int. Cl.
*H04B 17/345* (2015.01)
*H04B 7/15* (2006.01)
(52) U.S. Cl.
CPC ............. *H04B 17/345* (2015.01); *H04B 7/15* (2013.01)
(58) Field of Classification Search
None
See application file for complete search history.

(56) References Cited

U.S. PATENT DOCUMENTS

| 2008/0070510 A1* | 3/2008 | Doppler ............... H04B 17/345 455/69 |
| 2014/0153418 A1* | 6/2014 | Hariharan ............ H04W 24/10 370/252 |

(Continued)

FOREIGN PATENT DOCUMENTS

JP   2013-081089 A   5/2013

OTHER PUBLICATIONS

International Search Report issued in Patent Application No. PCTIJP2020/031596 dated Nov. 10, 2020.

*Primary Examiner* — Anh Vu H Ly
(74) *Attorney, Agent, or Firm* — PEARNE & GORDON LLP

(57) ABSTRACT

A wireless communication device that supports a first wireless communication system and belongs to a first network to perform relay operation therein, the device including: a reception unit that receives first notification information from downstream side of the wireless communication device; an interference classification unit that classifies interference detected in a plurality of channels into first interference of the wireless communication device that supports a first wireless communication system and belongs to a first network or second interference that is different from the first interference; a control unit that generates second notification information including at least one of information on the first interference and information on the second interference on the basis of the first notification information and the interference classification result; and a transmission unit that transmits the second information to the upstream side.

15 Claims, 53 Drawing Sheets

(56) References Cited

U.S. PATENT DOCUMENTS

| | | | |
|---|---|---|---|
| 2017/0201895 A1* | 7/2017 | Hassan | H04L 67/303 |
| 2019/0020521 A1* | 1/2019 | Finkelstein | H04L 5/0062 |
| 2019/0296838 A1* | 9/2019 | Hessler | H04L 1/0026 |
| 2019/0335336 A1* | 10/2019 | Cimpu | H04W 28/16 |
| 2021/0258988 A1* | 8/2021 | Balakrishnan | H04W 72/1263 |
| 2022/0174530 A1* | 6/2022 | Sudo | H04W 16/14 |
| 2022/0322129 A1* | 10/2022 | Gejoh | H04W 16/14 |

* cited by examiner

FIG. 14

| NOTIFICATION INFORMATION ON CHANNEL #1 | NOTIFICATION INFORMATION ON CHANNEL #2 | ... | NOTIFICATION INFORMATION ON CHANNEL #n |

Expansion of one channel's notification information:

| CONTROLLABLE INTERFERENCE INFORMATION (MEAN OF GW AND RELAY NODES) | UNCONTROLLABLE INTERFERENCE INFORMATION (MINIMUM VALUE AMONG GW AND RELAY NODES) | UNCONTROLLABLE INTERFERENCE INFORMATION (SECOND LOWEST VALUE AMONG GW AND RELAY NODES) | ... | UNCONTROLLABLE INTERFERENCE INFORMATION (J-th LOWEST VALUE AMONG GW AND RELAY NODES) |

FIG. 15

| NOTIFICATION INFORMATION ON CHANNEL #1 | NOTIFICATION INFORMATION ON CHANNEL #2 | ... | NOTIFICATION INFORMATION ON CHANNEL #n |

Expansion of one channel's notification information:

| CONTROLLABLE INTERFERENCE INFORMATION (MEAN OF A PLURALITY OF NODES) | UNCONTROLLABLE INTERFERENCE INFORMATION (MINIMUM VALUE AMONG A PLURALITY OF NODES) | UNCONTROLLABLE INTERFERENCE INFORMATION (SECOND LOWEST VALUE AMONG A PLURALITY OF NODES) | ... | UNCONTROLLABLE INTERFERENCE INFORMATION (J-th LOWEST VALUE AMONG A PLURALITY OF NODES) |

FIG. 22

| NOTIFICATION INFORMATION ON CHANNEL #1 | NOTIFICATION INFORMATION ON CHANNEL #2 | ... | NOTIFICATION INFORMATION ON CHANNEL #n |
|---|---|---|---|

| CONTROLLABLE INTERFERENCE INFORMATION (MEAN OF GW AND RELAY NODES) | UNCONTROLLABLE INTERFERENCE INFORMATION #A (INTERFERENCE AMOUNT < GW AND NUMBER OF RELAY NODES SERVING AS THRESHOLD) | UNCONTROLLABLE INTERFERENCE INFORMATION #B (INTERFERENCE AMOUNTS OF SPECIFIC GW AND SPECIFIC RELAY NODE) |
|---|---|---|

FIG. 23

| NOTIFICATION INFORMATION ON CHANNEL #1 | NOTIFICATION INFORMATION ON CHANNEL #2 | ... | NOTIFICATION INFORMATION ON CHANNEL #n |
|---|---|---|---|

| CONTROLLABLE INTERFERENCE INFORMATION (MEAN OF A PLURALITY OF NODES) | UNCONTROLLABLE INTERFERENCE INFORMATION #A (INTERFERENCE AMOUNT < NUMBER OF RELAY NODES SERVING AS THRESHOLD) | UNCONTROLLABLE INTERFERENCE INFORMATION #B (INTERFERENCE AMOUNT OF SPECIFIC RELAY NODE) |
|---|---|---|

FIELDS FOR NOTIFICATION INFORMATION ON FIRST SPECIFIC CHANNEL

| CONTROLLABLE INTERFERENCE INFORMATION (MEAN OF GW AND RELAY NODES) | UNCONTROLLABLE INTERFERENCE INFORMATION #A (INTERFERENCE AMOUNT < GW AND NUMBER OF RELAY NODES SERVING AS THRESHOLD) | UNCONTROLLABLE INTERFERENCE INFORMATION #B (INTERFERENCE AMOUNTS OF SPECIFIC GW AND SPECIFIC RELAY NODE) |
|---|---|---|

FIELDS FOR NOTIFICATION INFORMATION ON SECOND SPECIFIC CHANNEL

| CONTROLLABLE INTERFERENCE INFORMATION (MEAN OF GW AND RELAY NODES) | UNCONTROLLABLE INTERFERENCE INFORMATION (GW) | UNCONTROLLABLE INTERFERENCE INFORMATION (RELAY NODE #1) | UNCONTROLLABLE INTERFERENCE INFORMATION (RELAY NODE #2) | ... | UNCONTROLLABLE INTERFERENCE INFORMATION (RELAY NODE #Z) |
|---|---|---|---|---|---|

FIELDS FOR NOTIFICATION INFORMATION ON NORMAL CHANNEL

| CONTROLLABLE INTERFERENCE INFORMATION (MEAN OF GW AND RELAY NODES) | UNCONTROLLABLE INTERFERENCE INFORMATION (INTERFERENCE AMOUNT < GW AND NUMBER OF RELAY NODES SERVING AS THRESHOLD) |
|---|---|

FIG. 25

FIELDS FOR NOTIFICATION INFORMATION ON FIRST SPECIFIC CHANNEL

| CONTROLLABLE INTERFERENCE INFORMATION (MEAN OF RELAY NODES) | UNCONTROLLABLE INTERFERENCE INFORMATION #A (INTERFERENCE AMOUNT < NUMBER OF RELAY NODES SERVING AS THRESHOLD) | UNCONTROLLABLE INTERFERENCE INFORMATION #B (INTERFERENCE AMOUNT OF SPECIFIC RELAY NODE) |
|---|---|---|

FIELDS FOR NOTIFICATION INFORMATION ON SECOND SPECIFIC CHANNEL

| CONTROLLABLE INTERFERENCE INFORMATION (MEAN OF RELAY NODES) | UNCONTROLLABLE INTERFERENCE INFORMATION (RELAY NODE #1) | UNCONTROLLABLE INTERFERENCE INFORMATION (RELAY NODE #2) | ... | UNCONTROLLABLE INTERFERENCE INFORMATION (RELAY NODE #Y) |
|---|---|---|---|---|

FIELDS FOR NOTIFICATION INFORMATION ON NORMAL CHANNEL

| CONTROLLABLE INTERFERENCE INFORMATION (MEAN OF RELAY NODES) | UNCONTROLLABLE INTERFERENCE INFORMATION (INTERFERENCE AMOUNT < NUMBER OF RELAY NODES SERVING AS THRESHOLD) |
|---|---|

FIG. 26

| NOTIFICATION INFORMATION ON CHANNEL #1 | NOTIFICATION INFORMATION ON CHANNEL #2 | ··· | NOTIFICATION INFORMATION ON CHANNEL #n |
|---|---|---|---|

| CONTROLLABLE LoRa INTERFERENCE INFORMATION (MEAN OF GW AND RELAY NODES) | CONTROLLABLE W-SUN INTERFERENCE INFORMATION (MEAN OF GW AND RELAY NODES) | RADIO INTERFERENCE INFORMATION (INTERFERENCE AMOUNT < GW AND NUMBER OF RELAY NODES SERVING AS THRESHOLD) | HIGH-PRIORITY AMBIENT NOISE INFORMATION (HIGH-PRIORITY AMBIENT NOISE INFORMATION < GW AND NUMBER OF RELAY NODES SERVING AS THRESHOLD) |
|---|---|---|---|

FIG. 31

| NOTIFICATION INFORMATION ON CHANNEL #1 | NOTIFICATION INFORMATION ON CHANNEL #2 | ... | NOTIFICATION INFORMATION ON CHANNEL #n |
|---|---|---|---|
| CONTROLLABLE LoRa INTERFERENCE INFORMATION (MEAN OF GW AND RELAY NODES) | CONTROLLABLE Wi-SUN INTERFERENCE INFORMATION (MEAN OF GW AND RELAY NODES) | | RADIO INTERFERENCE INFORMATION (MEAN OF RADIO INTERFERENCE AND INTERFERENCE AMOUNT OF HIGH-PRIORITY AMBIENT NOISE < GW AND NUMBER OF RELAY NODES SERVING AS THRESHOLD) |

FIG. 35

FORMAT a

| CONTROLLABLE LoRa INTERFERENCE INFORMATION (MEAN OF GW AND RELAY NODES) | CONTROLLABLE LoRa INTERFERENCE INFORMATION (MEAN OF GW AND RELAY NODES) | UNCONTROLLABLE INTERFERENCE INFORMATION (INTERFERENCE AMOUNT < GW AND NUMBER OF RELAY NODES SERVING AS THRESHOLD) |

FORMAT b

| UNCONTROLLABLE INTERFERENCE INFORMATION (INTERFERENCE AMOUNT < GW AND NUMBER OF RELAY NODES SERVING AS THRESHOLD) |

FORMAT c

| CONTROLLABLE LoRa INTERFERENCE INFORMATION (MEAN OF GW AND RELAY NODES) | CONTROLLABLE LoRa INTERFERENCE INFORMATION (MEAN OF GW AND RELAY NODES) |

FIG. 37

WIRELESS COMMUNICATION DEVICE AND NOTIFICATION METHOD

TECHNICAL FIELD

The present disclosure relates to a radio communication apparatus and a notification method.

BACKGROUND ART

Bands requiring no licenses (unlicensed bands) are often used for communication between radio communication apparatuses (e.g., between a base station and a terminal). Unlicensed bands are used by various radio systems, so that interference occurs due to a plurality of factors in some cases.

Further, in some cases, a terminal performs communication with a base station via a node configured to relay communication (e.g., relay node) and provided between the terminal and the base station.

CITATION LIST

Patent Literature

PTL 1
Japanese Patent Application Laid-Open No. 2013-081089

SUMMARY OF INVENTION

Technical Problem

There is, however, room for consideration as to a method for each apparatus in a network where a relay node is provided to appropriately provide notification of an interference detection result in a band used by various radio systems.

One non-limiting and exemplary embodiment facilitates providing a radio communication apparatus and a notification method each making it possible for each apparatus in a network where a relay node is provided to appropriately provide notification of an interference detection result in a band used by various radio systems.

A radio communication apparatus according to one example of the present disclosure is an apparatus that supports a first radio system and that belongs to a first network in which a plurality of radio communication apparatuses perform relay by radio connection, the radio communication apparatus including: a receiver, which in operation, receives first notification information from at least one of the plurality of radio communication apparatuses on a downstream side of the radio communication apparatus in the first network; an interference classifier, which in operation, classifies interference into first interference and second interference different from the first interference, the interference being detected in each of a plurality of channels, the first interference being from a first radio apparatus that supports the first radio system and that belongs to the first network; a controller, which in operation, generates second notification information based on a first classification result of interference included in the first notification information and on a second classification result of interference in the interference classifier, the second notification information including at least one of information on the first interference and/or information on the second interference; and a transmitter, which in operation, transmits the second notification information to at least one of the plurality of radio communication apparatuses on an upstream side of the radio communication apparatus in the first network.

A notification method according to one example of the present disclosure is a method in a radio communication apparatus that supports a first radio system and that belongs to a first network in which a plurality of radio communication apparatuses perform relay by radio connection, the notification method including: receiving first notification information from at least one of the plurality of radio communication apparatuses on a downstream side of the radio communication apparatus in the first network; classifying interference into first interference and second interference different from the first interference, the interference being detected in each of a plurality of channels, the first interference being from a first radio apparatus that supports the first radio system and that belongs to the first network; generating second notification information based on a first classification result of interference included in the first notification information and on a second classification result of interference in the interference classifier, the second notification information including at least one of information on the first interference and/or information on the second interference; and transmitting the second notification information to at least one of the plurality of radio communication apparatuses on an upstream side of the radio communication apparatus in the first network.

It should be noted that general or specific embodiments may be implemented as a system, an apparatus, a method, an integrated circuit, a computer program, a storage medium, or any selective combination thereof.

According to one example of the present disclosure, it is made possible to appropriately provide notification of an interference detection result in a band used by various radio systems.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 14 is a diagram illustrating Example 2-2 of the format of notification information of a GW, according to the embodiment of the present disclosure;

FIG. 15 is a diagram illustrating an example of a format of notification information of a relay node corresponding to FIG. 14;

FIG. 22 is a diagram illustrating Example 4 of the format of notification information of a GW, according to the embodiment of the present disclosure;

FIG. 23 is a diagram illustrating an example of a format of notification information of a relay node corresponding to FIG. 22;

FIG. 25 is a diagram illustrating Example 5 of the format of notification information of a GW, according to the embodiment of the present disclosure;

FIG. 26 is a diagram illustrating an example of a format of notification information of a relay node corresponding to FIG. 25;

FIG. 31 is a diagram illustrating Example 7 of the format of notification information of a GW, according to the embodiment of the present disclosure;

FIG. 35 is a diagram illustrating Example 8 of the format of notification information of a GW, according to the embodiment of the present disclosure;

FIG. 37 is a diagram illustrating an example of a format of notification information at three different timings;

DESCRIPTION OF EMBODIMENTS

Hereinafter, preferred embodiments of the present disclosure will be described in detail with reference to the accompanying drawings. In the specification and drawings, like reference signs are assigned to component elements having substantially the same functions, and their descriptions will not be repeated.

One Embodiment

In IoT (Internet of Things) and/or M2M (Machine to Machine), usage of a radio communication technology called LPWA (Low Power Wide Area) with which communication in a wide area is possible at low power consumption has been discussed.

The operation of LPWA in an unlicensed band (e.g., 920 MHz band) has been discussed. LPWA provides a plurality of modes (standards). For example, the communication modes of LPWA include a first communication mode in which communication is performed by using a spread spectrum mode and a second communication mode in which communication is performed without using a spread spectrum mode. The first communication mode includes, for example, a communication mode called "LoRa." The second communication mode includes, for example, a communication mode called "Wi-SUN (Wireless Smart Utility Network)."

Hereinafter, the communication mode called "LoRa" (hereinafter, described as "LoRa mode") is described as one example of the first communication mode, and the communication mode called "Wi-SUN" (hereinafter, described as "Wi-SUN mode") is described as one example of the second communication mode. The present disclosure is not limited to the LoRa mode or the Wi-SUN mode, however.

Hereinafter, a terminal that operates in accordance with the LoRa mode (that supports the LoRa mode) is described as an "LoRa terminal," and a terminal that operates in accordance with the Wi-SUN mode (that supports the Wi-SUN mode) is described as a "Wi-SUN terminal."

LPWA terminals are not limited to terminals owned by users and are mounted on various devices. For example, LPWA terminals are mounted on home appliances, such as televisions, air conditioners, laundry machines, and refrigerators, and mobile transportation, such as vehicles.

Unlicensed bands are used by various systems including, for example, Wi-fi (registered trademark), RFID (Radio Frequency IDentifier), and the like further to LPWA.

For this reason, when, for example, a channel to be used for communication by an LPWA terminal, such as an LoRa terminal and a Wi-SUN terminal, is assigned, it is desired to consider interference from the same system and other systems.

Figure 1:
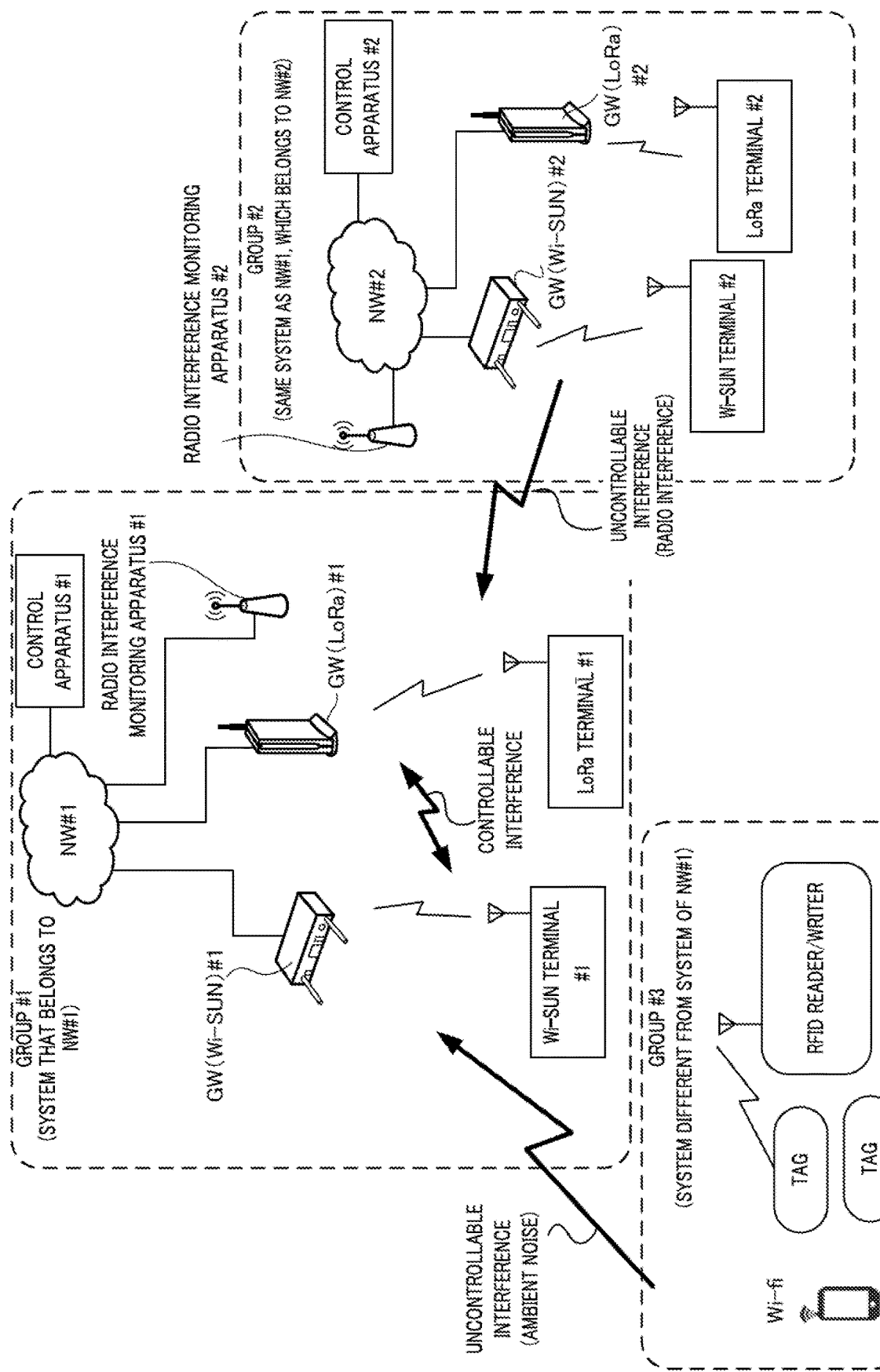
FIG. 1 is a diagram illustrating the outline of radio systems including LPWA.

FIG. 1 is a diagram illustrating the outline of radio systems including LPWA.

FIG. 1 illustrates group #1, group #2, and group #3. Each group includes a plurality of apparatuses.

Group #1 and group #2 both are LPWA systems. Network #1 (NW #1) to which the apparatuses of group #1 belong is different from network #2 (NW #2) to which the apparatuses of group #2 belong, however. For example, NW #1 and NW #2 are the same LPWA systems and are networks that are operated by business operators different from each other. The LPWA system of group #2 is a radio system in a network not managed by group #1 (uncontrollable network).

Group #1 includes apparatuses that belong to NW #1 and that are connected to NW #1 by wire or radio. For example, group #1 includes Wi-SUN gateway #1 (GW(Wi-SUN) #1) and Wi-SUN terminal #1 that support communication in the Wi-SUN mode, LoRa gateway #1 (GW(LoRa) #1) and LoRa terminal #1 that support communication in the LoRa mode, and radio interference monitoring apparatus #1 that measures interference. Group #1 includes control apparatus #1 that performs centralized control over the GWs and the like via NW #1.

Group #2 includes apparatuses that belong to NW #2 and that are connected to NW #2 by wire or radio. For example, group #2 includes Wi-SUN gateway #2 (GW(Wi-SUN) #2), Wi-SUN terminal #2, LoRa gateway #2 (GW(LoRa) #2), LoRa terminal #2, and radio interference monitoring apparatus #2. Group #2 includes control apparatus #2 that performs centralized control over the GWs and the like via NW #2.

Note that, the number of apparatuses in each of group #1 and group #2 in FIG. 1 is one example, and the present disclosure is not limited thereto. For example, the number of radio interference monitoring apparatuses, GWs, or terminals included in each of group #1 and group #2 in FIG. 1 may be two or more. Another apparatus may be connected to the NW of each group.

Group #1 may include a Wi-SUN relay station that relays radio communication between Wi-SUN gateway #1 and Wi-SUN terminal #1 and/or a LoRa relay station that relays radio communication between LoRa gateway #1 and LoRa terminal #1. The configuration is not limited to an example in which the Wi-SUN relay station and the LoRa relay station are other apparatuses. For example, group #1 may include a relay station that relays radio communication of each of Wi-SUN and LoRa. Group #2 may also include similar relay stations.

Group #3 is a radio system different from the radio system (LPWA system) of group #1. The radio system of group #3 is a radio system of an uncontrollable network not managed by group #1. The radio system of group #3 is, for example, RFID, Wi-Fi, or the like. Group #3 includes an RFID reader/writer, RFID tags, terminals that use Wi-Fi, and the like. Note that, the radio system of group #3 may include an LTE (Long Term Evolution) system, a radar system, or the like.

The network configuration and/or the configuration of the apparatuses, illustrated in FIG. 1, is one example, and the present disclosure is not limited thereto.

For example, FIG. 1 illustrates an example in which the LoRa terminal and the Wi-SUN terminal are separate terminals. Alternatively, a terminal may be capable of operating in accordance with both the LoRa mode and the Wi-SUN mode.

FIG. 1 illustrates an example in which the Wi-SUN gateway, the LoRa gateway, the radio interference monitoring apparatus, and the control apparatus that belong to each network are separate apparatuses. Alternatively, two or more of the Wi-SUN gateway, the LoRa gateway, the radio interference monitoring apparatus, and the control apparatus may be integrated.

In the following description, the term "base station" corresponds to an apparatus in which a Wi-SUN gateway, an LoRa gateway, and a radio interference monitoring apparatus are integrated.

Each network illustrated in FIG. 1 may include another apparatus different from the apparatuses illustrated in FIG. 1. In this case, the other apparatus may have part or all of the functions of the apparatuses illustrated in FIG. 1. When, for example, a relay station is provided between the base station and the Wi-SUN terminal and/or the LoRa terminal, the relay station may have the function of the radio interference monitoring apparatus. A relay station may have the functions of the Wi-SUN gateway and/or the LoRa gateway and the function of the radio interference monitoring apparatus. Alternatively, a relay station may have the function of the radio interference monitoring apparatus and does not need to have the functions of the Wi-SUN gateway and/or the LoRa gateway.

The radio apparatuses of groups #1 to #3 use a common system band (e.g., an unlicensed band). For this reason, the radio apparatuses included in each of groups #1 to #3 receive interference from the other radio apparatuses. Interference that is received by one radio apparatus included in group #1 will be described as an example.

For example, a signal transmitted or received by one radio apparatus (e.g., the Wi-SUN terminal #1) included in group #1 causes interference with another radio apparatus (e.g., LoRa GW #1) included in group #1. Hereinafter, interference received by one radio apparatus that belongs to NW #1 from another radio apparatus that belongs to NW #1 may be described as "controllable interference." For example, controllable interference corresponds to interference that one radio apparatus that supports communication of the LPWA system and that belongs to NW #1 receives from another radio apparatus that supports communication of the LPWA system and that belongs to NW #1.

For example, a signal transmitted or received by one radio apparatus (e.g., Wi-SUN terminal #2 and/or the RFID reader/writer) included in group #2 and/or group #3 causes interference with one radio apparatus (e.g., LoRa terminal #1) included in group #1. Hereinafter, interference that one radio apparatus that belongs to NW #1 receives from one radio apparatus that does not belong to NW #1 may be described as "uncontrollable interference." For example, uncontrollable interference corresponds to interference that one radio apparatus that supports communication of the LPWA system and that belongs to NW #1 receives from one radio apparatus that does not belong to NW #1.

Uncontrollable interference is further classified in accordance with a factor of interference.

For example, a signal transmitted or received by one radio apparatus (e.g., Wi-SUN terminal #2) included in group #2 causes interference with one radio apparatus (e.g., LoRa terminal #1) included in group #1. Hereinafter, interference that one radio apparatus that belongs to NW #1 receives from one radio apparatus that belongs to NW #2 may be described as "radio interference" of "uncontrollable interference." For example, "radio interference" corresponds to interference that one radio apparatus that supports communication of the LPWA system and that belongs to NW #1 receives from one radio apparatus that supports communication of the LPWA system and that belongs to NW #2 different from NW #1.

For example, a signal transmitted or received by one radio apparatus (e.g., the RFID reader/writer) included in group #3 causes interference with one radio apparatus (e.g., LoRa terminal #1) included in group #1. Hereinafter, interference that one radio apparatus that supports communication of the LPWA system and that belongs to NW #1 receives from one radio apparatus that supports a radio system different from the LPWA system may be described as "ambient noise" of "uncontrollable interference."

As illustrated in FIG. 1 as an example, the LPWA system uses a common system band with a radio system different from the LPWA system and/or the same LPWA system that belongs to a different network. For this reason, in assigning a channel to an LPWA terminal, such as a LoRa terminal and a Wi-SUN terminal, it is desired to detect (monitor) interference and provide notification of a detected result to, for example, an apparatus that assigns a channel.

When a relay node is provided between, for example, a base station and a Wi-SUN terminal and/or an LoRa terminal, the relay node may have functions of a radio interference monitoring apparatus. When a relay node has functions of a radio interference monitoring apparatus, it is desirable for the relay node to provide notification of a monitoring result to the base station.

Figure 2:
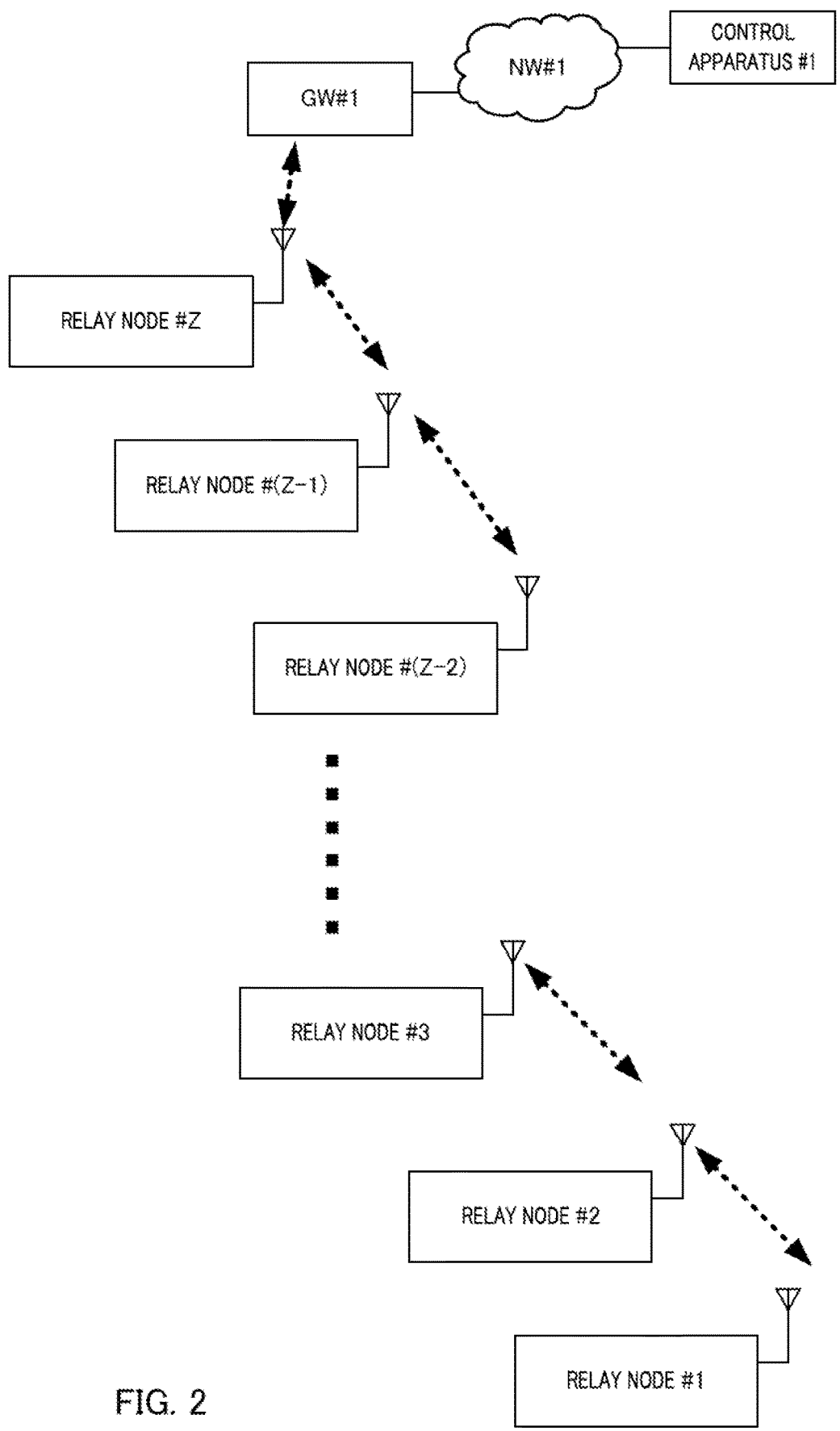
FIG. 2 is a diagram illustrating an exemplary network including a base station (GW) and relay stations (relay nodes)

FIG. 2 illustrates an exemplary network including a base station (GW) and a relay station (relay node). In FIG. 2, base station (GW) and Z relay stations (relay nodes) are illustrated.

Note that, a certain relay node positioned close to the GW is referred to as an "upstream" node, while a certain relay node positioned distant from the GW is referred to as a "downstream" node. For example, relay nodes #3 to #Z correspond to upstream nodes of relay node #2, and relay node #1 corresponds to a downstream node of relay node #2. Downstream nodes may be each referred to as a "subordinate node." Further, relay node #1 that has no subordinate node may be referred to as an "end node." GWs may be each referred to as an upstream node of relay node #Z.

Further, although not illustrated in FIG. 2, a terminal may be connected to the each relay node and a GW by radio.

For example, in the network of FIG. 2, a base station causes each of relay nodes #1 to #Z to perform radio interference monitoring. The base station then provides notification of interference detection result of the monitoring by the base station and relay nodes #1 to #Z to the control apparatus (see FIG. 1).

Figure 3:
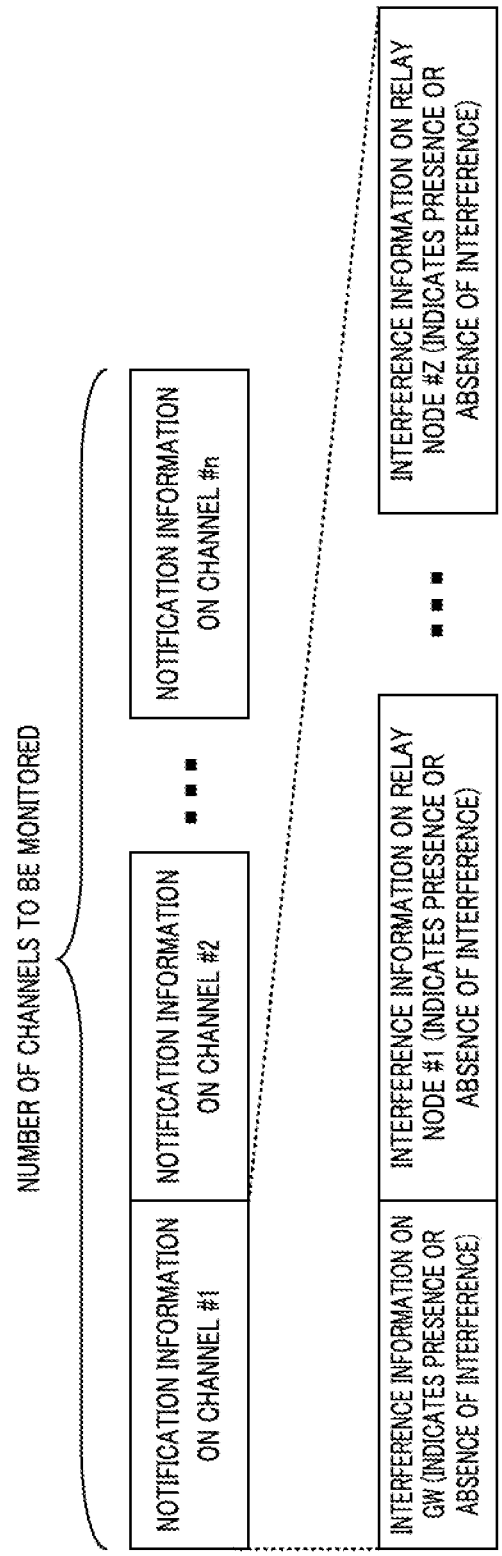
FIG. 3 is a diagram illustrating an example of a format of notification information for providing notification of an interference detection result.

FIG. 3 illustrates an example of a format of notification information that notifies an interference detection result.

The format of notification information illustrated in FIG. 3 includes fields for notification information on the respective channels of channels #1 to channel #n. Channel #1 to channel #n are included in the system band and are one example of channels to be monitored for interference.

The information on interference in channel #1 is set in a "notification information on channel #1" field. Similarly, pieces of the information on interference in channel #2 to channel #n are set in "notification information on channel #2" to "notification information on channel #n" fields, respectively. The term "n" represents the number of channels to be monitored. The format of notification information illustrated in FIG. 2 includes the fields of pieces of notification information corresponding to the number of channels to be monitored.

The "notification information on channel #1" field includes the "interference information on GW" including interference information on GW and the "interference information on relay node #1" to "interference information on relay node #Z" fields respectively including pieces of interference information on relay nodes #1 to #Z.

A detection result (monitoring result) of an interference amount is set in each of the "interference information" fields. For example, information indicating the presence or absence of interference is set in the "interference information" field. The information indicating the presence or absence of interference, for example, indicates that there is interference when a detected interference amount is greater than a threshold and indicates that there is no interference when a detected interference amount is less than or equal to the threshold. For example, in the "interference information" field having a size of one bit, "1" is set when there is interference, and "0" is set when there is no interference.

The format of notification information illustrated in FIG. 3 includes information indicating the presence or absence of interference but does not include information other than the presence or absence of interference, so that there is a possibility that notification using the format shown in FIG. 3 is not sufficient to appropriately assign a channel. When a channel is not appropriately assigned, it is difficult to optimize the network that uses the system band, and there is a possibility that the efficiency of use of frequency in the system band decreases.

Further, among the types of interference illustrated in FIG. 1, the uncontrolled interference received by a radio apparatus belonging to, for example, NW #1 is interference received from a radio apparatus not belonging to NW #1, so that it is difficult to manage and control the interference in NW #1 (e.g., control apparatus of NW #1). Meanwhile, controllable interference received by a radio apparatus belonging to NW #1 is interference from one radio apparatus belonging to NW #1, so it is possible for NW #1 to manage and control the interference.

Relay nodes #1 to #Z each perform radio interference monitoring, and provide notification of monitoring result to the base station. In this case, the notification of monitoring result of relay node #1 is provided to the base station via relay nodes #2 to #Z. Likewise, the notification of monitoring result of relay node #2 is provided to the base station via relay nodes #3 to #Z. Thus, when notification of monitoring result of each relay node is provided to the base station, the information amount of information for notification increases. For example, in a case that each relay node provides notification of a result of classified interference, there is room for discussion on a method for providing notification of monitoring result of each relay node, for example.

One non-limiting and exemplary embodiment achieves, in a network including a relay node, appropriate notification of an interference detection result in a band used by various radio communication systems by classifying detected interference and generating notification information for providing notification of a detection result of the classified interference.

<Configuration Example of Radio Communication Apparatus>

Figure 4:
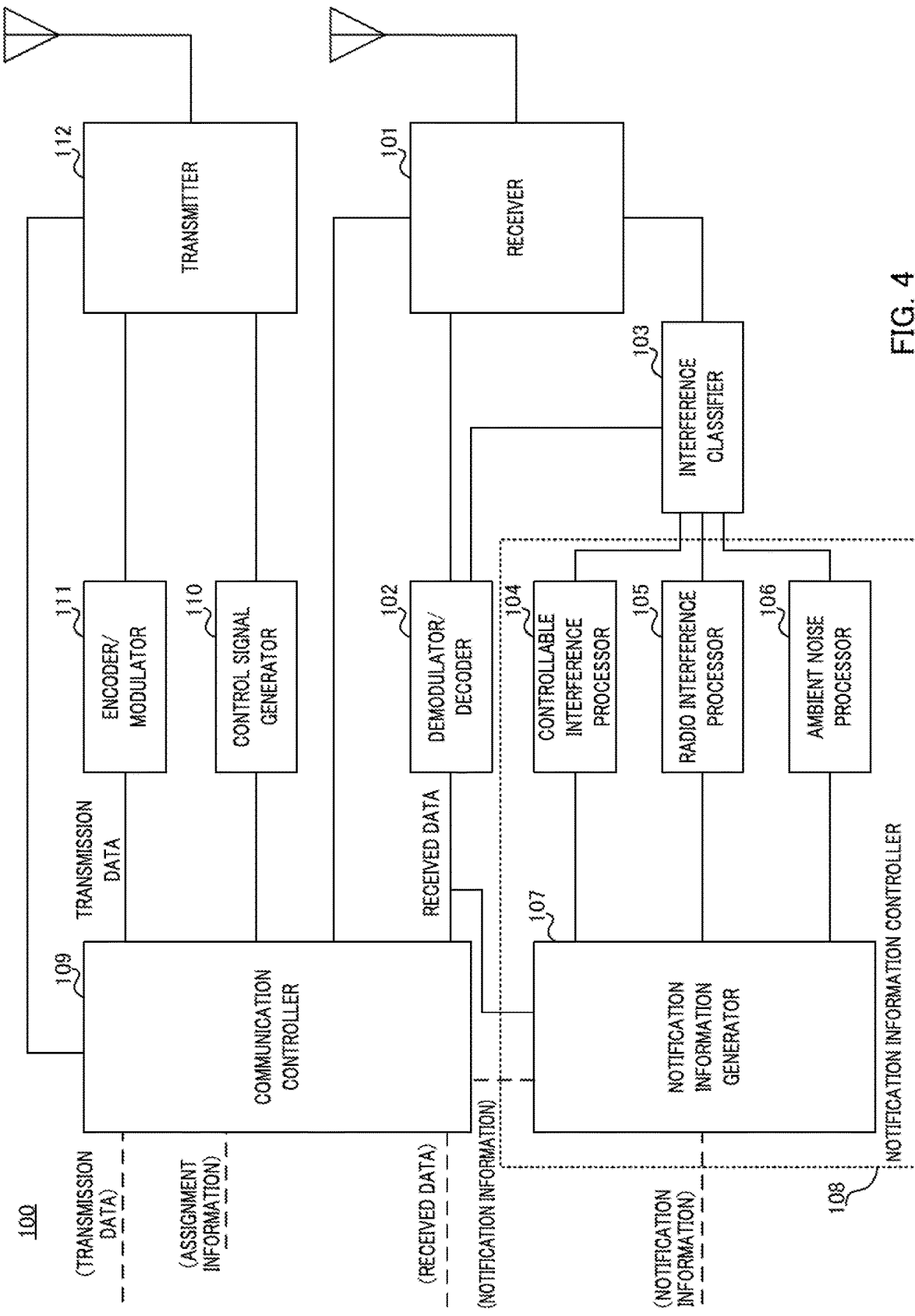
FIG. 4 is a block diagram illustrating a configuration example of a radio communication apparatus according to an embodiment of the present disclosure.

FIG. 4 is a block diagram illustrating a configuration example of radio communication apparatus 100 according to the present embodiment. Radio communication apparatus 100, for example, is a base station or relay node that belongs to NW #1 illustrated in FIG. 1 and has the functions of the Wi-SUN GW, the LoRa GW, and the radio interference monitoring apparatus.

Radio communication apparatus 100 includes receiver 101, demodulator/decoder 102, interference classifier 103, controllable interference processor 104, radio interference processor 105, ambient noise processor 106, notification information generator 107, communication controller 109, control signal generator 110, encoder/modulator 111, and transmitter 112.

Receiver 101 receives a signal transmitted by a terminal (the LoRa terminal and/or the Wi-SUN terminal (see FIG. 1)) and executes a predetermined reception process on the received signal. For example, the predetermined reception process includes a frequency conversion process (down-conversion) based on the frequency of a channel assigned to the terminal. Information on the frequency of the channel assigned to the terminal may be acquired from, for example, communication controller 109.

Receiver 101 receives a signal in each channel usable in a system band (e.g., each channel included in an unlicensed band) for interference measurement (radio interference monitoring). Receiver 101 executes the predetermined reception process on the received signal. The predetermined reception process includes, for example, a frequency conversion process based on the frequency of each channel.

Receiver 101 also receives a control signal containing notification information transmitted by a downstream node. When radio communication apparatus 100 is a relay node, receiver 101 receives a control signal containing control information transmitted by an upstream node. Receiver 101 performs a predetermined reception process on the received control signal. For example, the predetermined receive process includes a frequency conversion process based on the frequency of a channel assigned to communication between nodes.

Receiver 101 outputs a received signal, subjected to the predetermined reception process, to demodulator/decoder 102 and interference classifier 103.

Demodulator/decoder 102 executes a demodulation process and a decoding process on the received signal acquired from receiver 101 and generates received data. Received data may include an identifier for identifying a terminal that belongs to the same NW (NW #1) as that of radio communication apparatus 100. When the terminal that is the source of a received signal is an LoRa terminal, the demodulation process may include a reverse spread process for spread spectrum used in the LoRa mode. When the received signal is a control signal transmitted by a downstream node, the received signal may include notification information acquired from the downstream node. Notification information received from a downstream node may be referred to as "received notification information."

Interference classifier 103, for example, classifies interference in each channel. For example, interference classifier 103 monitors a received signal in a predetermined time in one channel and classifies the received signal into the above-described controllable interference and uncontrollable interference.

Interference classifier 103 detects a preamble of a received signal. For example, interference classifier 103 calculates a correlation between a received signal and a preamble used in the LoRa mode and calculates a correlation between a received signal and a preamble used in the Wi-SUN mode. Preambles respectively used in the LoRa mode and the Wi-SUN mode may be common regardless of the NW to which the terminal that is the source of a received signal belongs. Although interference classifier 103 has been described as detecting the preamble used for LoR a mode and Wi-SUN mode and determining communication mode of the received signals, communication mode determined by interference classifier 103 may include another communication mode that differs from LoRa mode and Wi-SUN mode. For example, when the other communication mode uses a preamble signal that differs from LoRa mode and Wi-SUN mode preambles, interference classifier 103 can determine that communication mode of the received signal is the other communication mode as in the case of LoRa mode and Wi-SUN mode.

When both the result of the correlation between a received signal and the preamble used in the LoRa mode and the result of the correlation between a received signal and the preamble used in the Wi-SUN mode have no peak greater than or equal to a predetermined value, interference classifier 103 determines that the source of the received signal is neither an LoRa terminal nor a Wi-SUN terminal.

When, for example, the result of the correlation between a received signal and the preamble used in the LoRa mode has a peak greater than or equal to the predetermined value, interference classifier 103 determines that the source of the received signal is an LoRa terminal. When, for example, the result of the correlation between a received signal and the preamble used in the Wi-SUN mode has a peak greater than or equal to the predetermined value, interference classifier 103 determines that the source of the received signal is a Wi-SUN terminal.

Preambles respectively used in the LoRa mode and the Wi-SUN mode are common regardless of the NW to which the terminal that is the source of a received signal belongs. For this reason, when interference classifier 103 determines that the source of a received signal is an LoRa terminal or a Wi-SUN terminal, interference classifier 103 determines whether the NW to which the source belongs is the same NW (NW #1) as that of radio communication apparatus 100 or the NW different from that of radio communication apparatus 100 (e.g., NW #2 in FIG. 1).

For example, interference classifier 103 determines the NW to which the source belongs in accordance with a decoding result of a received signal acquired from demodulator/decoder 102. When, for example, a received signal is correctly decoded and the received signal includes an identifier, interference classifier 103 determines that the NW to which the source of the received signal belongs is the same NW as that of radio communication apparatus 100. On the other hand, when, for example, a received signal is not correctly decoded and the received signal does not include an identifier, interference classifier 103 determines that the NW to which the source of the received signal belongs is an NW different from that of radio communication apparatus 100.

When the source of a received signal is an LoRa terminal or a Wi-SUN terminal that belongs to NW #1 same as that of radio communication apparatus 100, interference classifier 103 determines that the received signal corresponds to controllable interference.

On the other hand, when the source of a received signal is neither an LoRa terminal nor a Wi-SUN terminal, interference classifier 103 determines that the received signal corresponds to uncontrollable interference.

Even when interference classifier 103 determines that the source of a received signal is an LoRa terminal or a Wi-SUN terminal, and when the source of a received signal is an LoRa terminal or a Wi-SUN terminal that belongs to an NW different from that of radio communication apparatus 100, interference classifier 103 determines that the received signal corresponds to uncontrollable interference.

Interference classifier 103 may classify uncontrollable interference into radio interference and ambient noise.

When, for example, the source of a received signal is neither an LoRa terminal nor a Wi-SUN terminal, interference classifier 103 determines that the source of the received signal is a radio apparatus that supports a radio system different from the LPWA system and the received signal corresponds to ambient noise.

When, for example, the source of a received signal is an LoRa terminal or a Wi-SUN terminal that belongs to an NW different from that of radio communication apparatus 100, interference classifier 103 determines that the received signal corresponds to radio interference.

A classification method in interference classifier 103 is not limited to the above-described method based on a preamble detection result of a received signal and a decoding result of the received signal.

Interference classifier 103 may further classify controllable interference. Alternatively, interference classifier 103 may determine a priority of ambient noise. An example of further classification of controllable interference and an example of priority determination will be described later.

Interference classifier 103 outputs a received signal according to a classification result of interference, determined in accordance with a preamble detection result of the received signal and a decoding result of the received signal. For example, interference classifier 103 outputs a received signal corresponding to controllable interference to controllable interference processor 104, outputs a received signal corresponding to radio interference to radio interference processor 105, and outputs a received signal corresponding to ambient noise to ambient noise processor 106.

Controllable interference processor 104 determines the interference amount of controllable interference from a received signal corresponding to controllable interference. Controllable interference processor 104 outputs the interference amount of controllable interference to notification information generator 107.

Radio interference processor 105 determines the interference amount of radio interference from a received signal corresponding to radio interference. Radio interference processor 105 outputs the interference amount of radio interference to notification information generator 107.

Ambient noise processor 106 determines the interference amount of ambient noise from a received signal corresponding to ambient noise. Ambient noise processor 106 outputs the interference amount of ambient noise to notification information generator 107.

A manner to represent an interference amount is not limited. For example, an interference amount may be represented by a mean value, minimum value, or maximum value of received signal power (which may also be referred to as interference power). Alternatively, an interference amount may be represented by using the relationship between a received signal power and a time interval (which may also be referred to as monitoring interval) in which a received signal is received. For example, an interference amount may be represented by, for example, a time interval in which a received signal power has a value higher than or equal to a predetermined value or may be represented by, for example, whether a time interval in which a received signal power has a value higher than or equal to a predetermined value is longer than or equal to a predetermined length. Manners to respectively represent the interference amounts of controllable interference, radio interference, and ambient noise may be different from one another or may be common to one another.

Notification information generator 107 generates notification information on interference in each channel detected by radio communication apparatus 100 in accordance with the interference amount of controllable interference, the interference amount of radio interference, and the interference amount of ambient noise. Hereinafter, notification information on interference in each channel detected by radio communication apparatus 100 may be referred to as "detection notification information."

Notification information generator 107 integrates the received notification information and the detection notification information to generate notification information to be transmitted by radio communication apparatus 100 to an upstream node. Hereinafter, notification information to be transmitted by radio communication apparatus 100 to an upstream node may be referred to as "transmission notification information." The format of notification information and an example of notification information will be described later.

When interference classifier 103 does not classify uncontrollable interference into radio interference and ambient noise, interference classifier 103 may output a received signal corresponding to uncontrollable interference to radio interference processor 105. In this case, radio interference processor 105 determines the interference amount of uncontrollable interference from a received signal corresponding to uncontrollable interference and outputs the interference amount of uncontrollable interference to notification information generator 107. In this case, notification information generator 107 generates notification information on interference in each channel in accordance with the interference amount of controllable interference and the interference amount of uncontrollable interference.

When, for example, radio communication apparatus 100 is a GW, notification information generator 107 transmits the generated transmission notification information to a control apparatus (see FIG. 1) of NW #1 via NW #1, for example. Further, when, for example, radio communication apparatus 100 is a relay node, notification information generator 107 outputs the generated transmission notification information to communication controller 109, for example.

Note that, controllable interference processor 104, radio interference processor 105, ambient noise processor 106, and notification information generator 107 may be collectively referred to as notification information controller 108.

When, for example, radio communication apparatus 100 is a GW, communication controller 109, for example, acquires assignment information on a channel assigned to a terminal from control apparatus #1 (see FIG. 1) of NW #1. When, for example, radio communication apparatus 100 is a relay node, communication controller 109 acquires the assignment information from control apparatus #1 of NW #1 (see FIG. 1) via an upstream node. In this case, the assignment information may be included in a control signal received from the upstream node.

Communication controller 109 outputs assignment information to control signal generator 110.

Communication controller 109 executes control on data communication with a terminal and control on data communication with an upstream side node and a downstream node.

When, for example, radio communication apparatus 100 is a GW, communication controller 109 may output reception data received from demodulator/decoder 102 to an unillustrated higher layer station (e.g., control apparatus in FIG. 1) or another apparatus in NW #1. Further, communication controller 109 outputs transmission data addressed to a terminal, acquired from a higher layer station or another apparatus in NW #1, to encoder/modulator 111.

When, for example, radio communication apparatus 100 is a relay node, communication controller 109 may output transmission data addressed to a terminal included in the reception data acquired form demodulator/decoder 102 or data received from a terminal to encoder/modulator 111. The transmission data addressed to a terminal herein may be included in a signal received from, for example, an upstream node. The data received from a terminal may be data to be transmitted to a GW via a relay node.

Control signal generator 110 generates a control signal addressed to a terminal in accordance with information acquired from communication controller 109. Control signal generator 110 outputs a control signal subjected to a predetermined signal process (e.g., an encoding process and a modulation process) to transmitter 112. Control signal generator 110 also generates a control signal addressed to an upstream node and/or a downstream node based on information acquired from communication controller 109. Note that, a control signal addressed to an upstream node may include transmission notification information. Further, a control signal addressed to a downstream node may also include assignment information.

Encoder/modulator 111 generates a transmission signal by executing the encoding process and the modulation process on transmission data acquired from communication controller 109. Encoder/modulator 111 outputs a transmission signal to transmitter 112. When the terminal that is the destination of a transmission signal is an LoRa terminal, the modulation process may include a spread spectrum process used in the LoRa mode.

Transmitter 112 executes a predetermined transmission process on a transmission signal acquired from encoder/modulator 111. For example, the predetermined transmission process includes a frequency conversion process (up-conversion) based on the frequency of a channel assigned to a terminal. Assignment information on the frequency of the channel assigned to the terminal may be acquired from, for example, communication controller 109.

Transmitter 112 executes a predetermined transmission process on a control signal acquired from control signal generator 110. For example, the predetermined transmission process includes a frequency conversion process (up-conversion) based on the frequency of a channel for transmitting a control signal to a terminal. The channel for transmitting a control signal to a terminal may be, for example, a predetermined channel or may be a channel used at current point in time in communication with a terminal.

Further, transmitter 112 performs a predetermined transmission process on a control signal addressed to an upstream node and/or a downstream node acquired from control signal generator 110. For example, the predetermined transmission process includes a frequency conversion process (up-conversion) based on the frequency of the channel assigned to communication between nodes.

In the above description, an example in which the components illustrated in FIG. 3 are included in one radio communication apparatus 100 has been described. The present disclosure is not limited thereto. For example, any one of two or more apparatuses may include each of the components illustrated in FIG. 3.

For example, the configuration of radio communication apparatus 100 illustrated in FIG. 4 may be divided between a first apparatus having functions of a GW of Wi-SUN and functions of a GW of LoRa and a second apparatus having functions of a radio interference monitoring apparatus. Alternatively, the configuration of radio communication apparatus 100 illustrated in FIG. 4 may be divided between a first apparatus having functions of a relay node of Wi-SUN and functions of a relay node of LoRa and a second apparatus having functions of a radio interference monitoring apparatus.

In this case, the first apparatus includes, for example, receiver 101, demodulator/decoder 102, communication controller 109, control signal generator 110, encoder/modulator 111, and transmitter 112. The second apparatus (radio interference monitoring apparatus) includes receiver 101 that receives a signal for interference measurement (radio interference monitoring), interference classifier 103, controllable interference processor 104, radio interference processor 105, ambient noise processor 106, and notification information generator 107. In this case, the first apparatus and the second apparatus may be connected via an NW or may be directly connected by radio or wire.

In this case, for example, the second apparatus may acquire a decoding result of a received signal in the first apparatus or may output notification information generated by the second apparatus to the first apparatus. For example, the second apparatus may be configured to acquire a received signal received by receiver 101 of the first apparatus, instead of including receiver 101.

The first apparatus may execute both signal processing on a signal transmitted to or received from an LoRa terminal and signal processing on a signal transmitted to or received from a Wi-SUN terminal. Alternatively, the first apparatus that executes signal processing on a signal transmitted to or received from the LoRa terminal and the first apparatus that executes signal processing on a signal transmitted to or received from the Wi-SUN terminal may be separately provided.

The first apparatus may assign a channel to a terminal in accordance with notification information provided from the second apparatus. In this case, notification information need not be provided to the control apparatus via the NW.

The functional blocks of the second apparatus may be included in a relay station that relays communication in the LoRa mode and/or the Wi-SUN mode. Alternatively, the second apparatus may be connected to a relay station and operate.

Next, an example of the above mentioned notification information will be described.

<Variation 1-1 of Notification Information>

Figure 5:
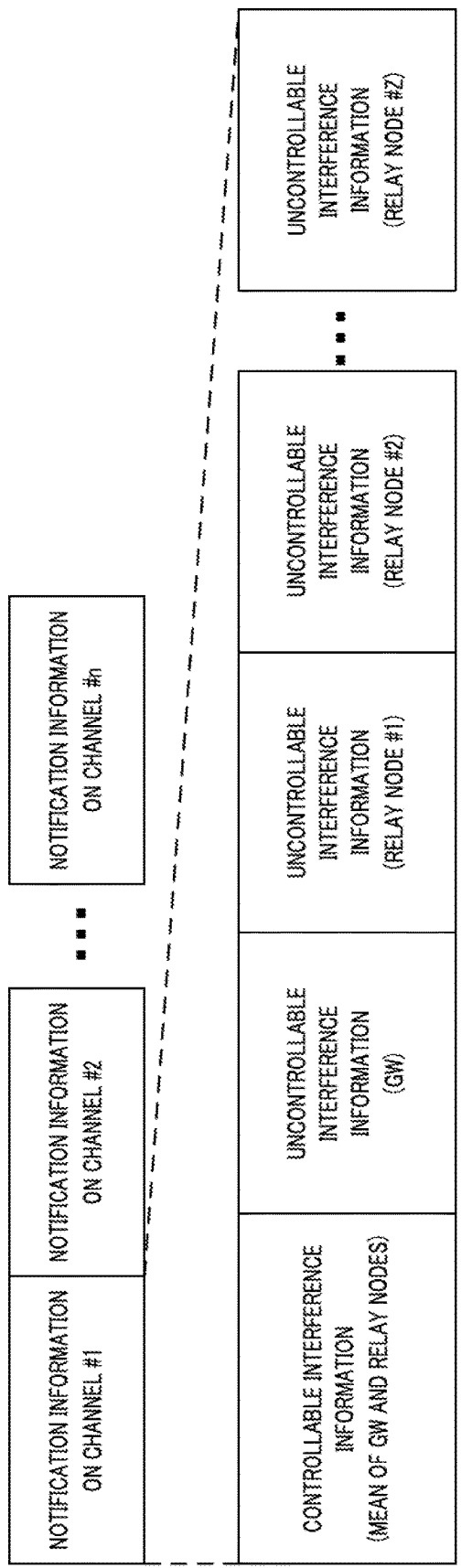
FIG. 5 is a diagram illustrating Example 1-1 of a format of notification information of a GW, according to the embodiment of the present disclosure.

FIG. 5 is a diagram illustrating Example 1-1 of a format of transmission notification information of a GW, according to the present embodiment. The format illustrated in FIG. 5 indicates a format example of transmission notification information in a GW.

The format of the notification information illustrated in FIG. 5 includes fields for setting pieces of notification information on the respective channels of channel #1 to channel #n.

In the "notification information on channel #1" field, information on interference in channel #1 is set. Likewise, in the "notification information on channel #2" to "notification information on channel #n" fields, pieces of information on interference in channel #2 to the channel #n are set, respectively. The term "n" represents the number of channels to be monitored. The format of the notification information illustrated in FIG. 4 includes fields for pieces of notification information corresponding to the number of channels to be monitored. Although the "notification information on channel #1" field will be described below as an example, the fields for notification information on other channels may have the same configuration as the "notification information on channel #1" field.

The "notification information on channel #1" field includes a "controllable interference information" field and Z+1 "uncontrollable interference information" fields.

In a "controllable interference information" field, information on controllable interference, such as a detection result of an interference amount of the controllable interference is set. For example, in a "controllable interference information" field, a value indicating a mean of interference amounts of controllable interference detected respectively in a GW and relay nodes under the GW is set.

Z+1 "uncontrollable interference information" fields are associated with a GW and Z relay nodes, respectively. In the "uncontrollable interference information" field associated with a GW, for example, information on the uncontrollable interference detected in the GW, such as a detection result of an interference amount of controllable interference in the GW is set, for example. Likewise, in the "uncontrollable interference information" field associated with relay node #i ("i" represents an integer between 1 to Z), information on the uncontrollable interference detected in relay node #i, such as a detection result of an interference amount of controllable interference in relay node #i is set, for example.

Note that, a GW receives notification information including a detection result of a relay node under the GW from the relay node under the GW. For example, a relay node receives notification information including a detection result of a downstream relay node from the downstream relay node. Next, a format of notification information transmitted or received by a relay node will be described.

Figure 6:
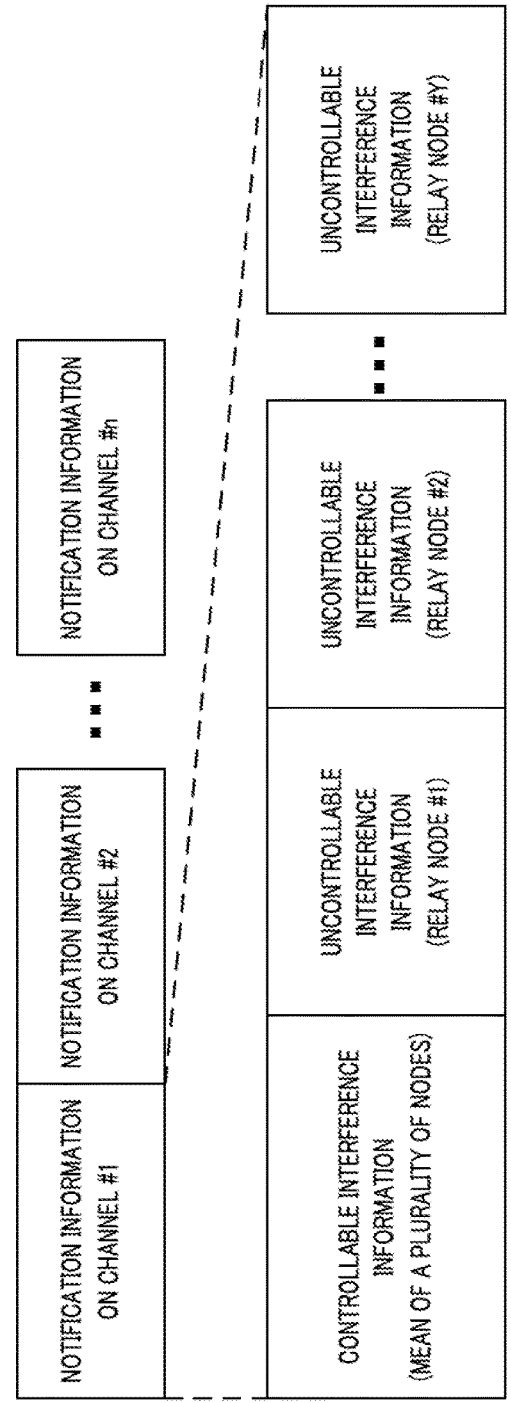
FIG. 6 is a diagram illustrating an example of a format of notification information of a relay node corresponding to FIG. 5.

FIG. 6 is a diagram illustrating a format example of notification information of relay nodes corresponding to FIG. 5. The format illustrated in FIG. 6 is a format of transmission notification information transmitted to an upstream node from relay node #Y, for example.

The format of notification information illustrated in FIG. 6 includes fields for setting pieces of notification information on the respective channels of channel #1 to channel #n as in FIG. 5. The format of notification information illustrated in FIG. 6 is different from FIG. 5 in configuration of fields included in the pieces of notification information on the respective channels of channel #1 to channel #n.

The "notification information on channel #1" field includes a "controllable interference information" field and Y "uncontrollable interference information" fields.

In the "controllable interference information" field, information on controllable interference, such as a detection result of an interference amount of the controllable interference is set. For example, in a "controllable interference information" field, a value indicating a mean of interference amounts of controllable interference detected respectively in relay node #Y and Y−1 relay nodes downstream of relay node #Y is set.

Y "uncontrollable interference information" fields are associated with relay node #Y, and Y−1 relay nodes downstream of relay node #Y, respectively. In the "uncontrollable interference information" field associated with relay node #Y, for example, information on uncontrollable interference detected in relay node #Y, such as a detection result of an interference amount of the controllable interference in relay node #Y is set. Likewise, in the "uncontrollable interference information" field associated with relay node #i ("i" represents an integer between 1 to Y−1), information on the uncontrollable interference detected in relay node #i, such as a detection result of an interference amount of controllable interference in relay node #i is set, for example.

For example, relay node #Y receives notification information including a detection result of a downstream relay node from the downstream relay node. Then, relay node #Y generates notification information to be transmitted to a relay node upstream of relay node #Y or a GW, by integrating the detection result of the downstream relay node included in the received notification information with a detection result of relay node #Y.

Note that, a node with no downstream relay node (end node) transmits notification information including a detection result detected by the end node to an upstream relay node.

Figure 7:
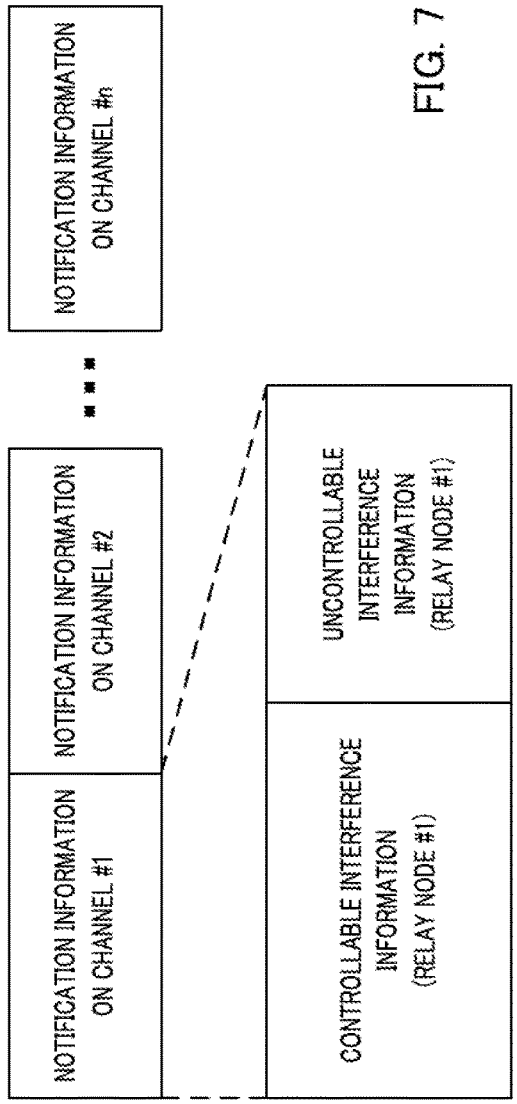
FIG. 7 is a diagram illustrating an example of a format of notification information of an end node corresponding to FIG. 5.

FIG. 7 is a diagram illustrating a format example of notification information of an end node corresponding to FIG. 5. The format illustrated in FIG. 7 is a format of transmission notification information transmitted to an upstream node from relay node #1, which is the end node, for example.

The format of notification information illustrated in FIG. 7 includes fields for setting pieces of notification information on the respective channels of channel #1 to channel #n as in FIGS. 5 and 6. The format of notification information illustrated in FIG. 7 is different from FIGS. 5 and 6 in configuration of fields included in the pieces of notification information on the respective channels of channel #1 to channel #n.

The "notification information on channel #1" field includes a "controllable interference information" field and one "uncontrollable interference information" field.

In the "controllable interference information" field, information on controllable interference, such as a detection result of an interference amount of the controllable interference is set. For example, in a "controllable interference information" field, a value indicating an interference amount of controllable interference detected in relay node #1 is set.

One "uncontrollable interference information" field is associated with relay node #1, for example. In the "uncontrollable interference information" field associated with relay node #1, for example, information on uncontrollable interference detected in relay node #1, such as a detection result of an interference amount of the controllable interference in relay node #1 is set.

Relay node #1 transmits notification information using the format illustrated in FIG. 7 to relay node #2. Relay node #2 generates, using the format (Y−2) illustrated in FIG. 6, notification information to be transmitted to a relay node upstream of relay node #1 or a GW, by integrating the detection result of relay node #1 included in the received notification information with a detection result of detection by relay node #2. As described above, notification of information resulting from integration of detection results of detection performed by the respective relay nodes under the GW is provided to a GW by transmission of notification information from a downstream relay node to an upstream relay node.

Note that, in Variation 1-1 of notification information described above, a format example provided with one "controllable interference information" field has been illustrated. Hereinafter, a format example provided with a plurality of "controllable interference information" fields will be described in Variation 1-2 of notification information.

<Variation 1-2 of Notification Information>

Figure 8:
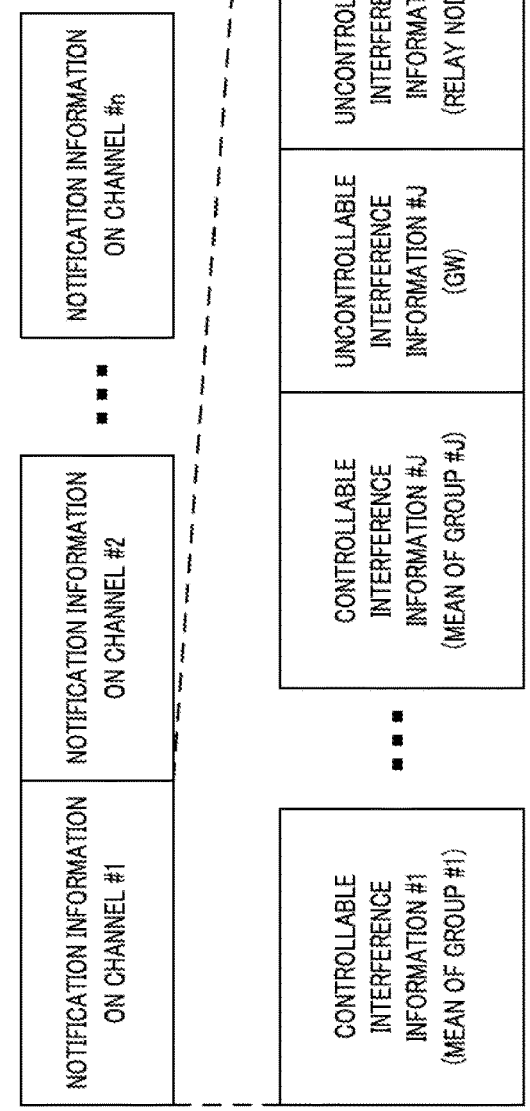
FIG. 8 is a diagram illustrating Example 1-2 of the format of notification information of a GW, according to the embodiment of the present disclosure.

FIG. 8 is a diagram illustrating Example 1-2 of a format of notification information of a GW, according to the present embodiment. The format illustrated in FIG. 8 indicates a format example of transmission notification information in a GW. Note that, in the format in FIG. 8, the same fields as those of the format illustrated in FIG. 8 will not be described.

The format illustrated in FIG. 8 is provided with J ("J" represents an integer greater than or equal to 2) "controllable interference information" fields.

J "controllable interference information" fields are fields notifies a plurality of (J pieces) of information on controllable interference, respectively.

In a case that the nodes (relay nodes and GW) included in a relay network, for example, are classified into J groups, then J "controllable interference information" fields may be associated with the J groups. In a "controllable interference information" field, a mean value of interference amounts of controllable interference in the nodes included in a corresponding group may be set.

The information on a group to which each node belongs, for example, may be known among nodes. Then, in integration processing of notification information, each node updates controllable interference information on the basis of controllable interference detected by the node itself for the controllable interference information" field associated with the group to which the node itself belongs.

Note that, although illustration is omitted, in the format of notification information of relay node #Y corresponding to FIG. 8, as in FIG. 6, the "controllable interference information" field is set with a value indicating a mean corresponding to a group to which each node belongs for the interference amounts of controllable interference detected respectively in relay node #Y and Y−1 relay nodes downstream of relay node #Y. Further, FIG. the format of notification information of an end node corresponding to FIG. 8 is the same as that in FIG. 7.

<Example of Flow According to Variation 1>

A processing flow in radio communication apparatus 100 generating notification information of the format in FIG. 5 will be described.

Figure 9:
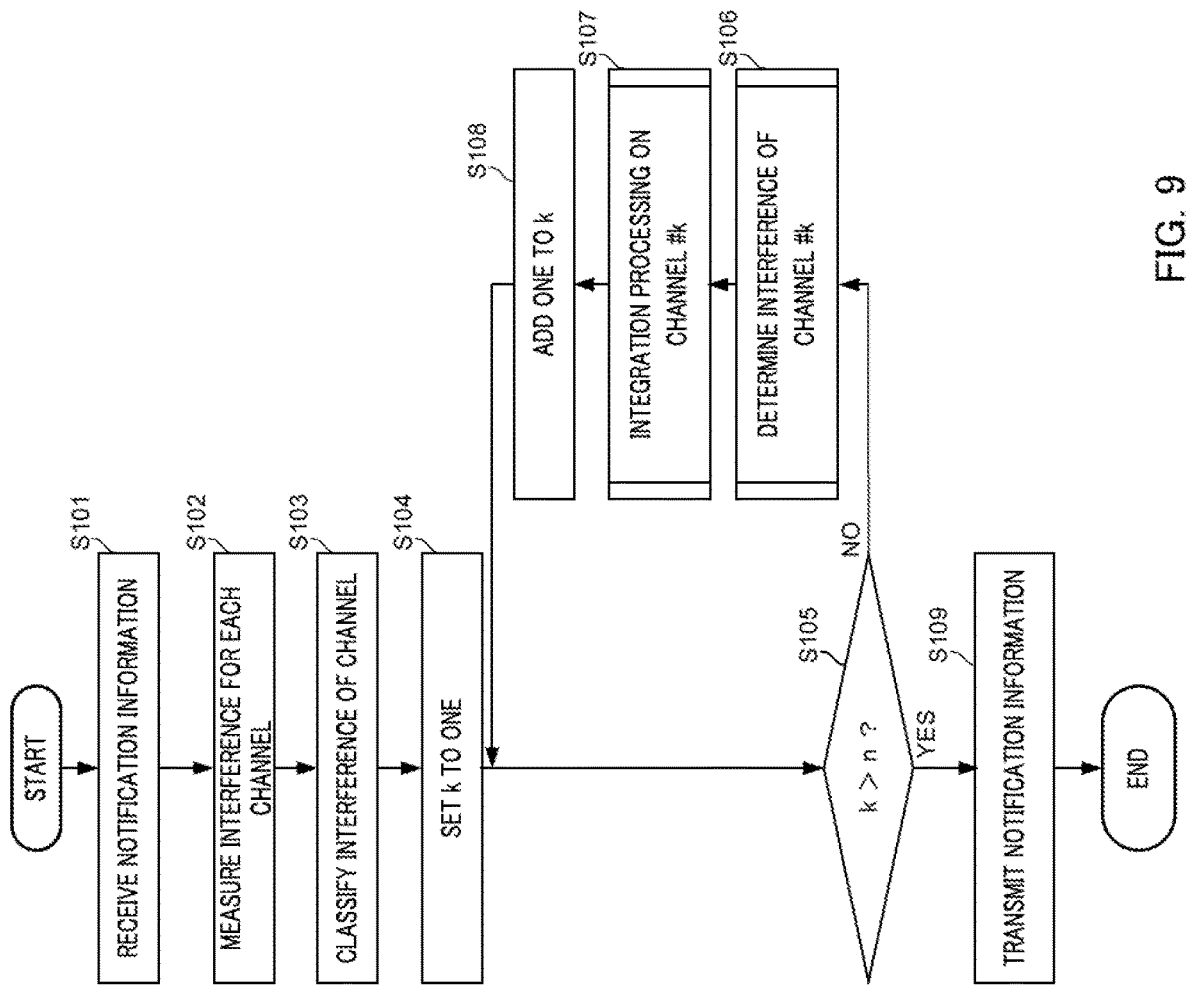
FIG. 9 is a flowchart illustrating a first example of notification information generation processing according the embodiment of the present disclosure.

FIG. 9 is a flowchart illustrating a first example of notification information generating processing according to the present embodiment. The flow illustrated in FIG. 9 is performed prior to notification timing of notification information, for example.

Radio communication apparatus 100 receives notification information from a subordinate relay node (S101).

Radio communication apparatus 100 measures interference for each channel (S102).

Radio communication apparatus 100 classifies interference for the interference measured for each channel (S103). Radio communication apparatus 100 herein classifies the interference measured for each channel into controllable interference and uncontrollable interference.

In S104 and after S104, processing on the classified interference is performed for each channel.

Radio communication apparatus 100 sets k=1 (S104). The term "k" is an index of the channel corresponding to the identification number of the channel.

Radio communication apparatus 100 determines whether k is greater than n (S105). The term "n" represents the number of channels included in a usable band and to be monitored. In other words, in S105, whether or not the processing on the classified interference is complete is determined in all the channels to be monitored.

When k is not greater than n (NO in S105), radio communication apparatus 100 determines interference of channel #k and performs determination processing on channel #k (S106). The determination processing in S106 includes, for example, generation of controllable interference information on channel #k and generation of uncontrollable interference information on channel #k in radio communication apparatus 100. Note that, the determination processing in S106 will be described later.

Radio communication apparatus 100 performs integration processing for the controllable interference information and uncontrollable interference information generated by radio communication apparatus 100 and the controllable interference information and uncontrollable interference information included in the received notification information (S107). The integration processing in S107 includes, for example, integration processing for controllable interference information and integration processing for uncontrollable interference information, transmitted by radio communication apparatus 100. Note that, the integration processing in S107 will be described later.

Radio communication apparatus 100 adds 1 to k (S108). The flow then returns to processing of S105.

When k is greater than n (YES in S105), i.e., when determination processing for the interference classified by radio communication apparatus 100 and the integration processing for the information transmitted by radio communication apparatus 100 are complete in all the channels to be monitored, notification information including the integrated information is transmitted to an upstream node (S109).

The flow illustrated in FIG. 9 then ends.

Note that, the flow illustrated in FIG. 9 indicates processing in each node except for an end node. For example, when radio communication apparatus 100 is the end node, processing of S101 and S107 may be omitted.

<Examples of Flow of Processing in S106>

Next, the flow of processing executed in S106 of FIG. 9 will be described.

Figure 10:
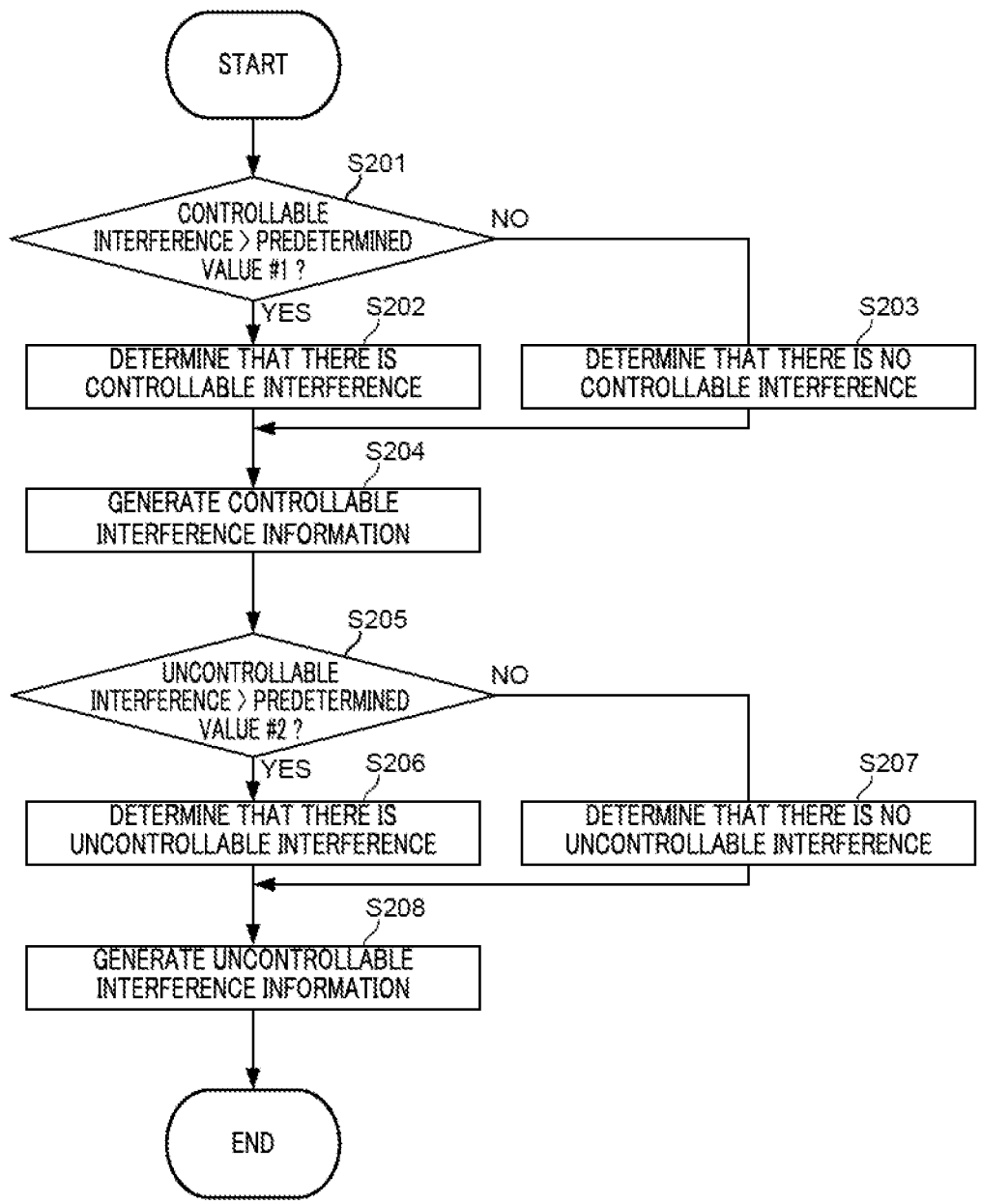
FIG. 10 is a flowchart illustrating a first example of processing to be executed in S106 of FIG. 9.

FIG. 10 is a flowchart illustrating first example of the processing executed in S106 of FIG. 9.

Radio communication apparatus 100 determines whether the interference amount of controllable interference is greater than predetermined value #1 (S201).

When the interference amount of controllable interference is greater than predetermined value #1 (YES in S201), radio communication apparatus 100 determines that there is controllable interference (S202).

When the interference amount of controllable interference is not greater than predetermined value #1 (NO in S201), radio communication apparatus 100 determines that there is no controllable interference (S203).

Radio communication apparatus 100 generates controllable interference information (e.g., controllable interference information on channel #k) for each channel in radio communication apparatus 100 based on the determination result of S202 or S203 (S204). Note that, the controllable interference information for each channel is used in S107 described above. Further, the controllable interference information on each channel may indicate "1" or "0" according to the presence or absence of controllable interference for each channel, for example. Alternatively, the controllable interference information on each channel may indicate the interference amount of the controllable interference when there is controllable interference, and indicate "0" when there is no controllable interference.

Radio communication apparatus 100 determines whether the interference amount of uncontrollable interference is greater than predetermined value #2 (S205).

When the interference amount of uncontrollable interference is greater than predetermined value #2 (YES in S205), radio communication apparatus 100 determines that there is uncontrollable interference (S206).

When the interference amount of uncontrollable interference is not greater than predetermined value #2 (NO in S205), radio communication apparatus 100 determines that there is no uncontrollable interference (S207).

Radio communication apparatus 100 generates uncontrollable interference information in radio communication apparatus 100 based on the determination result of S206 or S207 (S208). Note that, the controllable interference information on each channel is used in S107 described above. Further, the controllable interference information on each channel may indicate "1" or "0" according to the presence or absence of the controllable interference for each channel, for example. Alternatively, the controllable interference information each channel may indicate the interference amount of the controllable interference when there is controllable interference and indicate "0" when there is no controllable interference.

Upon completion of the processing of S208, determination for the interference for channel #k is complete, and the flow in FIG. 10 ends. For example, in this instance, the processing shifts to S107 in the flow of FIG. 9.

<Example of Flow of Processing in S107>

Next, the flow of processing executed in S107 of FIG. 9 will be described.

Figure 11:
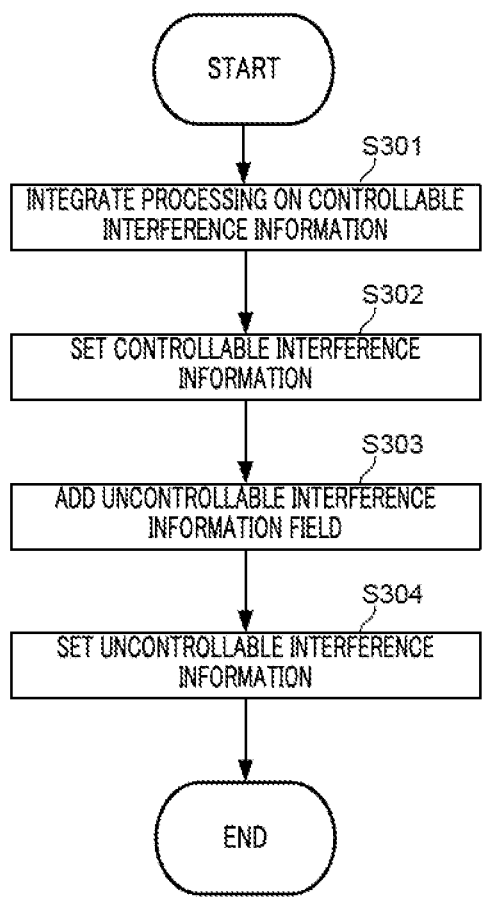
FIG. 11 is a flowchart illustrating a first example of processing to be executed in S107 of FIG. 9.

FIG. 11 is a flowchart illustrating first example of the processing executed in S107 of FIG. 9.

Radio communication apparatus 100 performs integration processing of controllable interference information (S301). For example, radio communication apparatus 100 determines a mean value (hereinafter, sometimes referred to as γ) of the interference amount indicated by the controllable interference information included in the received notification information (hereinafter, sometimes referred to as a) and the interference amount of the controllable interference information generated in radio communication apparatus 100 (hereinafter, sometimes referred to as β).

The interference amount (a) indicated by the controllable interference information included in the received notification information indicates a mean value of the interference amounts of controllable interference in nodes under radio communication apparatus 100, herein. Therefore, radio communication apparatus 100 determines the mean value corresponding to the number of nodes under radio communication apparatus 100. When the number of nodes under radio communication apparatus 100 is Z, for example, γ is expressed as γ={(α×Z)+β}/(Z+1).

Radio communication apparatus 100 sets the controllable interference information (mean value γ) after the integration processing in the "controllable interference information" field of the notification information transmitted by radio communication apparatus 100 (S302).

Radio communication apparatus 100 adds an "uncontrollable interference information" field to the received notification information (S303).

Radio communication apparatus 100 sets the uncontrollable interference information in radio communication apparatus 100 to the added "uncontrollable interference information" field (S304).

Upon completion of the processing of S304, the integration processing for the interference information on channel #k is complete, and the flow of FIG. 8 ends. For example, in this instance, the process shifts to S108 in the flow of FIG. 9.

In Variation 1 described above, notification of the result of classifying the interference detected by a GW and relay nodes is provided. Then, in the uncontrollable interference information of notification information, notification of a result of each node is provided, and in the controllable interference information, notification of a mean among the nodes is provided, so that notification of an interference detection result can be appropriately provided by each apparatus in a network where relay nodes are provided in a band used by various radio systems. Further, in this notification, notification of a mean among the nodes is provided, so that the information amount of notification information can be reduced.

The controllable interference is interference caused by a signal transmitted from a controllable terminal and is controllable, so that an NW (e.g., control apparatus) may determine a channel resource required for each node, for example. Therefore, controllable interference information may be the notification of a mean among the nodes, and notification of a result of each node may not be provided. Meanwhile, the uncontrollable interference is interference caused by a signal transmitted from an uncontrollable terminal and is not controllable, notification of a result of each node may be provided.

<Variation 2-1 of Notification Information>

In Variation 2-1 of notification information, for example, notification of a statistical value of a detection result of uncontrollable interference of each node is provided in one "uncontrollable interference information" field. Hereinafter, an example of providing notification of the minimum value of uncontrollable interference of each node in the "uncontrollable interference information" field will be described.

Figure 12:
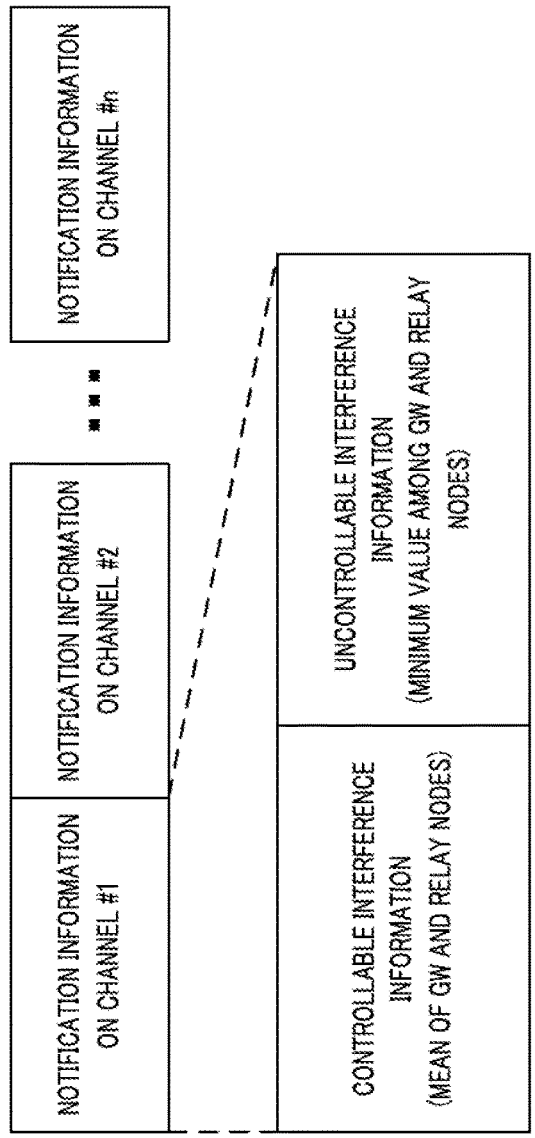
FIG. 12 is a diagram illustrating Example 2-1 of the format of notification information of a GW, according to the embodiment of the present disclosure.

FIG. 12 is a diagram illustrating Example 2-1 of the format of notification information of a GW, according to the present embodiment GW. Note that, in the format in FIG. 12, the same fields as those of the format illustrated in FIG. 5 will not be described.

In the format of notification information illustrated in FIG. 12, in the fields included in the pieces of notification information on the respective channels of channel #1 to channel #n, the "controllable interference information" fields are the same as those in FIG. 5, but information included in the "uncontrollable interference information" fields is different from FIG. 5.

For example, in the "uncontrollable interference information" field, the minimum value among the interference amounts of uncontrollable interference detected by a GW and Z relay nodes under the GW is set.

When the format illustrated in FIG. 12 is applied to the format of transmission notification information of a GW, a format associated with FIG. 12 may be applied to the format of transmission notification information of relay nodes under the GW.

Figure 13:
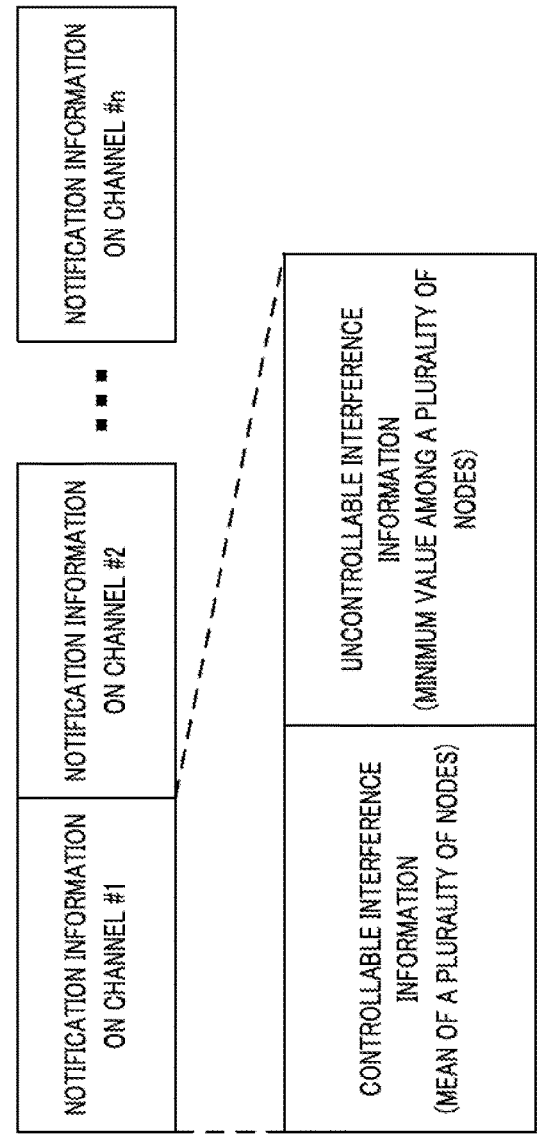
FIG. 13 is a diagram illustrating an example of a format of notification information of a relay node corresponding to FIG. 12.

FIG. 13 is a diagram illustrating a format example of notification information of relay nodes corresponding to FIG. 12. The format illustrated in FIG. 13 is a format of transmission notification information to be transmitted to an upstream node from relay node #Y, for example.

In the format of notification information illustrated in FIG. 13, in the fields included in the pieces of notification information on the respective channels of channel #1 to channel #n, the "controllable interference information" fields are the same as those in FIG. 6, but information included in the "uncontrollable interference information" fields is different from FIG. 6.

For example, in the "uncontrollable interference information" field, the minimum value among the interference amounts of uncontrollable interference detected by relay node #Y and Y−1 relay nodes downstream of relay node #Y, respectively, is set.

In a node having no downstream relay node (end node), notification information including a detection result of detection performed by the end node is transmitted to an upstream relay node. The format of transmission notification information of an end node is the same as that in FIG. 7.

Generally, an NW (e.g., control apparatus (see FIG. 1)) assigns, to a GW that has a relay node under the GW that has detected that uncontrollable interference for a certain channel is relatively small, the certain channel. Therefore, the GW can reduce interference information amount provided as notification from the NW and determine whether the channel is assignable, by providing notification of the minimum value of uncontrollable interference of each node including the GW and relay nodes under the GW to the NW.

In Variation 2-1 of the above described notification information, a format example provided with one "uncontrollable interference information" field is described. Hereinafter, in Variation 2-2 of notification information, a format example provided with a plurality of "uncontrollable interference information" fields will be described.

<Variation 2-2 of Notification Information>

In Variation 2-2 of notification information, notification of a statistical value of a detection result of uncontrollable interference of each node is provided in a plurality of "uncontrollable interference information" fields. For example, the J-th smallest value from the smallest value (i.e., the minimum value) of the uncontrollable interference may be set in each of J pieces of "uncontrollable interference information" fields.

FIG. 14 is a diagram illustrating a fourth example of the format of notification information of a GW, according to the present embodiment. Note that, in the format in FIG. 14, the same fields as those of the format illustrated in FIG. 12 will not be described.

The format illustrated in FIG. 14 is provided with J ("J" represents an integer greater than or equal to 2) "uncontrollable interference information" fields.

In the J "controllable interference information" fields, the smallest value (minimum value) to the J smallest value among the interference amounts of uncontrollable interference detected by a GW and Z relay nodes under the GW, respectively, are set.

When the format illustrated in FIG. 14 is applied to the format of transmission notification information of a GW, a format associated with FIG. 14 may be applied to the format of transmission notification information of relay nodes under the GW.

FIG. 15 is a diagram illustrating a format example of notification information of relay nodes corresponding to FIG. 14. The format illustrated in FIG. 15 is a format of transmission notification information to be transmitted to an upstream node from relay node #Y, for example.

For example, in the J "uncontrollable interference information" fields, the smallest value (minimum value) to the J smallest value among the interference amounts of uncontrollable interference detected by relay node #Y and Y−1 relay nodes downstream of relay node #Y, respectively, are set.

Note that, when the condition is Y<J, for example, that is, when the number of nodes including a downstream node and the node itself is less than J (e.g., when J−i node(s)), there is no value to be set for some (e.g., i field(s)) of J "uncontrollable interference information" fields. In this case, "uncontrollable interference information" fields in accordance with the number of nodes including a downstream node and the node itself may be provided, or dummy data may be set in a field where no value of an interference amount is set. Note that, in a case that the number of nodes including a downstream node and the node itself does not meet J nodes, notification of the interference amounts of the uncontrollable interference detected in a downstream node and the node itself may all be provided by "uncontrollable interference information" fields.

Generally, an NW (e.g., control apparatus (see FIG. 1)) assigns, to a GW that has a relay node under the GW that has detected that uncontrollable interference for a certain channel is relatively small, the certain channel. Therefore, the NW can perform more appropriate channel assignment by providing, from the GW, notification of a statistical value of a detection result of uncontrollable interference of each node including the GW and relay nodes under the GW to the NW.

In a node having no downstream relay node (end node), notification information including a detection result of detection performed by the end node is transmitted to an upstream relay node. The format of transmission notification information of an end node is the same as that in FIG. 7.

<Example of Flow According to Variation 2>

A processing flow in radio communication apparatus 100 for generating notification information of the above format in FIG. 12 or 13 will be described.

The processing flow in radio communication apparatus 100 for generating the notification information of the above format in FIG. 12 or 13 is the same as FIG. 9 illustrated in Variation 1. When the notification information of the above format in FIG. 12 or 13 is generated, however, the processing of S107 in FIG. 9 is different from Variation 1. Hereinafter, the processing of S107 in FIG. 9 will be described.

<Example of Flow of Processing in S107>

Figure 16:
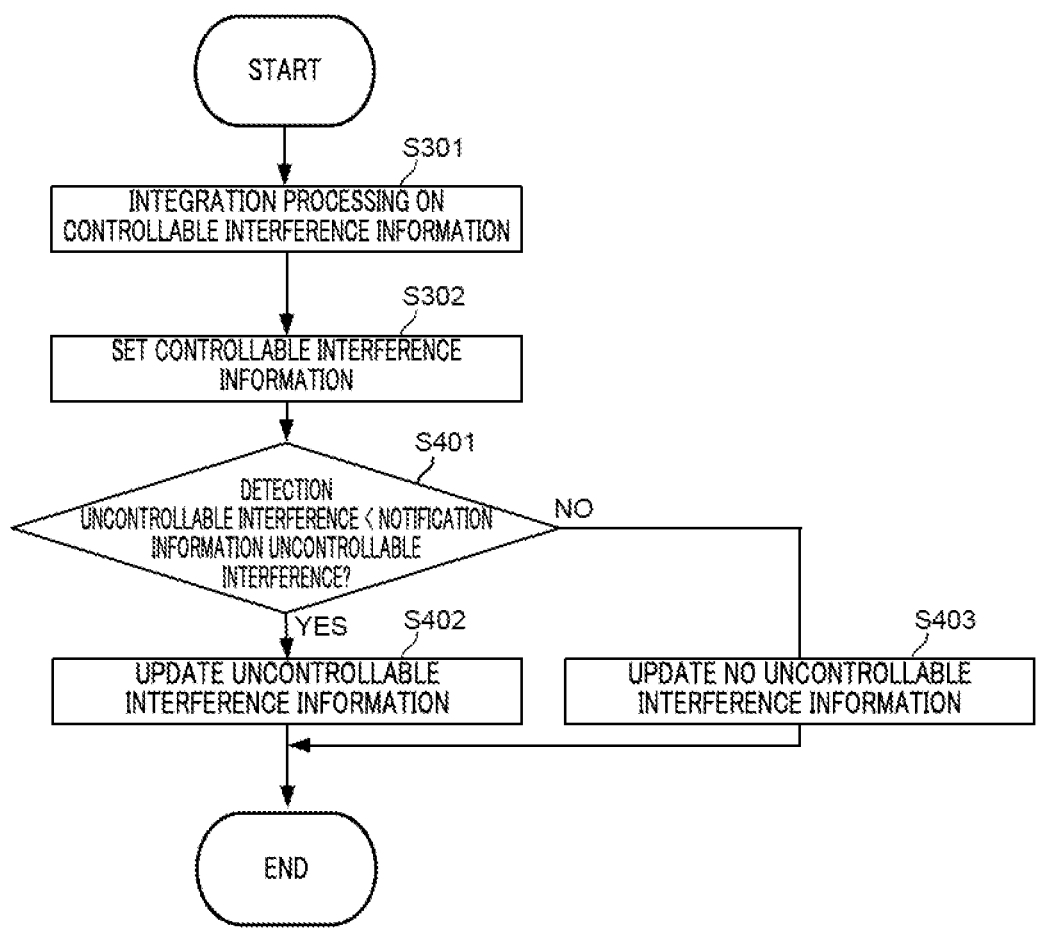
FIG. 16 is a flowchart illustrating a second example of the processing to be executed in S107 of FIG. 9.

FIG. 16 is a flowchart illustrating a second example of the processing to be executed in S107 of FIG. 9. Note that, in FIG. 16, the processing similar to that in FIG. 11 is denoted by the same reference numeral and its description may be omitted.

In the flow of FIGS. 16, S303 and S304 in FIG. 11 are replaced with S401 to S403.

Radio communication apparatus 100 determines whether or not uncontrollable interference in radio communication apparatus 100 (detection uncontrollable interference) is smaller than uncontrollable interference of the received notification information uncontrollable (notification information uncontrollable interference (S401).

When the uncontrollable interference in radio communication apparatus 100 is smaller than the uncontrollable interference of the received notification information (YES in S401), radio communication apparatus 100 sets the uncontrollable interference in radio communication apparatus 100 in an "uncontrollable interference information" field and updates the uncontrollable interference information of the notification information (S402). With this updates, the uncontrollable interference information of the notification information indicates the minimum value of the uncontrollable interference measured in radio communication apparatus 100 and the relay nodes under radio communication apparatus 100.

When the uncontrollable interference in radio communication apparatus 100 is not smaller than the uncontrollable interference of the received notification information (NO in S401), radio communication apparatus 100 does not update the uncontrollable interference of the notification information (S403).

Upon completion of the processing in S402 or S403, the integration processing of the interference information on channel #k is complete, and the flow of FIG. 16 ends. For example, in this instance, the processing shifts to S108 in the flow of FIG. 9.

In Variation 2 described above, notification of a result of classification of the interference detected by the GW and relay nodes is provided. Then, in the uncontrollable interference information of the notification information, notification of a relatively small value not less than 1 among the uncontrollable interference of each node is provided, and in the controllable interference information, notification of a mean among the nodes is provided. Accordingly, in a band used by various radio systems, notification of an interference detection result can be appropriately provided by each apparatus in a network where a relay node is provided. Further, in this notification, for controllable interference information, notification of a mean among the nodes is provided, and for uncontrollable interference information, notification of a relatively small value not less than 1 among the uncontrollable interference of each node is provided. Thus, the information amount of notification information can be reduced.

For example, uncontrollable interference is interference caused by a signal transmitted from an uncontrollable terminal and is thus uncontrollable, but when the minimum value (or relatively small value not less than 1 including the minimum value) included in the notification information is smaller than a threshold, for example, it is possible to determine that the effect of the uncontrollable interference is small and that a channel corresponding to the minimum value is assignable.

<Variation 3-1 of Notification Information>

In Variation 3-1 of notification information, notification of the number of nodes that have detected uncontrollable interference less than a threshold is provided in one "uncontrollable interference information" field.

Figure 17:
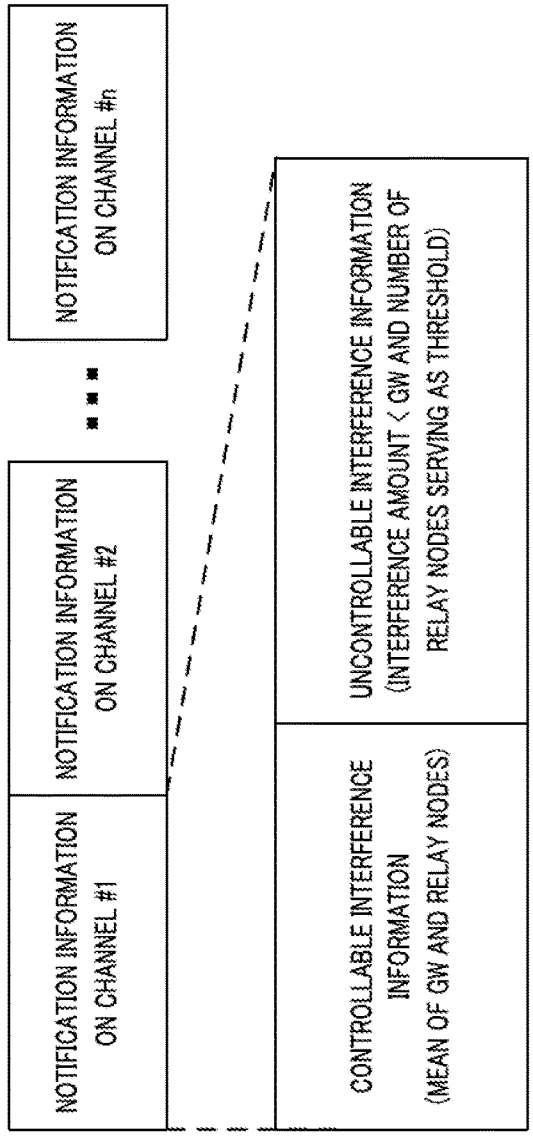
FIG. 17 is a diagram illustrating Example 3-1 of the format of notification information of a GW, according to the embodiment of the present disclosure.

FIG. 17 is a diagram illustrating Example 3-1 of the format of transmission notification information of a GW, according to the present embodiment. The format illustrated in FIG. 17 is a format example of transmission notification information in a GW. Note that, in the format in FIG. 17, the same fields as those of the format illustrated in FIG. 5 will not be described.

In the format of notification information illustrated in FIG. 17, in the fields included in the pieces of notification information on the respective channels of channel #1 to channel #n, the "controllable interference information" fields are the same as those in FIG. 5, but information included in the "uncontrollable interference information" fields is different from FIG. 5.

For example, in the "uncontrollable interference information" field, the number of nodes (GW and relay nodes) that have detected an interference amount less than a threshold among the interference amounts of uncontrollable interference detected by a GW and Z relay nodes under the GW is set.

When the format illustrated in FIG. 17 is applied to the format of transmission notification information of a GW, a format associated with FIG. 17 may be applied to the format of transmission notification information of relay nodes under the GW.

Figure 18:
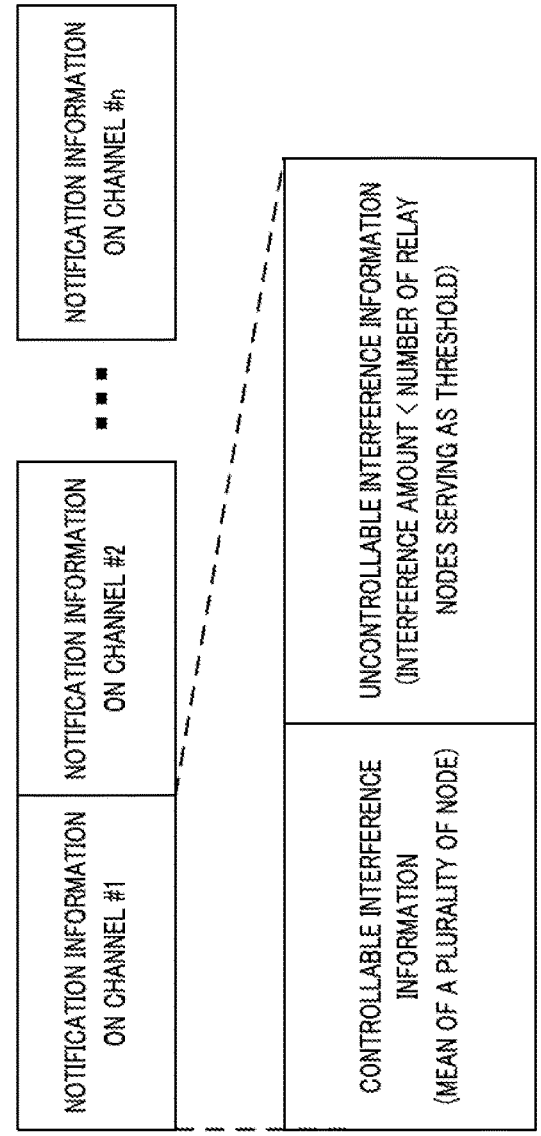
FIG. 18 is a diagram illustrating an example of a format of notification information of a relay node corresponding to FIG. 17.

FIG. 18 is a diagram illustrating a format example of notification information of relay nodes corresponding to FIG. 17. The format illustrated in FIG. 18 is a format of transmission notification information to be transmitted to an upstream node from relay node #Y, for example.

In the format of notification information illustrated in FIG. 18, in the fields included in the pieces of notification information on the respective channels of channel #1 to channel #n, the "controllable interference information" fields are the same as those in FIG. 6, but information included in the "uncontrollable interference information" fields is different from FIG. 6.

For example, in the "uncontrollable interference information" field, the number of nodes that have detected an interference amount less than a threshold among the interference amounts of uncontrollable interference detected respectively in relay node #Y and Y−1 relay nodes downstream of relay node #Y is set.

Note that, in a node having no downstream relay node (end node), notification information including a detection result of detection performed by the end node is transmitted to an upstream relay node. The format of transmission notification information of an end node is the same as that in FIG. 7. In an "uncontrollable interference information" field included in the format of transmission notification information of the end node, however, "1" may be set when the interference amount of uncontrollable interference detected in the end node is less than a threshold, and "0" may be set when the interference amount thereof is not less than the threshold.

<Variation 3-2 of Notification Information>

In Variation 3-2 of notification information, notification of the number of nodes that have detected uncontrollable interference less than a threshold is provided in one "uncontrollable interference information" field, and notification of the information indicating the number of nodes is provided in a "node number information" field.

Figure 19:
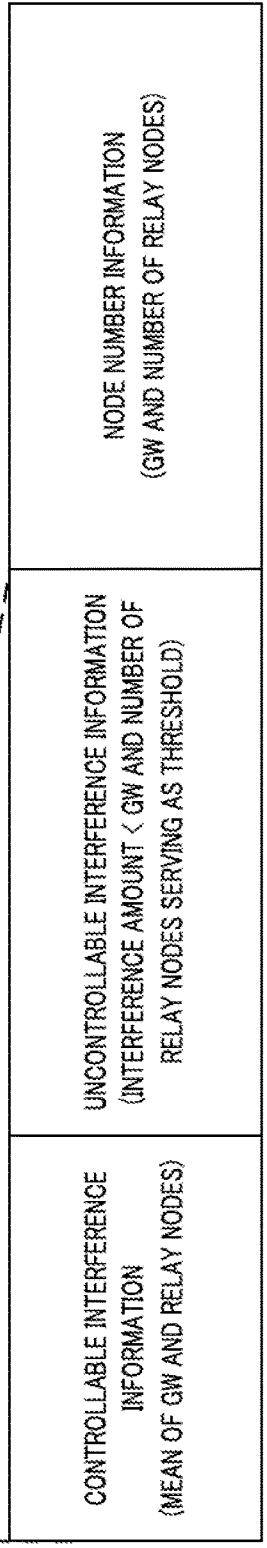
FIG. 19 is a diagram illustrating Example 3-2 of the format of notification information of a GW, according to the embodiment of the present disclosure.

FIG. 19 is a diagram illustrating Example 3-2 of the format of transmission notification information of a GW, according to the present embodiment. The format illustrated in FIG. 19 is a format example of transmission notification information in a GW. Note that, in the format in FIG. 19, the same fields as those of the format illustrated in FIGS. 5 and 7 will not be described.

In the format of notification information illustrated in FIG. 19, in the fields included in the pieces of notification information on the respective channels of channel #1 to channel #n, the "controllable interference information" fields are the same as those in FIG. 5, and the "uncontrollable interference information" fields are the same as those in FIG. 17. The format of notification information illustrated in FIG. 19 includes a "node number information" field.

For example, in the "node number information" field, the number of nodes including a GW and relay nodes under the GW is set. For example, when Z relay nodes are present under the GW, "Z+1" is set in the "node number information" field.

When the format illustrated in FIG. 19 is applied to the format of transmission notification information of a GW, a format associated with FIG. 17 may be applied to the format of transmission notification information of relay nodes under the GW.

Figure 20:
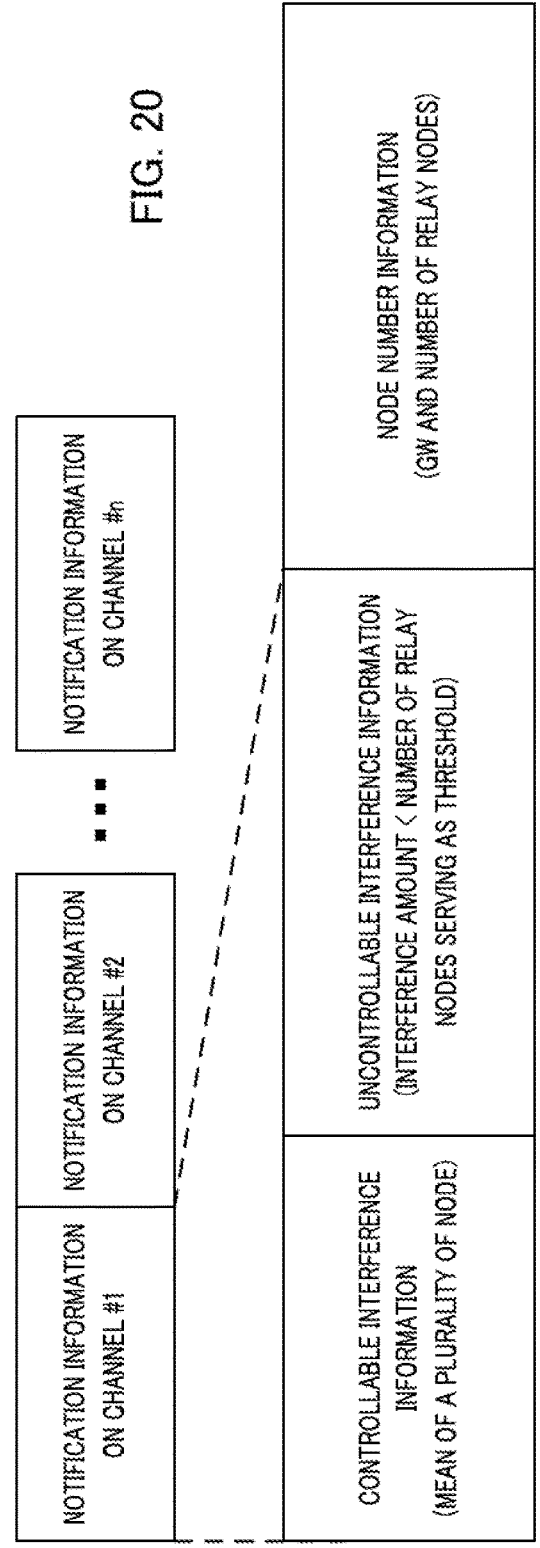
FIG. 20 is a diagram illustrating an example of a format of notification information of a relay node corresponding to FIG. 19.

FIG. 20 is a diagram illustrating a format example of notification information of relay nodes corresponding to FIG. 19. The format illustrated in FIG. 20 is a format of transmission notification information to be transmitted to an upstream node from relay node #Y, for example.

In the format of notification information illustrated in FIG. 20, in the fields included in the pieces of notification information on the respective channels of channel #1 to channel #n, the "controllable interference information" fields are the same as those in FIG. 6, and the "uncontrollable interference information" fields are the same as those in FIG. 18. The format of notification information illustrated in FIG. 20 includes a "node number information" field.

For example, in the "node number information" field, the number of nodes including relay node #Y and relay nodes under relay node #Y is set. For example, when Y−1 relay nodes are present under relay node #Y, "Y" is set in the "node number information" field.

Note that, in a node having no downstream relay node (end node), notification information including a detection result of detection performed by the end node is transmitted to an upstream relay node. The format of transmission notification information of an end node is the same as that in FIG. 7. In an "uncontrollable interference information" field included in the format of transmission notification information of the end node, however, "1" may be set when the interference amount of uncontrollable interference detected in the end node is less than a threshold, and "0" may be set when the interference amount thereof is not less than the threshold. Alternatively, the format of transmission notification information of an end node may include a "node number information" field as in FIGS. 19 and 20. In this case, "1" may be set in the "node number information" field.

Providing notification of the information indicating the number of nodes in the "node number information" field makes it possible to more accurately manage interference conditions, with an increase of a small interference information amount in a case where the number of relay nodes in operation changes from time to time and moment to moment. For example, the case where the number of relay nodes in operation changes from time to time includes a case where a relay node is added or deleted in accordance with a situation where traffic (e.g., the number of terminals and communication amounts of terminals) in the communication area increases and decreases. The case where a relay node is added, for example, includes a case where a relay node is temporarily installed and a case where a relay node that is not active is activated. The case where a relay node is deleted, for example, includes a case where a temporarily installed relay node is removed (moved) and a case where an active relay node that is deactivated. For example, it is effective in stadiums, theme parks, shopping malls, stations, large event locations, and/or the like where the number of relay nodes in operation possibly changes (e.g., traffic is expected to increase or decrease). Likewise, it is also effective in disaster situations.

<Example of Flow According to Variation 3>

A processing flow in radio communication apparatus 100 for generating notification information of the above format in FIG. 17 or 18 will be described.

The processing flow in radio communication apparatus 100 for generating the notification information of the above format in FIG. 17 or 18 is the same as FIG. 9 illustrated in Variation 1. When the notification information of the above format in FIG. 17 or 18 is generated, however, the processing of S107 in FIG. 9 is different from Variation 1. Hereinafter, the processing of S107 in FIG. 9 will be described.

<Example of Flow of Processing in S107>

Figure 21:
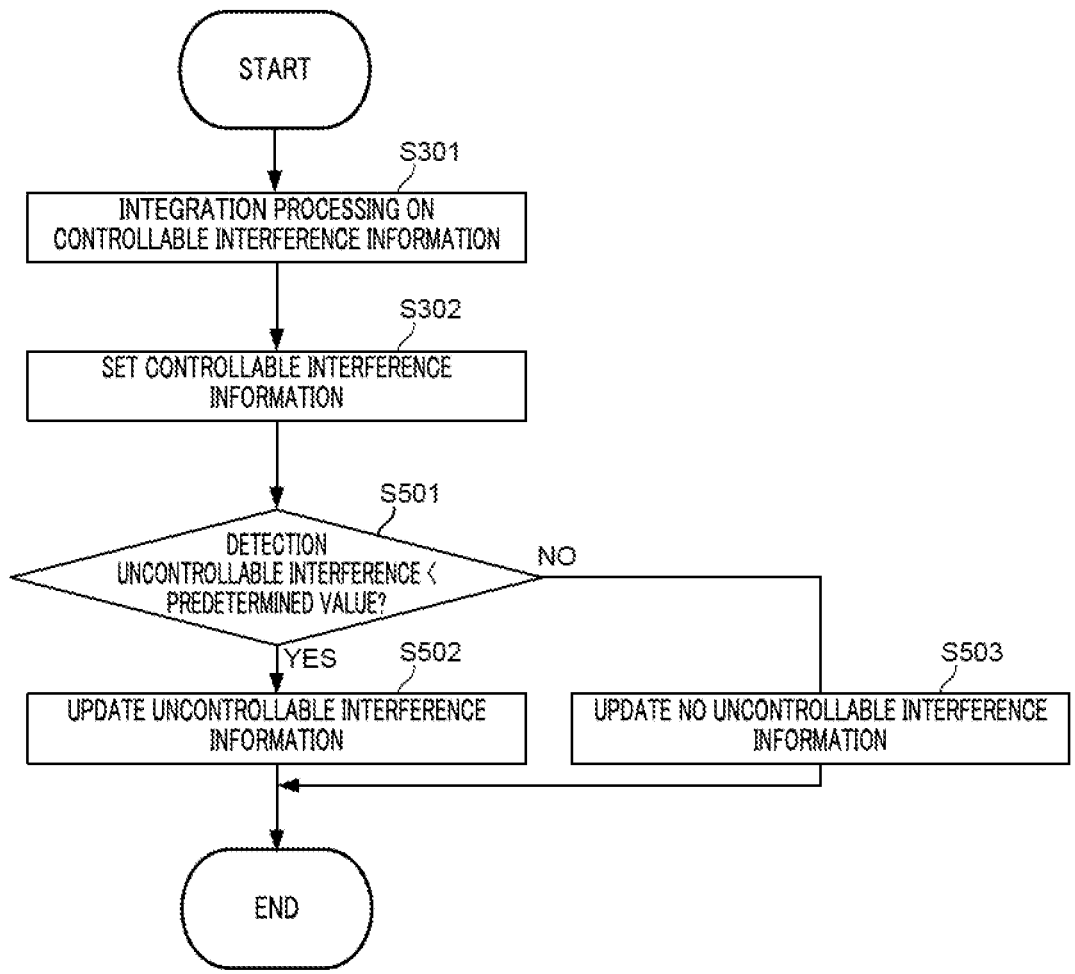
FIG. 21 is a flowchart illustrating a third example of the processing to be executed in S107 of FIG. 9.

FIG. 21 is a flowchart illustrating a third example of the processing to be executed in S107 of FIG. 9. Note that, in FIG. 21, the processing similar to that in FIG. 11 is denoted by the same reference numeral and its description may be omitted.

In the flow of FIGS. 21, S303 and S304 in FIG. 11 are replaced with S501 to S503.

Radio communication apparatus 100 determines whether or not uncontrollable interference in radio communication apparatus 100 (detection uncontrollable interference) is less than a predetermined value (S501).

When the uncontrollable interference in radio communication apparatus 100 is less than the predetermined value (YES in S501), radio communication apparatus 100 updates the uncontrollable interference information of the notification information by adding one to the value in an "uncontrollable interference information" field of the notification information (S502).

When the uncontrollable interference in radio communication apparatus 100 is not less than the predetermined value (NO in S501), radio communication apparatus 100 does not update the uncontrollable interference information of the notification information (S503).

Upon completion of the processing in S502 or S503, the integration processing of the interference information on channel #k is complete, and the flow of FIG. 21 ends. For example, in this instance, the processing shifts to S108 in the flow of FIG. 9.

In Variation 3 described above, notification of a result of classification of the interference detected by the GW and relay nodes is provided. Then, in the uncontrollable interference information of the notification information, notification of the number of nodes (GW and relay nodes) that have detected an interference amount less than a threshold among the interference amounts of uncontrollable interference detected by the nodes is provided, and in the controllable interference information, notification of a mean among the nodes is provided. Accordingly, in a band used by various radio systems, notification of an interference detection result can be appropriately provided by each apparatus in a network where a relay node is provided. Further, in this notification, for controllable interference information, notification of a mean among the nodes is provided, and for uncontrollable interference information, notification of the number of nodes (GW and relay nodes) is provided. Thus, the information amount of notification information can be reduced.

For example, uncontrollable interference is interference caused by a signal transmitted from an uncontrollable terminal and is thus uncontrollable, but when the number of pieces included in the notification information is greater than a threshold, for example, it is possible to determine that the effect of the uncontrollable interference is small in a corresponding channel and that the channel is assignable.

<Variation 4 of Notification Information>

In Variation 4 of notification information, notification of the number of nodes that have detected uncontrollable interference less than a threshold is provided in one "uncontrollable interference information" field, and notification of information indicating uncontrollable interference of a specific node is provided in a "specific uncontrollable interference information" field.

FIG. 22 is a diagram illustrating Example 4 of the format of transmission notification information of a GW, according to the present embodiment. The format illustrated in FIG. 22 is a format example of transmission notification information in a GW. Note that, in the format in FIG. 22, the same fields as those of the format illustrated in FIGS. 5 and 17 will not be described.

In the format of notification information illustrated in FIG. 22, in the fields included in the pieces of notification information on the respective channels of channel #1 to channel #n, the "controllable interference information" fields are the same as those in FIG. 5, and an "uncontrollable interference information #A" field is the same as the "uncontrollable interference information" field in FIG. 17. The format of notification information illustrated in FIG. 22 includes an "uncontrollable interference information #B" field.

For example, in the "uncontrollable interference information #B" field, information on an interference amount of uncontrollable interference of a specific node among nodes including a GW and relay nodes under the GW is set.

For example, the information on a specific node may be known among the nodes. Each node then determines, in the integration processing of notification information, whether or not the node itself is a specific node, and in a case where the node is a specific node, the node adds an "uncontrollable interference information #B" field in which the interference amount of uncontrollable interference detected in the node itself is set.

When the format illustrated in FIG. 22 is applied to the format of transmission notification information of a GW, a format associated with FIG. 22 may be applied to the format of transmission notification information of relay nodes under the GW.

FIG. 23 is a diagram illustrating a format example of notification information of relay nodes corresponding to FIG. 22. The format illustrated in FIG. 23 is a format of transmission notification information to be transmitted to an upstream node from relay node #Y, for example.

In the format of notification information illustrated in FIG. 23, in the fields included in the pieces of notification information on the respective channels of channel #1 to channel #n, the "controllable interference information" fields are the same as those in FIG. 6, and the "uncontrollable interference information #A" field is the same as the "uncontrollable interference information" field in FIG. 18. The format of notification information illustrated in FIG. 23 includes the "uncontrollable interference information #B" field.

For example, in the "uncontrollable interference information #B" field, the information on the interference amount of uncontrollable interference of a specific node among relay node #Y and relay nodes downstream of relay node #Y is set.

Note that, when no specific node is present among relay node #Y and relay nodes downstream of relay node #Y (e.g., when a specific node is present upstream of relay node #Y), the "uncontrollable interference information #B" field may not be provided, or dummy data may be set in the "uncontrollable interference information #B" field.

Note that, in a node having no downstream relay node (end node), notification information including a detection result of detection performed by the end node is transmitted to an upstream relay node. The format of transmission notification information of an end node is the same as that in FIG. 7. In an "uncontrollable interference information" field included in the format of transmission notification information of the end node, however, "1" may be set when the interference amount of uncontrollable interference detected in the end node is less than a threshold, and "0" may be set when the interference amount thereof is not less than the threshold. Further, when the end node is a specific node, the format of FIG. 7 may include an "uncontrollable interference information #B" field as in FIGS. 22 and 23. Note that, in this case, the information on the interference amount of uncontrollable interference detected in the end node may be set in the "uncontrollable interference information #B" field.

<Example of Flow According to Variation 4>

A processing flow in radio communication apparatus 100 for generating notification information of the above format in FIG. 22 or 23 will be described.

The processing flow in radio communication apparatus 100 for generating the notification information of the above format in FIG. 22 or 23 is the same as FIG. 9 illustrated in Variation 1. When the notification information of the above format in FIG. 22 or 23 is generated, however, the processing of S107 in FIG. 9 is different from Variation 1. Hereinafter, the processing of S107 in FIG. 9 will be described.

<Example of Flow of Processing in S107>

Figure 24:
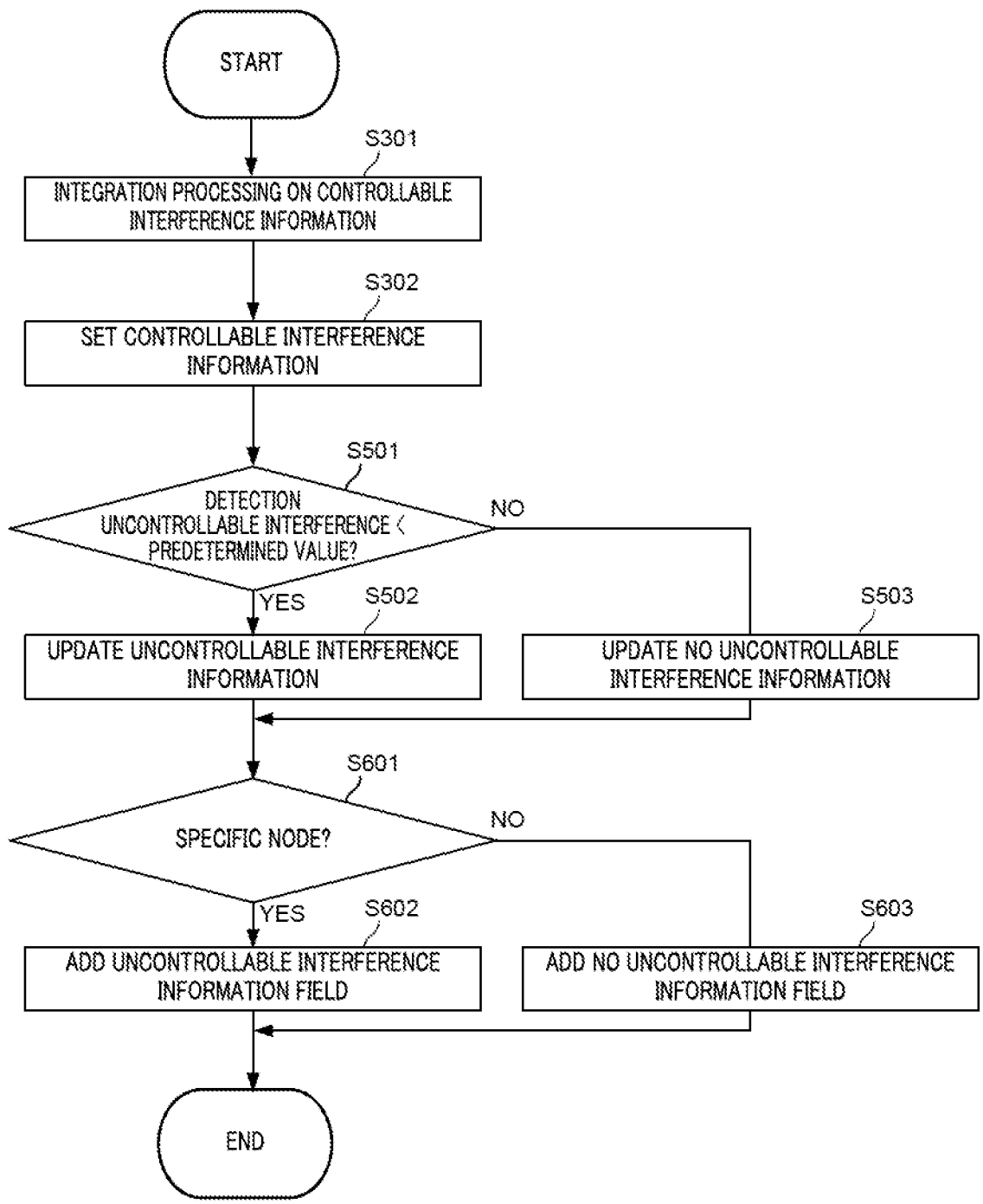
FIG. 24 is a flowchart illustrating a fourth example of the processing to be executed in S107 of FIG. 9.

FIG. 24 is a flowchart illustrating a fourth example of the processing to be executed in S107 of FIG. 9. Note that, in FIG. 24, the processing similar to those in FIGS. 11 and 21 is denoted by the same reference numeral and its description may be omitted.

In the flow of FIG. 24, S601 to S603 are added in FIG. 21.

Radio communication apparatus 100 determines whether radio communication apparatus 100 is designated as a specific node (S601). The information designating a specific node may be included in control information and may be provided to each node as notification, for example.

When radio communication apparatus 100 is designated as a specific node (YES in S601), radio communication apparatus 100 adds an "uncontrollable interference information" field in which the uncontrollable interference in radio communication apparatus 100 is set to the received notification information (S602).

When radio communication apparatus 100 is not designated as a specific node (NO in S601), radio communication apparatus 100 adds does not add an "uncontrollable interference information" field (S603).

Upon completion of the processing in S602 or S603, the integration processing of the interference information on channel #k is complete, and the flow of FIG. 24 ends. For example, in this instance, the processing shifts to S108 in the flow of FIG. 9.

In Variation 4 described above, notification of a result of classification of the interference detected by the GW and relay nodes is provided. Then, in the uncontrollable interference information of the notification information, as in Variation 3, notification of the number of nodes (GW and relay nodes) that have detected an interference amount less than a threshold among the interference amounts of uncontrollable interference detected by the nodes is provided. In Variation 4, in the uncontrollable interference information of notification information, notification of an interference amount for a specific node among the GW and relay nodes is provided. This notification allows an NW to check the uncontrollable interference for the specific node.

For example, a specific node providing important information (services) is present in a relay network, the NW can perform channel assignment based on the interference amount of the uncontrollable interference in the specific node, thus making it possible to improve the communication quality through the specific node. For example, it is effective in a case where an NW monitors information on interference of a specific area at a specific time, detected by a node provided in the specific area where a large event (e.g., sporting event, such as Olympics) is held. For example, monitoring of radiation of an illegal radio wave in the specific area is also possible.

Note that, the information on the specific node may be provided as notification to each node by a higher layer message and/or the like from an NW.

<Variation 5 of Notification Information>

In each variation of notification information described above, a description has been given with an example in which the notification information fields on each channel included in the format of notification information are the same among the channels. The present disclosure is not limited to this example, and the notification information fields may be independently set for each channel. For example, channels may be classified in a plurality of types, and notification information fields may be set for each classified channel. Hereinafter, an example will be described in which channels are classified into three types: a "first specific channel," a "second specific channel," and a "normal channel."

FIG. 25 is a diagram illustrating Example 5 of the format of transmission notification information of a GW, according to the present embodiment. FIG. 25 illustrates examples of notification information fields for the first specific channel, examples of notification information fields for the second specific channel and examples of notification information fields for the normal channel in the format of transmission notification information of a GW.

The notification information fields for the first specific channel are the same as the fields of the format illustrated in FIG. 22. The notification information fields for the second specific channel are the same as the fields of the format illustrated in FIG. 5. The notification information fields for the normal channel are the same as the fields of the format illustrated in FIG. 12.

When the example illustrated in FIG. 25 is applied to the format of transmission notification information of a GW for the three types including the "first specific channel," the "second specific channel," and the "normal channel," a format associated with FIG. 25 may be applied to the format of transmission notification information of relay nodes under the GW.

FIG. 26 is a diagram illustrating a format example of notification information of relay nodes corresponding to FIG. 25. The format illustrated in FIG. 26 is a format of transmission notification information to be transmitted to an upstream node from relay node #Y, for example.

The notification information fields for the first specific channel are the same as the fields of the format illustrated in FIG. 23. The notification information fields for the second specific channel are the same as the fields of the format illustrated in FIG. 6. The notification information fields for the normal channel are the same as the fields of the format illustrated in FIG. 13.

In a node having no downstream relay node (end node), notification information including a detection result of detection performed by the end node is transmitted to an upstream relay node. The format of transmission notification information of an end node is the same as that in FIG. 7. The information included in the "uncontrollable interference information" field may vary for each channel, however.

For example, in "uncontrollable interference information" fields included in the notification information fields for the first specific channel and the normal channel, "1" may be set when the interference amount of uncontrollable interference detected in the end node is less than a threshold, and "0" may be set when the interference amount thereof is not less than the threshold.

When the end node is a specific node, however, the format of FIG. 7 may include an "uncontrollable interference information #B" field as in FIGS. 22 and 23. Note that, in this case, the information on the interference amount of uncontrollable interference detected in the end node may be set in the "uncontrollable interference information #B" field.

In Variation 5 described above, the notification information having independent fields for each channel has been described. With this notification, in a case where important information (services) is provided in a specific channel, for example, channel assignment based on the notification information on the specific channel is possible; thus making it possible to improve the communication quality through the specific channel.

For example, it is effective in a case where an NW monitors information on interference on a specific channel at a specific time in a node provided in a specific area where a large event (e.g., sporting event, such as Olympics) is held. For example, monitoring of radiation of an illegal radio wave in the specific area is also possible.

Note that, the information on the specific node may be provided as notification to each node by a higher layer message and/or the like from an NW.

Further, although an example has been described in which the channels are classified into three types including "the first specific channel," "the second specific channel," and "the normal channel," the present disclosure is not limited to this example, and the number of types of classification of channels may be two or equal to or greater than four.

<Variation 6 of Notification Information>

In Variation 6 of notification information, an example in which notification of two types of information are provided for controllable interference will be described.

Note that, controllable interference caused by LoRa mode communication may be referred to as "controllable LoRa interference" in controllable interference. Further, controllable interference caused by Wi-SUN mode communication may be referred to as "controllable Wi-SUN interference" in controllable interference.

Further, processing of classifying controllable interference into controllable LoRa interference and controllable Wi-SUN interference may be performed by interference classifier 103 of radio communication apparatus 100, for example. This classification method is not particularly limited. For example, interference classifier 103 may classify, as controllable LoRa interference, controllable interference of a case where the transmission source of the received signal determined by the preamble detection is an LoRa terminal, and may classify, as controllable Wi-SUN interference, controllable interference of a case where the transmission source of the received signal determined by the preamble detection is a Wi-SUN terminal. Alternatively, controllable interference may be classified into controllable LoRa interference and controllable Wi-SUN interference by performing reverse spreading processing on the received signal using the spread signal of an LoRa signal to determine whether or not the received signal has been subjected to spreading processing. In a case where, for example, the received signal has been subjected to spreading processing (when a difference in signal power before and after reverse spreading processing is larger than a predetermined value), classification may be made as controllable LoRa interference, and in a case where the received signal has not been subjected to spreading processing (when a difference in signal power before and after reverse spreading processing is smaller than a predetermined value), classification may be made as controllable Wi-SUN interference. For example, the reverse spreading processing may be performed by demodulator/decoder 102 of radio communication apparatus 100.

Figure 27:
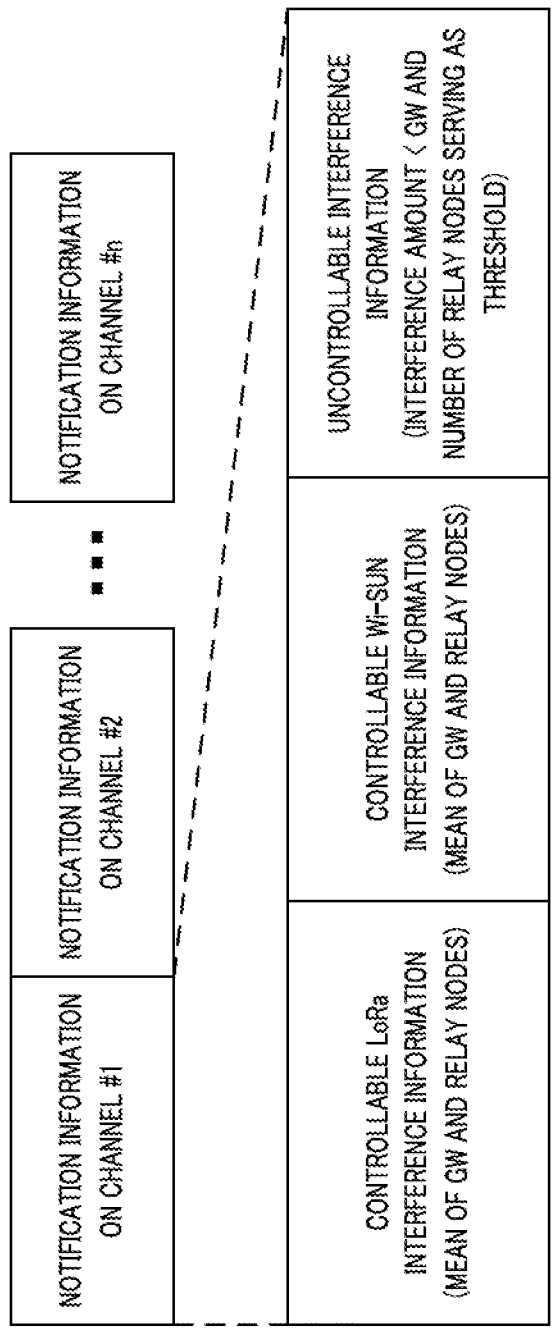
FIG. 27 is a diagram illustrating Example 6 of the format of notification information of a GW, according to the embodiment of the present disclosure.

FIG. 27 is a diagram illustrating Example 6 of the format of transmission notification information of a GW, according to the present embodiment. FIG. 27 illustrates an example of the format of transmission notification information in a GW. Note that, in the format illustrated in FIG. 27, the same field as that in FIG. 17 will not be described.

In the format of notification information illustrated in FIG. 27, among the fields for setting pieces of notification information on the respective channels of channel #1 to channel #n, the "uncontrollable interference information" field is the same as in FIG. 17, but the "controllable interference information" field in FIG. 17 is replaced with a "controllable LoRa interference information" field and a "controllable Wi-SUN interference information" field.

In the "controllable LoRa interference information" field, information on controllable LoRa interference, such as a detection result of an interference amount of the controllable LoRa interference is set. For example, in the "controllable LoRa interference information" field, a value indicating a mean of interference amounts of controllable LoRa interference detected respectively in a GW and relay nodes under the GW is set.

In the "controllable Wi-SUN interference information" field, information on controllable Wi-SUN interference, such as a detection result of an interference amount of the controllable Wi-SUN interference is set. For example, in the "controllable Wi-SUN interference information" field, a value indicating a mean of interference amounts of controllable Wi-SUN interference detected respectively in a GW and relay nodes under the GW is set.

Although illustration is omitted, the format of notification information of relay node #Y corresponding to FIG. 27 may be a format in which the "controllable interference information" field is replaced with the "controllable LoRa interference information" field and "controllable Wi-SUN interference information" field in FIG. 18. In the "controllable LoRa interference information" field, a value indicating a mean of interference amounts of controllable LoRa interference detected respectively in relay node #Y and Y−1 relay nodes downstream of relay node #Y is set. In the "controllable Wi-SUN interference information" field, a value indicating a mean of interference amounts of controllable Wi-SUN interference detected respectively in relay node #Y and Y−1 relay nodes downstream of relay node #Y is set.

Further, the format of notification information of an end node corresponding to FIG. 27 may be a format in which the "controllable interference information" field is replaced with the "controllable LoRa interference information" field and "controllable Wi-SUN interference information" field in FIG. 7. In the "controllable LoRa interference information" field and the "controllable Wi-SUN interference information" field, the interference amount of controllable LoRa interference detected in the end node and the interference amount of controllable Wi-SUN interference detected in the end node may be set, respectively. In an "uncontrollable interference information" field included in the format of notification information of the end node, "1" may be set when the interference amount of uncontrollable interference detected in the end node is less than a threshold, and "0" may be set when the interference amount thereof is not less than the threshold.

Note that there is a case where use of one of a plurality of communication modes is permitted while use of the other communication modes is not permitted depending on channels. For example, a Wi-SUN dedicated channel (channel for which use of an LoRa mode is not permitted) and/or a LoRa dedicated channel (channel for which use of a Wi-SUN mode is not permitted) may be present. In this case, notification of interference information on the permitted communication mode is provided, and notification of interference information on the not permitted communication mode need not be provided (notification may be omitted).

Further, in a channel for which use of a plurality of communication modes is permitted, the time at which notification of interference information on each communication mode may be independently set. For example, the time at which notification of interference information on Wi-SUN and the time at which notification of interference information on LoRa are provided are set independently from each other. Notification of information on notification time of interference information on these communication modes may be provided via a higher layer message and/or the like from an NW.

<Example of Flow According to Variation 6>

A processing flow in radio communication apparatus 100 for generating notification information of Variation 6 described above will be described.

The processing flow in radio communication apparatus 100 for generating the notification information of Variation 6 described above is the same as FIG. 9 illustrated in Variation 1. However, the processing in S106 and S107 of FIG. 9 is different from Variation 1. Hereinafter, the processing in S106 and S107 of FIG. 9 will be described.

<Example of Flow of Processing in S106>

Figure 28:
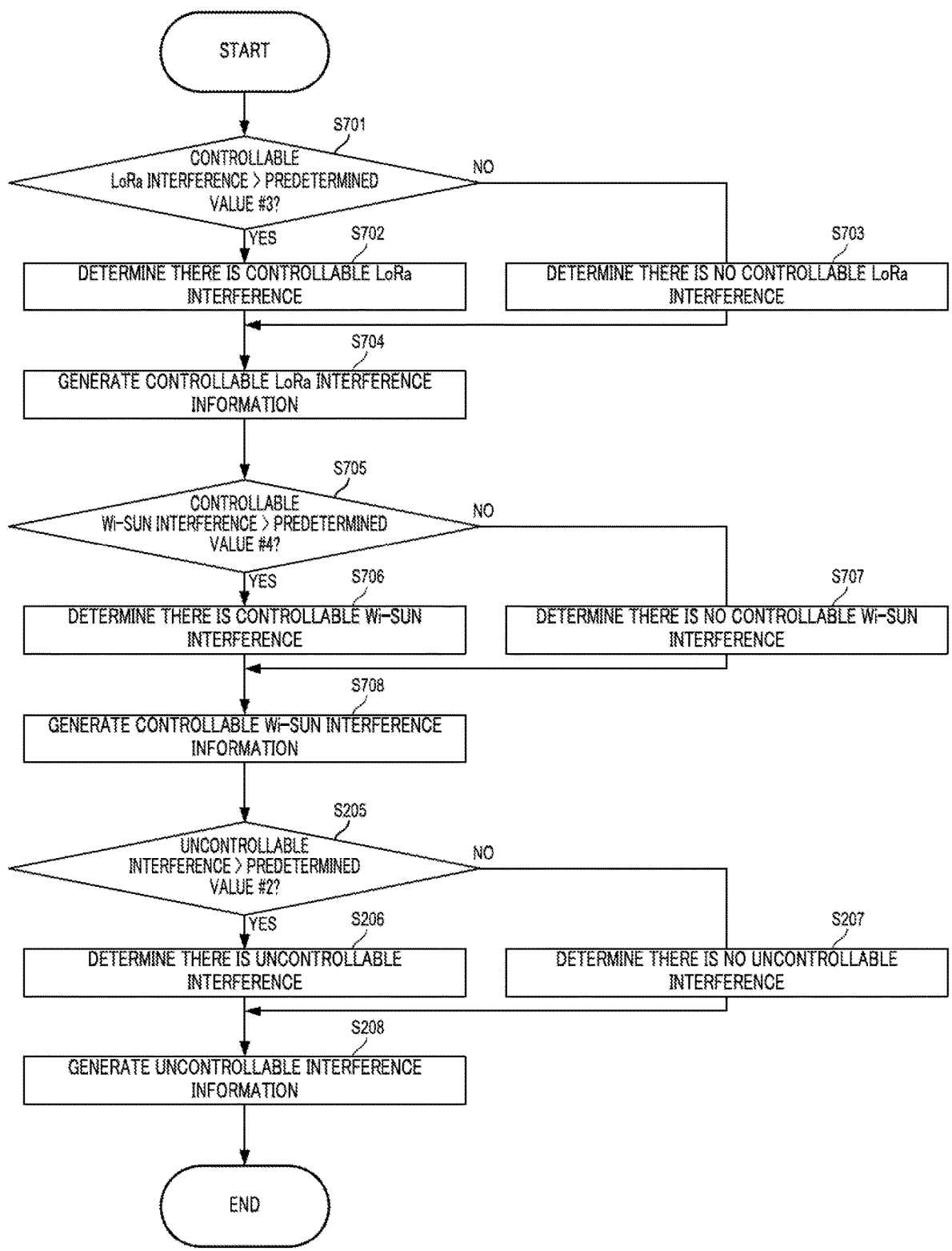
FIG. 28 is a flowchart illustrating a second example of the processing to be executed in S106 of FIG. 9.

FIG. 28 is a flowchart illustrating a first example of processing to be executed in S106 of FIG. 9. Note that, in FIG. 28, the processing similar to that in FIG. 10 is denoted by the same reference numeral and its description may be omitted.

Radio communication apparatus 100 determines whether or not the interference amount of controllable LoRa interference is greater than predetermined value #3 (S701).

When the interference amount of controllable LoRa interference is greater than predetermined value #3 (YES in S701), radio communication apparatus 100 determines that there is controllable LoRa interference (S702).

When the interference amount of controllable LoRa interference is not greater than predetermined value #3 (NO in S701), radio communication apparatus 100 determines that there is no controllable LoRa interference (S703).

Radio communication apparatus 100 generates controllable LoRa interference information for each channel (e.g., controllable LoRa interference information on channel #k) based on the determination result of S702 or S703 (S704). Note that, an exemplary value indicated by the controllable LoRa interference information for each channel is the same as the value indicated by the controllable interference information for each channel in FIG. 9, so that its description will be omitted.

Radio communication apparatus 100 determines whether or not the interference amount of controllable Wi-SUN interference is greater than predetermined value #4 (S705).

When the interference amount of controllable Wi-SUN interference is greater than predetermined value #4 (YES in S705), radio communication apparatus 100 determines that there is controllable Wi-SUN interference (S706).

When the interference amount of controllable Wi-SUN interference is not greater than predetermined value #4 (NO in S705), radio communication apparatus 100 determines that there is no controllable Wi-SUN interference (S707).

Radio communication apparatus 100 generates controllable LoRa interference information for each channel (e.g., controllable LoRa interference information on channel #k) based on the determination result of S706 or S707 (S708). Note that, an exemplary value indicated by the controllable LoRa interference information for each channel is the same as the value indicated by the controllable interference information for each channel in FIG. 10, so that its description will be omitted.

<Example of Flow of Processing in S107>

Figure 29:
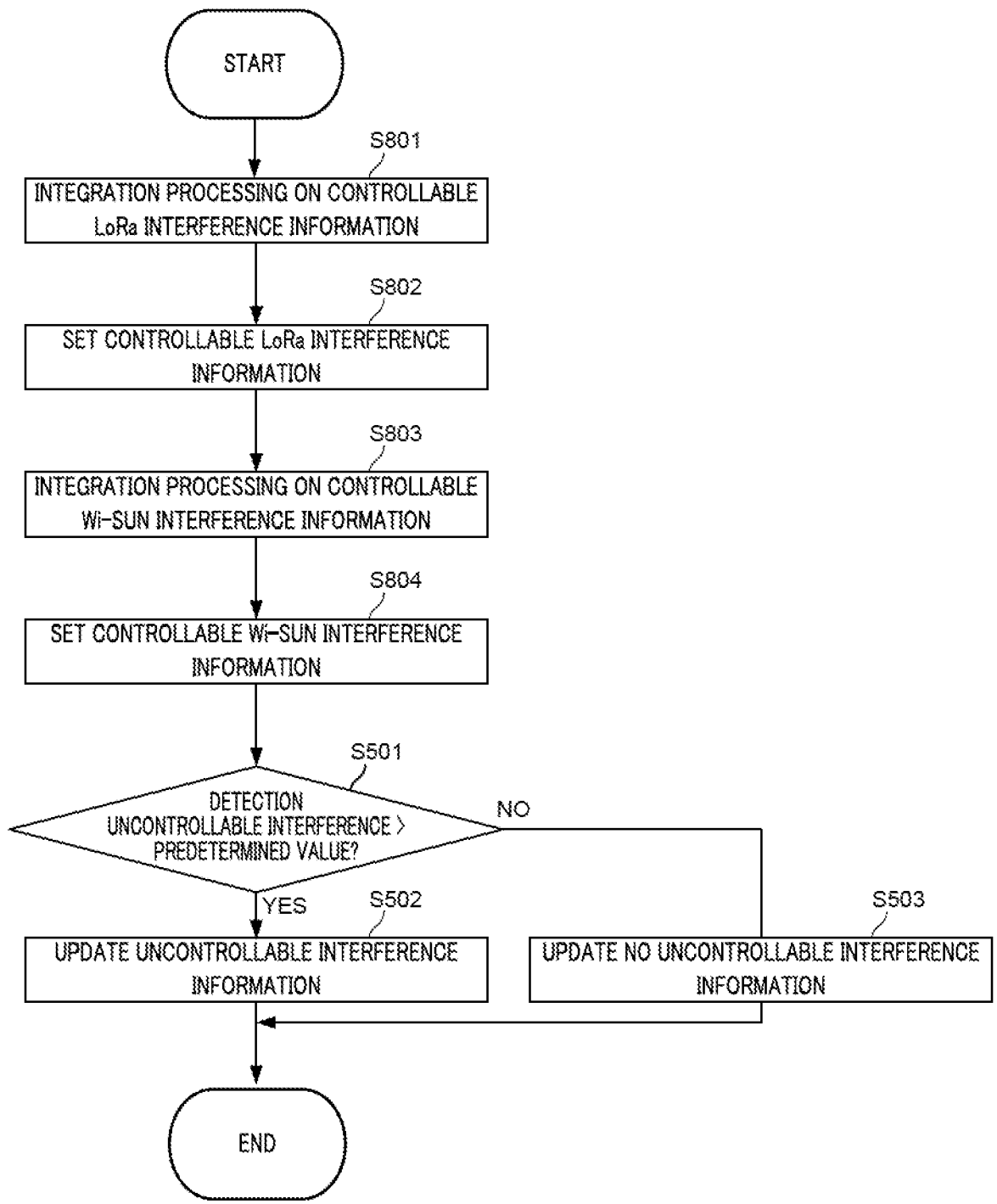
FIG. 29 is a flowchart illustrating a fifth example of the processing to be executed in S107 of FIG. 9.

FIG. 29 is a flowchart illustrating a first example of processing to be executed in S107 of FIG. 9. Note that, in FIG. 29, the processing similar to those in FIG. 21 is denoted by the same reference numeral and its description may be omitted.

In the flow of FIGS. 29, S301 to S302 in FIG. 21 are replaced with S801 to S804.

Radio communication apparatus 100 performs integration processing of controllable LoRa interference information (S801). For example, radio communication apparatus 100 determines a mean value of the interference amount indicated by the controllable LoRa interference information included in the received notification information and the interference amount indicated by the controllable LoRa interference information generated in radio communication apparatus 100. Note that, determination of a mean value of the interference amounts may be the same as the processing illustrated in S301 of FIG. 11.

Radio communication apparatus 100 sets the controllable LoRa interference information after the integration processing in the "controllable LoRa interference information" field of the notification information transmitted by radio communication apparatus 100 (S802).

Radio communication apparatus 100 performs integration processing of controllable Wi-SUN interference information (S803). For example, radio communication apparatus 100 determines a mean value of the interference amount indicated by the controllable Wi-SUN interference information included in the received notification information and the interference amount indicated by the controllable Wi-SUN interference information generated in radio communication apparatus 100. Note that, determination of a mean value of the interference amounts may be the same as the processing illustrated in S301 of FIG. 11.

Radio communication apparatus 100 sets the controllable Wi-SUN interference information after the integration processing in the "controllable Wi-SUN interference information" field of the notification information transmitted by radio communication apparatus 100 (S802).

In Variation 7 described above, notification of a detection result of the interference amount can be appropriately provided for each communication mode of a terminal, so that the channel assignment to a terminal in a NW can be performed appropriately, and the optimization (e.g., achieving improvement of frequency utilization efficiency and interference reduction to another network and another system at the same time) of the NW can be further attempted. Further, in this notification, as to the information on controllable interference, notification of the statistical characteristics of a plurality of nodes rather than controllable interference for each of the plurality of nodes can be provided, so that the information amount of notification information can be reduced.

For example, in a case where usable channels are different respectively for communication modes of a terminal, the optimization of an NW can be achieved by the notification method illustrated in Variation 7.

<Variation 7 of Notification Information>

In Variation 7 of notification information, an example in which notification of two types of information is provided for uncontrollable interference will be described. For example, uncontrollable interference may be classified into radio interference and ambient noise, and a priority may be determined for ambient noise. Hereinafter, in Variation 7, an example will be described in which fields for providing notification of information on radio interference in each channel and information on the high-priority ambient noise in ambient noise are provided, respectively.

Note that the determination method for a priority of ambient noise is not particularly limited. For example, radio communication apparatus 100 (e.g., interference classifier 103 or notification information controller 108) may determine a priority of ambient noise by a method illustrated hereinafter.

<Example of Priority Determination for Ambient Noise>

Figure 30:
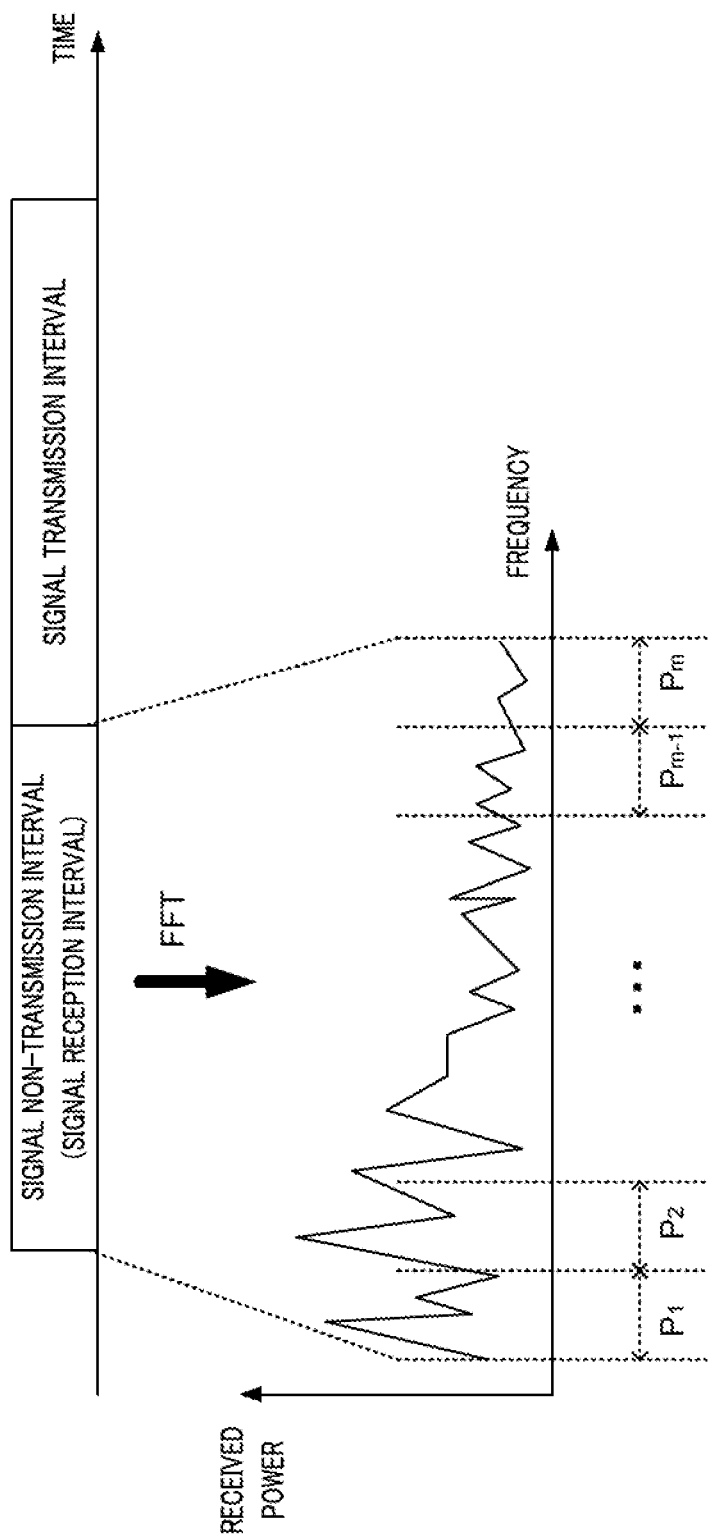
FIG. 30 is a diagram illustrating an example of determination of a priority of ambient noise.

FIG. 30 is a diagram illustrating an example of priority determination for ambient noise.

In FIG. 30, a signal transmission interval and a signal non-transmission interval of radio communication apparatus 100 set in the time axis direction are illustrated. Further, an example of a result of the time to frequency transform, such as fast Fourier transform (FFT) for the signal non-transmission interval is illustrated. The horizontal axis in the result of the time to frequency transformation indicates the frequency, and the vertical axis indicates the received power for each frequency component. Incidentally, the signal non-transmission interval may correspond to the signal reception interval, and/or the radio interference monitoring interval.

For example, radio communication apparatus 100 estimates the frequency band used for a signal transmission in the signal non-transmission interval based on a result of the time to frequency transformation.

For example, radio communication apparatus 100 divides the result of time to frequency transformation into m processing units $P_l$ to $P_m$ in the frequency axis direction. Then, radio communication apparatus 100 determines the maximum value and the minimum value of the received power for each processing unit resulting from the division.

Then, radio communication apparatus 100 compares the maximum value and the minimum value of the received power in each processing unit to determine whether or not the processing unit is used for signal transmission.

When the relation of $\alpha \times \max(P_j) > \min(P_j)$ holds true between the maximum value $\max(P_j)$ and the minimum value $\min(P_j)$ of the received power in processing unit $P_j$ (j is an integer greater than or equal to 1 and not greater than m), for example, radio communication apparatus 100 determines that processing unit t $P_j$ is a frequency band used for signal transmission. Note that $\alpha$ is a weighting coefficient relating to the determination. For example, $\alpha$ is a coefficient greater than 0.

Radio communication apparatus 100 determines the frequency band used for the signal transmission by determining, for each of processing units processing units $P_l$ to $P_m$, whether it has been used for the signal transmission, and determines a radio system (ambient noise system) corresponding to the frequency band. Radio communication apparatus 100 then determines the priority of the determined ambient noise.

Note that, radio communication apparatus 100 may have in advance information relating to the frequency band of another radio system for transmitting signals in the system band, and information relating to the priority of the other radio system.

FIG. 31 is a diagram illustrating Example 7 of the format of transmission notification information of a GW, according to the present embodiment. The format illustrated in FIG. 31 is a format example of transmission notification information in a GW. Note that, in the format in FIG. 31, the same fields as those of the format illustrated in FIG. 27 will not be described.

In the format of notification information illustrated in FIG. 31, in the fields included in the pieces of notification information on the respective channels of channel #1 to channel #n, the "controllable LoRa interference information" field and the "controllable Wi-SUN interference information" field are the same as those in FIG. 27. In the format of notification information illustrated in FIG. 31, the "uncontrollable interference information" field in FIG. 27 is replaced with a "radio interference information" field and a "high-priority ambient noise information" field.

For example, in the "radio interference information" field, the number of nodes (GW and relay nodes) that have detected an interference amount less than a threshold among the interference amounts of radio interference detected by a GW and Z relay nodes under the GW is set.

For example, in the "high-priority ambient noise information" field, the number of nodes (GW and relay nodes) that have detected an interference amount less than a threshold among the interference amounts of high-priority ambient noise detected by a GW and Z relay nodes under the GW is set.

Although illustration is omitted, the format of notification information of relay node #Y corresponding to FIG. 31 is the same as FIG. 31, but information set in each field is different from the example in FIG. 31. Note that, as to "controllable LoRa interference information" field and "controllable Wi-SUN interference information" field in the format of notification information of relay node #Y corresponding to FIG. 31 is the same as in Variation 6 described above. Further, in the "radio interference field," the number of nodes that have detected an interference amount less than a threshold among the interference amounts of radio interference detected respectively in relay node #Y and Y–1 relay nodes downstream of relay node #Y is set. Further, in the "high-priority ambient noise information" field, the number of nodes that have detected an interference amount less than a threshold among the interference amounts of high-priority ambient noise detected respectively in relay node #Y and Y–1 relay nodes downstream of relay node #Y is set.

Further, the format of notification information of an end node corresponding to FIG. 31 is the same as FIG. 31, but information set in each field is different from FIG. 31. As to "controllable LoRa interference information" field and "controllable Wi-SUN interference information" field in the format of notification information of the end node corresponding to FIG. 31 is the same as in Variation 6 described above. In the "radio interference information" field included in the format of transmission notification information of the end node, "1" may be set when the interference amount of radio interference detected in the end node is less than a threshold, and "0" may be set when the interference amount thereof is not less than the threshold. Further, in the "high-priority ambient noise information" field included in the format of transmission notification information of the end node, "1" may be set when the interference amount of high-priority ambient noise detected in the end node is less than a threshold, and "0" may be set when the interference amount thereof is not less than the threshold.

<Example of Flow According to Variation 7>

Figure 32:
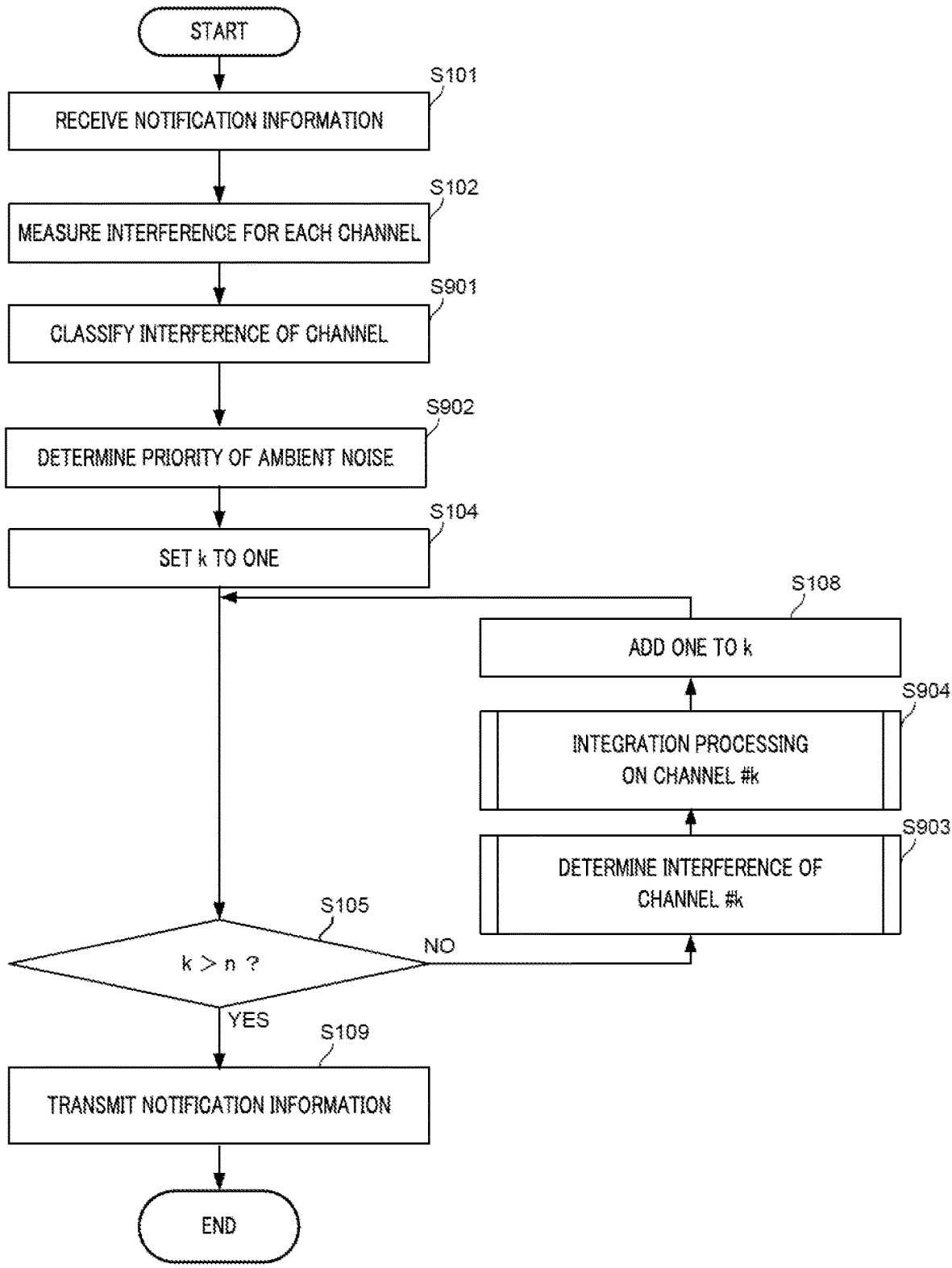
FIG. 32 is a flowchart illustrating a second example of the notification information generation processing according the embodiment of the present disclosure.

FIG. 32 is a flowchart illustrating a second example of the notification information generation processing according to the present embodiment. Note that, in FIG. 32, the processing similar to that in FIG. 9 is denoted by the same reference numeral and its description may be omitted.

Radio communication apparatus 100 classifies interference for the interference measured for each channel (S901). Radio communication apparatus 100 herein classifies the interference measured for each channel into controllable interference, radio interference, and ambient noise.

Radio communication apparatus 100 determines a priority of the classified ambient noise (S902).

Radio communication apparatus 100 sets k=1 (S104). The term "k" is an index of the channel corresponding to the identification number of the channel.

Radio communication apparatus 100 determines whether k is greater than n (S105).

When k is not greater than n (NO in S105), radio communication apparatus 100 determines interference of channel #k and performs determination processing on channel #k (S903). The determination processing in S903 includes, for example, generation of controllable interference information on channel #k, generation of radio interference information on channel #k, and generation of high-priority ambient noise information on channel #k in radio communication apparatus 100. Note that, the determination processing in S903 will be described later.

Radio communication apparatus 100 performs integration processing for the controllable interference information, radio interference information, and high-priority ambient noise information generated by radio communication apparatus 100 and the controllable interference information, radio interference information, and high-priority ambient noise information included in the received notification information (S904). The integration processing in S904 includes, for example, integration processing for controllable interference information, radio interference information, and high-priority ambient noise information transmitted by radio communication apparatus 100. Note that, the integration processing in S904 will be described later.

Note that, the flow illustrated in FIG. 32 indicates processing in each node except for an end node. For example, when the radio communication apparatus 100 is an end node, the processing of S101 and S904 may be omitted.

<Example of Flow of Processing in S903>

Next, the flow of processing to be executed in S903 of FIG. 32 will be described.

Figure 33:
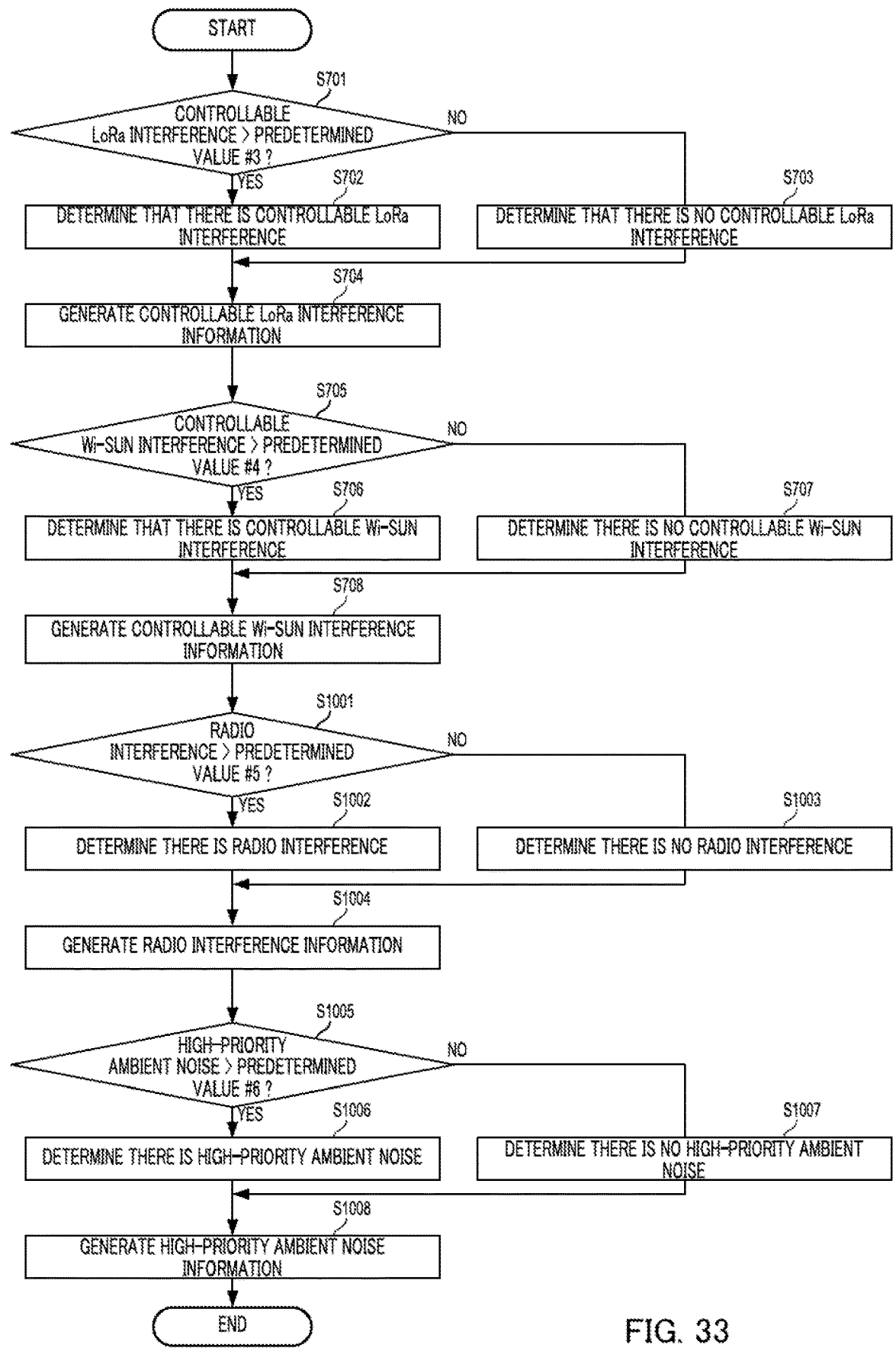
FIG. 33 is a flowchart illustrating a first example of processing to be executed in S903 of FIG. 32.

FIG. 33 is a flowchart illustrating a first example of processing to be executed in S903 of FIG. 32. Note that, in FIG. 33, the processing similar to that in FIG. 32 is denoted by the same reference numeral and its description may be omitted.

Radio communication apparatus 100 determines whether or not the interference amount of radio interference is greater than predetermined value #5 (S1001).

When the interference amount of radio interference is greater than predetermined value #5 (YES in S1001), radio communication apparatus 100 determines that there is radio interference (S1002).

When the interference amount of radio interference is not greater than predetermined value #5 (NO in S1001), radio communication apparatus 100 determines that there is no radio interference (S1003).

Radio communication apparatus 100 generates radio interference information based on the determination result of S1002 or S1003 (S1004). In S1004, radio interference information for each channel is generated.

Radio communication apparatus 100 determines whether or not the interference amount of high-priority ambient noise is greater than predetermined value #6 (S1005).

When the interference amount of high-priority ambient noise is greater than predetermined value #6 (YES in S1005), radio communication apparatus 100 determines that there is high-priority ambient noise (S1006).

When the interference amount of high-priority ambient noise is not greater than predetermined value #6 (NO in S1005), radio communication apparatus 100 determines that there is no high-priority ambient noise (S1007).

Radio communication apparatus 100 generates high-priority ambient noise information based on the determination result of S1006 or S1007 (S1008). In S1008, high-priority ambient noise information for each channel is generated.

Upon completion of the processing in S1008, the determination of the interference on channel #k is complete, and the flow of FIG. 33 ends. For example, in this instance, the processing shifts to S904 in the flow of FIG. 32.

<Example of Flow of Processing in S904>

Next, the flow of processing to be executed in S904 of FIG. 32 will be described.

Figure 34:
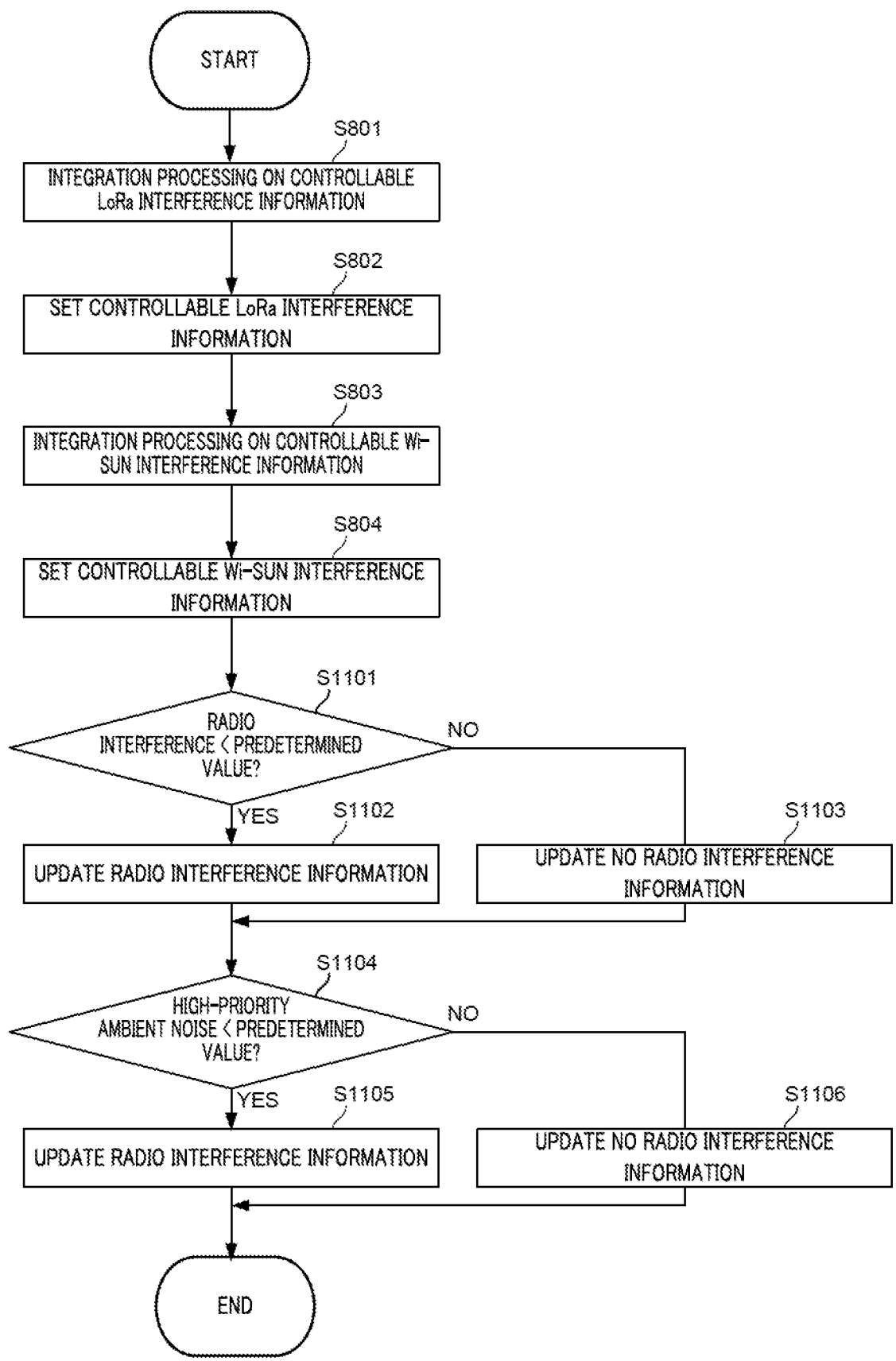
FIG. 34 is a flowchart illustrating a first example of processing to be executed in S904 of FIG. 32.

FIG. 34 is a flowchart illustrating a first example of processing to be executed in S904 of FIG. 32. Note that, in FIG. 34, the processing similar to that in FIG. 29 is denoted by the same reference numeral and its description may be omitted.

Radio communication apparatus 100 determines whether or not radio interference in radio communication apparatus 100 is less than a predetermined value (S1101).

When the radio interference in radio communication apparatus 100 is less than the predetermined value (YES in S1101), radio communication apparatus 100 updates the radio interference information of the notification information by adding one to the value in a "radio interference information" field of the notification information (S1102).

When the radio interference in radio communication apparatus 100 is not less than the predetermined value (NO in S1101), radio communication apparatus 100 does not update the radio interference information of the notification information (S1103).

Radio communication apparatus 100 determines whether or not high-priority ambient noise in radio communication apparatus 100 is less than a predetermined value (S1104).

When the high-priority ambient noise in radio communication apparatus 100 is less than the predetermined value (YES in S1104), radio communication apparatus 100 updates the high-priority ambient noise information of the notification information by adding one to the value in a "high-priority ambient noise information" field of the notification information (S1105).

When the high-priority ambient noise in radio communication apparatus 100 is not less than the predetermined value (NO in S1104), radio communication apparatus 100 does not update the high-priority ambient noise information of the notification information (S1106).

Upon completion of the processing in S1105 or S1106, the integration processing of the interference information on channel #k is complete, and the flow of FIG. 34 ends. For example, in this instance, the processing shifts to S108 in the flow of FIG. 32.

In Variation 7 described above, uncontrollable interference is classified into radio interference and ambient noise, and whether high-priority ambient noise is included in the classified ambient noise is determined. Then, notification of the information on radio interference and notification of the information on high-priority ambient noise are distinctly provided. With the notification, notification of a detection result of an interference amount can be appropriately provided in a subdivided manner. With the notification, the channel assignment to a terminal in a network can be performed appropriately, and the optimization (e.g., achieving improvement of frequency utilization efficiency and interference reduction to another network and another system at the same time) of the network can be further attempted. Further, in this notification, notification of the number of nodes obtainable from a result of threshold determination rather than a classification result for each node is provided, so that the information amount of notification information can be reduced.

<Variation 8 of Notification Information>

Variation 8 of notification information is different from other variations in uncontrollable interference.

FIG. 35 is a diagram illustrating Example 8 of the format of notification information of a GW, according to the present embodiment. The format illustrated in FIG. 35 indicates a format example of transmission notification information in a GW. Note that, in the format in FIG. 35, the same fields as those of the format illustrated in FIG. 27 will not be described.

In the format of notification information illustrated in FIG. 35, in the fields included in the pieces of notification information on the respective channels of channel #1 to channel #n, the "controllable LoRa interference information" field and the "controllable Wi-SUN interference information" field are the same as those in FIG. 27. The information of an "uncontrollable interference information" field included in the format of the notification information illustrated in FIG. 35 is different from the information included in the "uncontrollable interference information" field in FIG. 27.

For example, in the "uncontrollable interference information" field included in the format of notification information illustrated in FIG. 35, a value on a mean of interference amounts of radio interference and high-priority ambient noise detected respectively in a GW and relay nodes under the GW is set. For example, in the "uncontrollable interference information" field, the number of nodes (GW and relay nodes) whose a mean of the interference amounts of radio interference and high-priority ambient noise is less than a threshold is set.

Although illustration is omitted, the format of notification information of relay node #Y corresponding to FIG. 35 is the same as with FIG. 35, but information to be set in each field is different from the example of FIG. 35. The "controllable LoRa interference information" field and "controllable Wi-SUN interference information" field of the format of notification information of relay node #Y corresponding to FIG. 35 are the same as Variation 6 described above. In the "uncontrollable interference information" field, the number of nodes in which a mean of radio interference and high-priority ambient noise detected respectively in relay node #Y and Y−1 relay nodes downstream of relay node #Y is less than a threshold is set.

Further, the format of notification information of an end node corresponding to FIG. 35 is the same as with FIG. 35, but information to be set in each field is different from FIG. 35. The "controllable LoRa interference information" field and "controllable Wi-SUN interference information" field of the format of notification information of the end node corresponding to FIG. 35 are the same as Variation 6 described above. In the "uncontrollable interference information" field included in the format of notification information of the end node, "1" may be set when a mean of radio interference and high-priority ambient noise detected in the end node is less than a threshold, and "0" may be set when the mean thereof is not less than the threshold.

<Example of Flow According to Variation 8>

A processing flow in radio communication apparatus 100 for generating notification information in Variation 8 described above will be described.

The processing flow in radio communication apparatus 100 for generating the notification information in Variation 8 described above is the same as FIG. 32 illustrated in Variation 7. However, the processing of S904 in FIG. 32 is different from Variation 7.

Hereinafter, the processing of S904 in FIG. 32 will be described.

<Example of Flow of Processing in S904>

Figure 36:
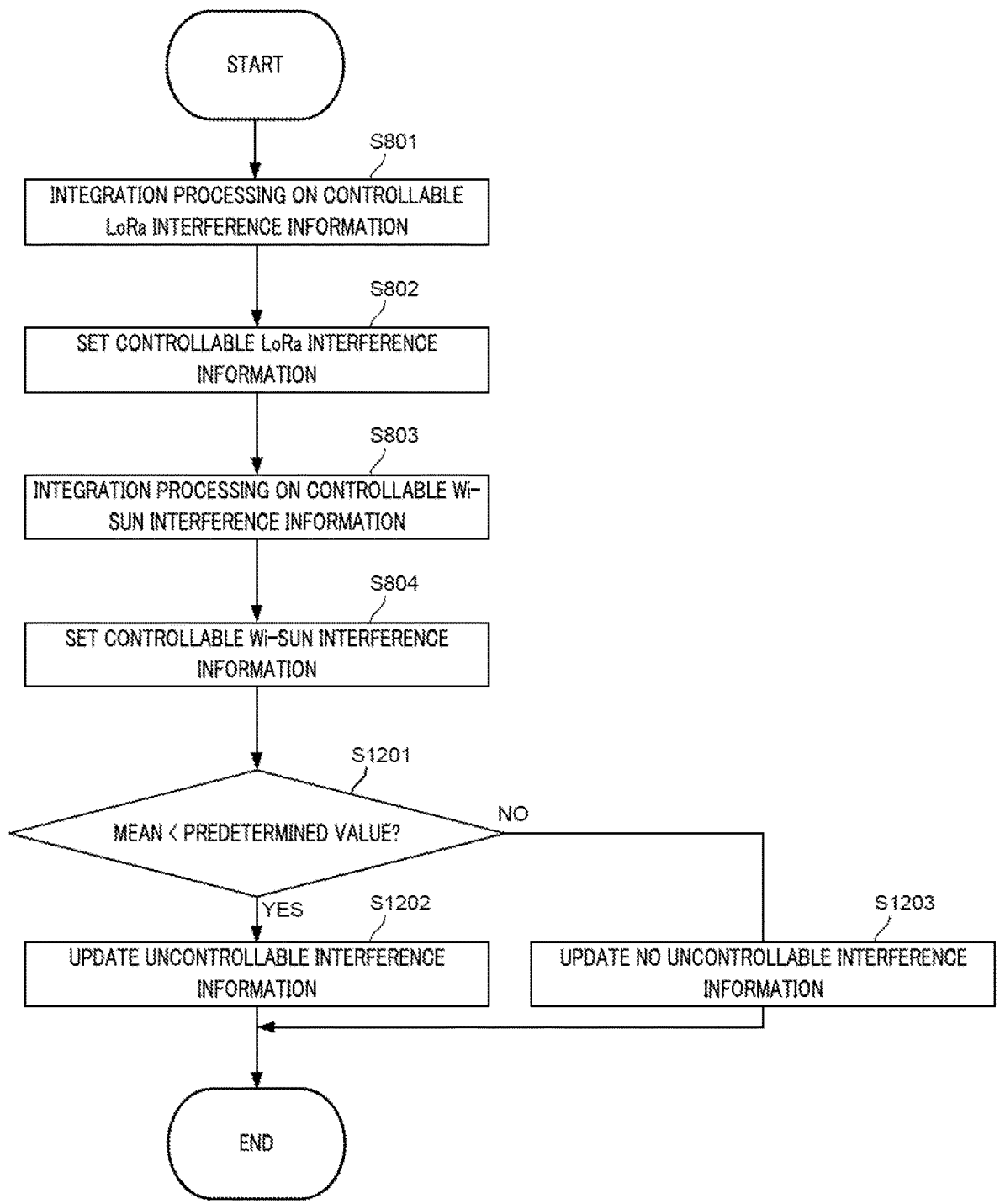
FIG. 36 is a flowchart illustrating a second example of the processing to be executed in S904 of FIG. 32.

FIG. 36 is a flowchart illustrating a second example of the processing to be executed in S904 of FIG. 32. Note that, in FIG. 36, the processing similar to that in FIG. 34 is denoted by the same reference numeral and its description may be omitted.

Radio communication apparatus 100 calculates a mean of radio interference and high-priority ambient noise in radio communication apparatus 100 and determines whether the mean is less than a threshold (S1201).

When the mean in radio communication apparatus 100 is less than the threshold (YES in S1201), radio communication apparatus 100 updates the uncontrollable interference information of the notification information by adding one to the value in an "uncontrollable interference information" field of the notification information (S1202).

When the mean in radio communication apparatus 100 is not less than the threshold (NO in S1201), radio communication apparatus 100 does not update the uncontrollable interference information of the notification information (S1203).

Upon completion of the processing in S1202 or S1203, the integration processing of the interference information on channel #k is complete, and the flow of FIG. 36 ends. For example, in this instance, the processing shifts to S108 in the flow of FIG. 32.

In Variation 8 described above, uncontrollable interference is classified into radio interference and ambient noise, and whether high-priority ambient noise is included in the classified ambient noise is determined as in Variation 7. Then, notification of the information on a mean of radio interference and high-priority ambient noise is provided as an example of information resulting from integration of the information on radio interference and the information on the high-priority ambient noise. With the notification, notification of a detection result of an interference amount can be appropriately provided in a subdivided manner. With the notification, the channel assignment to a terminal in a network can be performed appropriately, and the optimization (e.g., achieving improvement of frequency utilization efficiency and interference reduction to another network and another system at the same time) of the network can be further attempted. Further, in this notification, notification of the number of nodes obtainable from a result of threshold determination rather than a classification result for each node is provided, so that the information amount of notification information can be reduced.

<Variation 9 of Notification Information>

In Variation 9 of notification information, an example will be described in which notification frequency (how often notification is provided) is set in accordance with a type of interference. For example, the notification frequency may be different between controllable interference and uncontrollable interference. The difference in notification frequency may correspond to the difference in notification timing. In this example, notification information is provided at any one of a timing at which notification of controllable interference is provided without notification of uncontrollable interference, a timing at which notification of uncontrollable interference is provided without notification of controllable interference, and a timing at which notification of controllable interference and uncontrollable interference is provided. In this example, the formats are different for the respective timings of notification.

FIG. 37 is a diagram illustrating exemplary formats of notification information at three different timings. FIG. 37 illustrates an example in which the format illustrated in FIG. 27 is applied to the format of notification information, and the notification frequency is set in accordance with the type of interference. FIG. 37 illustrates a configuration example of notification information fields of one channel included in the format of notification information.

Format a of the notification information in FIG. 37 is an exemplary notification format at the timing of providing notification of controllable interference information and uncontrollable interference information.

Format b of the notification information in FIG. 37 is an exemplary notification format at the timing of providing notification of uncontrollable interference information and not providing notification of controllable interference information. In Format b, since notification of controllable interference information is not provided, the "controllable LoRa interference information" field and the "controllable Wi-SUN interference information" field are omitted.

Format c of the notification information in FIG. 37 is an exemplary notification format at the timing of providing notification of controllable interference information and not providing notification of uncontrollable interference information. In Format c, since notification of uncontrollable interference information is not provided, the "uncontrollable interference information" field is omitted.

Note that, although the exemplary formats for three different notification timings are illustrated, any two of the three different notification timings may be set.

For example, in a case that two notification timings including the timing of providing notification of uncontrollable interference information and not providing notification of controllable interference information and the timing of providing notification of uncontrollable interference information and providing notification of controllable interference information are set, Format b and Format a illustrated in FIG. 37 are used in accordance with the notification timing. Further, in a case that the timing of providing notification of controllable interference information and not providing notification of uncontrollable interference information and the timing of providing notification of uncontrollable interference information and providing notification of controllable interference information are set, Format c and Format a illustrated in FIG. 37 are used in accordance with the notification timing.

Note that, when uncontrollable interference is further classified, the notification frequency (notification timing) may be different between the radio interference and high-priority ambient noise after the classification.

Figure 38:
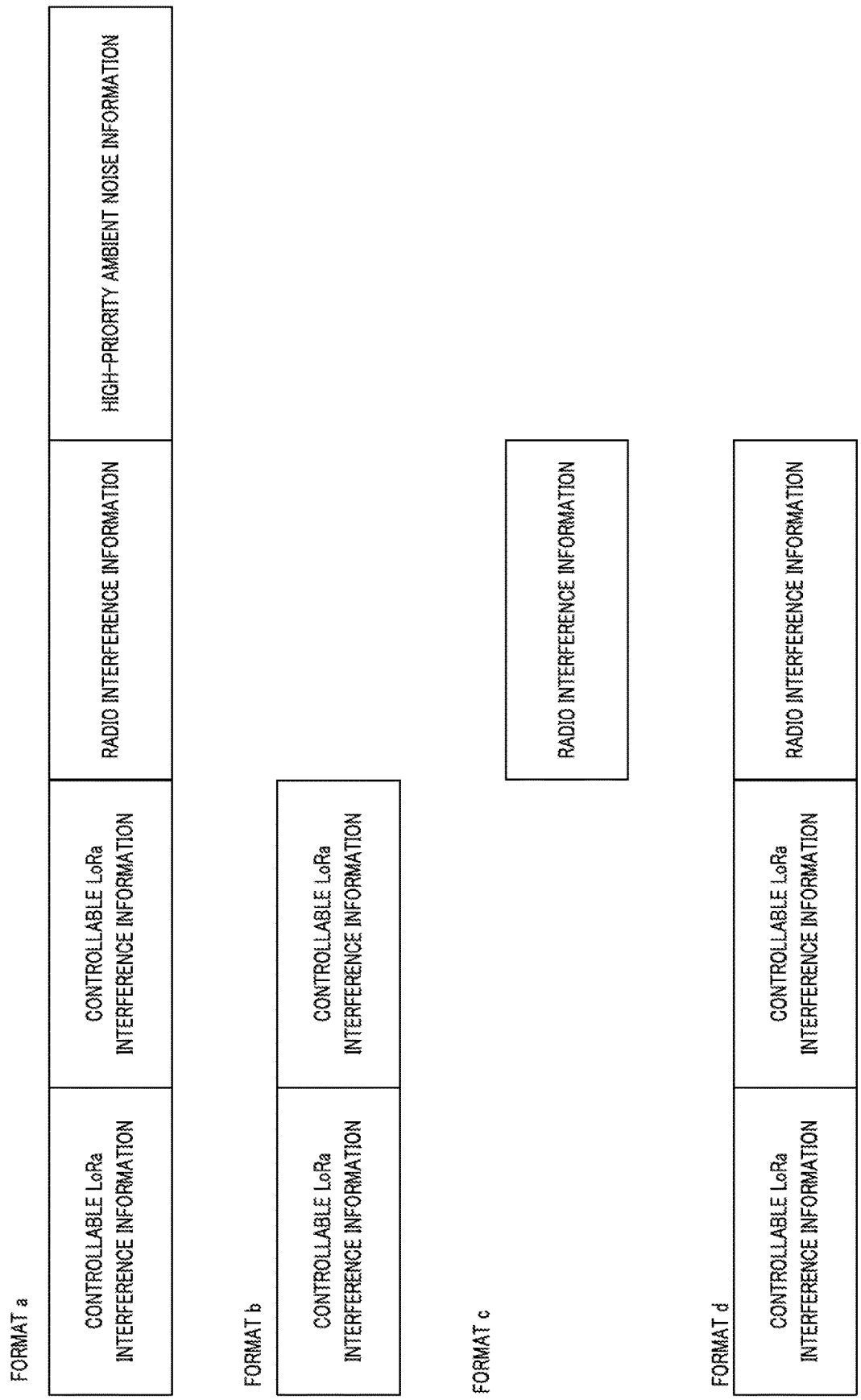
FIG. 38 is a diagram illustrating an example of a format of notification information at four different timings.

FIG. 38 is a diagram illustrating exemplary formats of notification information at four different timings. FIG. 38 illustrates an example in which the format illustrated in FIG. 31 is applied to the format of notification information, and the notification frequency is set in accordance with the type of interference. FIG. 38 illustrates a configuration example of notification information fields of one channel included in the format of notification information.

Format a of the notification information in FIG. 38 is an exemplary notification format at the timing of providing notification of controllable interference information, radio interference information, and high-priority ambient noise information.

Format b of the notification information in FIG. 37 is an exemplary notification format at the timing of providing notification of controllable interference information and not providing notification of radio interference information and high-priority ambient noise information. In Format b, since notification of radio interference information and high-priority ambient noise information is not provided, the "radio interference information" field and the "high-priority ambient noise information" field are omitted.

Format c of the notification information in FIG. 38 is an exemplary notification format at the timing of providing notification of radio interference information and not providing notification of controllable interference information and high-priority ambient noise information. In Format c, since notification of controllable interference information and high-priority ambient noise information is not provided, the "controllable LoRa interference information" field, the "controllable Wi-SUN interference information" field, and the "high-priority ambient noise information" field are omitted.

Format d of the notification information in FIG. 38 is an exemplary notification format at the timing of providing notification of controllable interference information and radio interference information and not providing notification of high-priority ambient noise information. In Format d, since notification of high-priority ambient noise information and high-priority ambient noise information is not provided, the "high-priority ambient noise information" field is omitted.

In the above description, an example has been described in which the notification frequencies of controllable LoRa interference information and controllable Wi-SUN interference information are the same, but the present disclosure is not limited to this example. For example, the notification frequencies of controllable LoRa interference information and controllable Wi-SUN interference information may differ from each other.

Note that, in the above description, the formats for different notification frequencies have been described with the notification information formats illustrated in FIGS. 27 and 31 as examples, but another notification information format may be applied, and a different notification frequency may be set.

<Example of Flow According to Variation 9>

A processing flow in radio communication apparatus 100 for generating notification information in Variation 9 described above will be described. Hereinafter, a description will be given of generating notification information in accordance with notification timings illustrated in FIG. 37 as an example.

The processing flow in radio communication apparatus 100 for generating the notification information in Variation 9 described above is the same as FIG. 9 illustrated in Variation 1. However, the processing of S106 and S107 in FIG. 9 is different from Variation 1. Hereinafter, the processing of S106 and S107 in FIG. 9 will be described.

<Example of Flow of Processing in S106>

Figure 39:
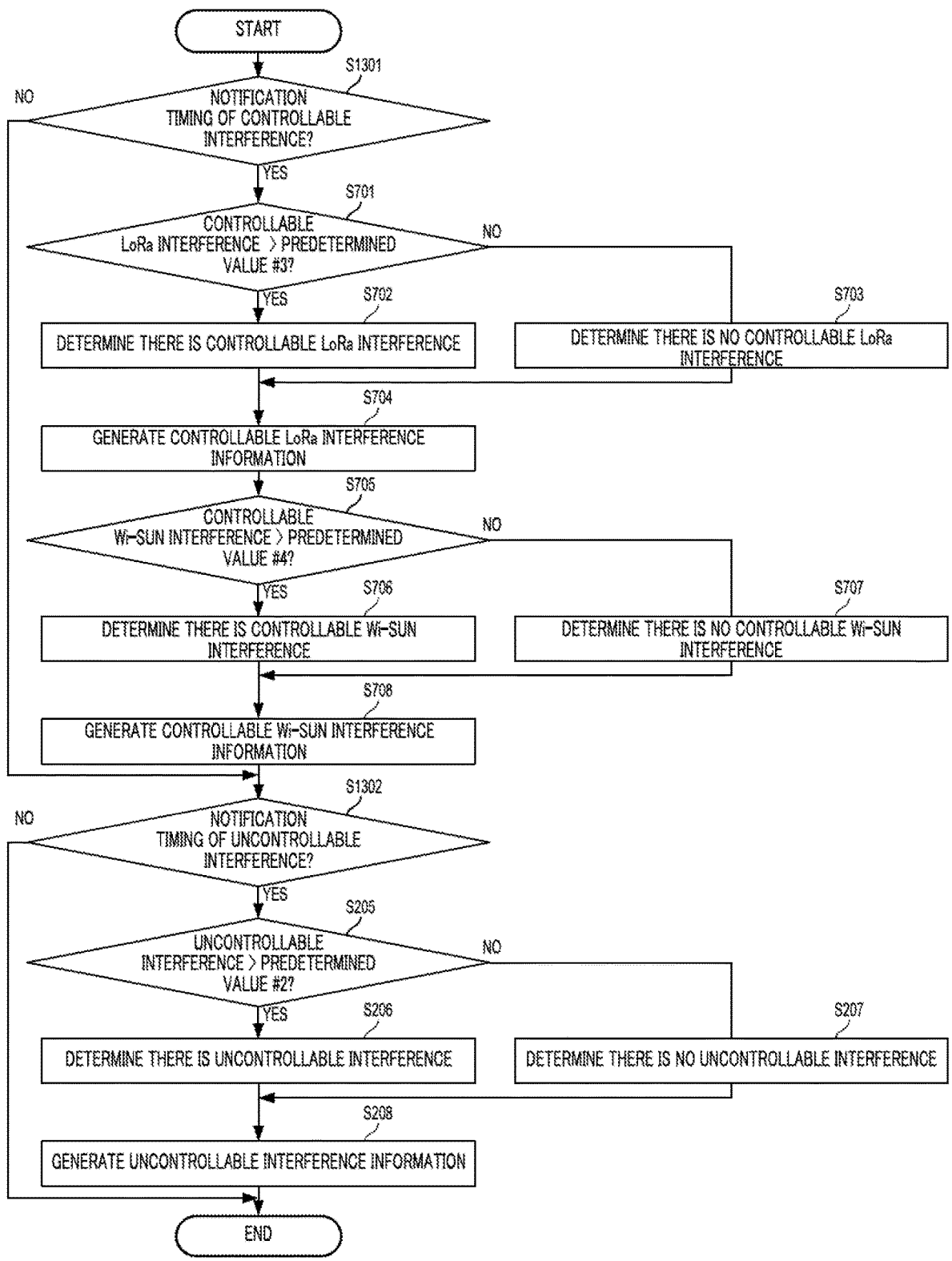
FIG. 39 is a flowchart illustrating a third example of the processing to be executed in S106 of FIG. 9.

FIG. 39 is a flowchart illustrating a second example of the processing to be executed in S106 of FIG. 9. Note that, in FIG. 39, the processing similar to that in FIGS. 10 and 28 is denoted by the same reference numeral and its description may be omitted.

Radio communication apparatus 100 determines whether the notification timing of notification information is the notification timing of controllable interference information (S1301).

When the notification timing of notification information is the notification timing of controllable interference information (YES in S1301), the flow shifts to the processing of S701.

When the notification timing of notification information is not the notification timing of controllable interference information (NO in S1301), the flow shifts to the processing of S1302.

Radio communication apparatus 100 determines whether the notification timing of notification information is the notification timing of uncontrollable interference information (S1302).

When the notification timing of notification information is the notification timing of uncontrollable interference information (YES in S1302), the flow shifts to the processing of S205.

When the notification timing of notification information is not the notification timing of uncontrollable interference information (NO in S1302), the flow of FIG. 39 ends.

<Example of Flow of Processing in S107>

Figure 40:
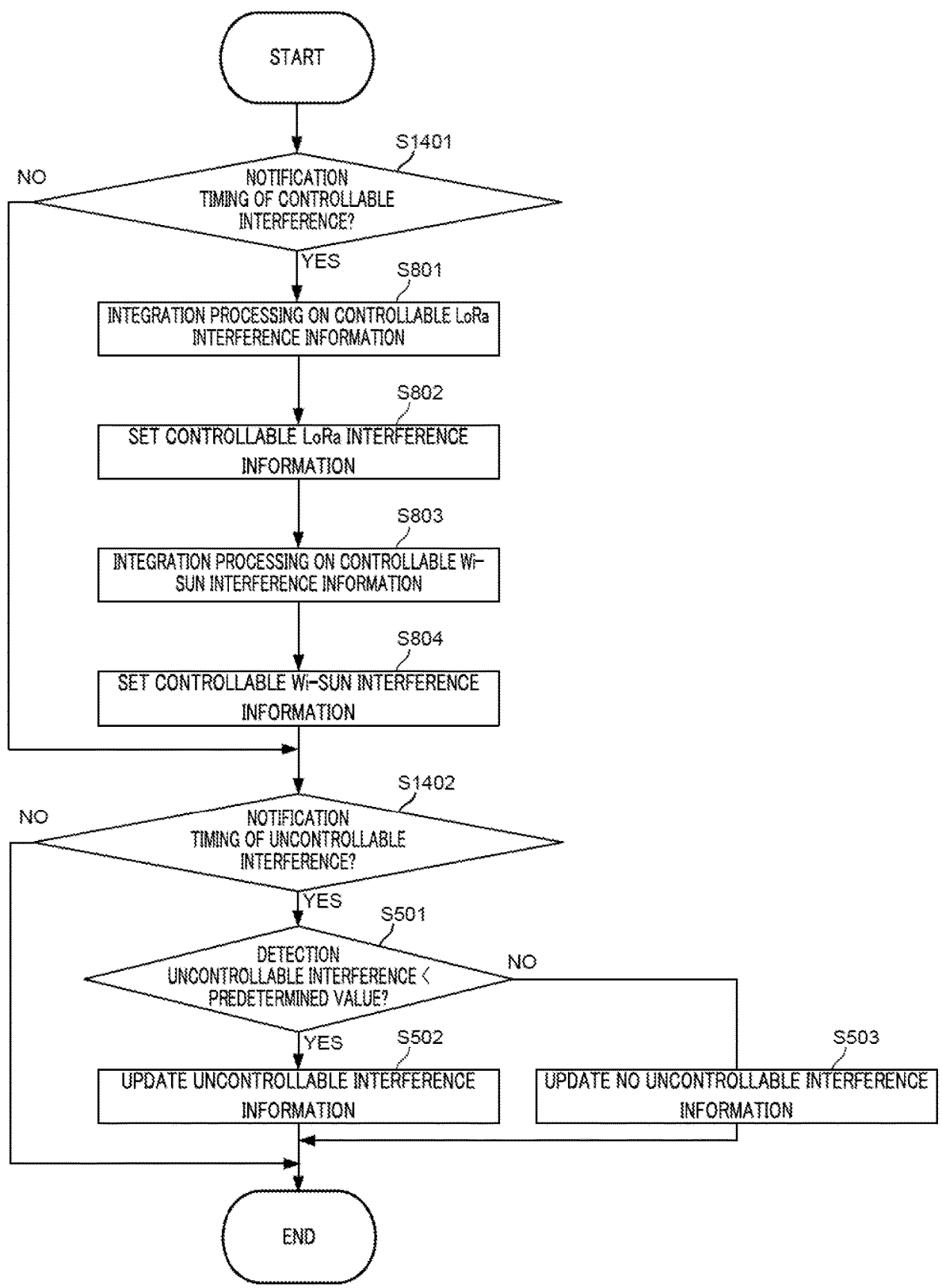
FIG. 40 is a flowchart illustrating a sixth example of the processing to be executed in S107 of FIG. 9.

FIG. 40 is a flowchart illustrating a second example of the processing to be executed in S107 of FIG. 9. Note that, in FIG. 40, the processing similar to that in FIGS. 21 and 29 is denoted by the same reference numeral and its description may be omitted.

Radio communication apparatus 100 determines whether the notification timing of notification information is the notification timing of controllable interference information (S1401).

When the notification timing of notification information is the notification timing of controllable interference information (YES in S1401), the flow shifts to the processing of S801.

When the notification timing of notification information is not the notification timing of controllable interference information (NO in S1401), the flow shifts to the processing of S1402.

Radio communication apparatus 100 determines whether the notification timing of notification information is the notification timing of uncontrollable interference information (S1402).

When the notification timing of notification information is the notification timing of uncontrollable interference information (YES in S1402), the flow shifts to the processing of S501.

When the notification timing of notification information is not the notification timing of uncontrollable interference information (NO in S1402), the flow of FIG. 40 ends.

In Variation 9 described above, an example has been described in which the notification frequency (e.g., notification timing) of controllable interference information and the notification frequency (e.g., notification timing) of uncontrollable interference information are set independently from each other. With the notification, information with a low notification frequency is not include in the notification information, so that the information amount of notification information can be reduced. Further, with this notification, the channel assignment to a terminal in a network can be performed appropriately, and the optimization (e.g., achieving improvement of frequency utilization efficiency and interference reduction to another network and another system at the same time) of the network can be further attempted.

In Variation 9, the notification frequency to be set in accordance with the type of interference may be variable temporally and/or for each channel. The notification of information on notification frequency may be provided by communication between nodes. For example, notification of the information on notification frequency may be provided via a higher layer message and/or the like from an NW (e.g., control apparatus (see FIG. 1)).

In Variation 9, the notification frequency may be independently set for each node. For example, the following notification frequencies may be set to frequencies different from each other: notification of the notification frequency to be provided from a downstream relay node to an upstream relay node; notification of the notification frequency to be provided from a relay node downstream of a GW to the GW; and notification of the notification frequency to be provided from a GW to a NW. For example, in this case, there may be processing for a certain node, which is to transmit (forward) notification information received from a node downstream of the certain node to an upstream node while the certain node does not provided any notification on interference detected by the certain node itself <Variation 10 of Notification Information>

Note that, the format of notification information may be changed in accordance with the configuration of a network including a relay node and a GW (relay network), the functions (e.g., supporting communication mode) of a relay node and the type of information to be provided as notification by a relay node. Hereinafter, in Variation 10 of notification information, an example will be described in which the types of information provided as notification by relay nodes are defined.

Note that, hereinafter, a relay node that supports a Wi-SUN mode and does not support an LoRa mode may be referred to as a "Wi-SUN relay node." Further, a relay node that supports an LoRa mode and does not support a Wi-SUN mode may be referred to as an "LoRa relay node." Further, a relay node that supports an LoRa mode and a Wi-SUN mode may be referred to as a "Wi-SUN/LoRa relay node." In other words, an "LoRa relay node" and a "Wi-SUN/LoRa relay node" are relay nodes supporting the LoRa mode, and a "Wi-SUN relay node" and a "Wi-SUN/LoRa relay node" are relay nodes supporting the Wi-SUN mode.

Figure 41:
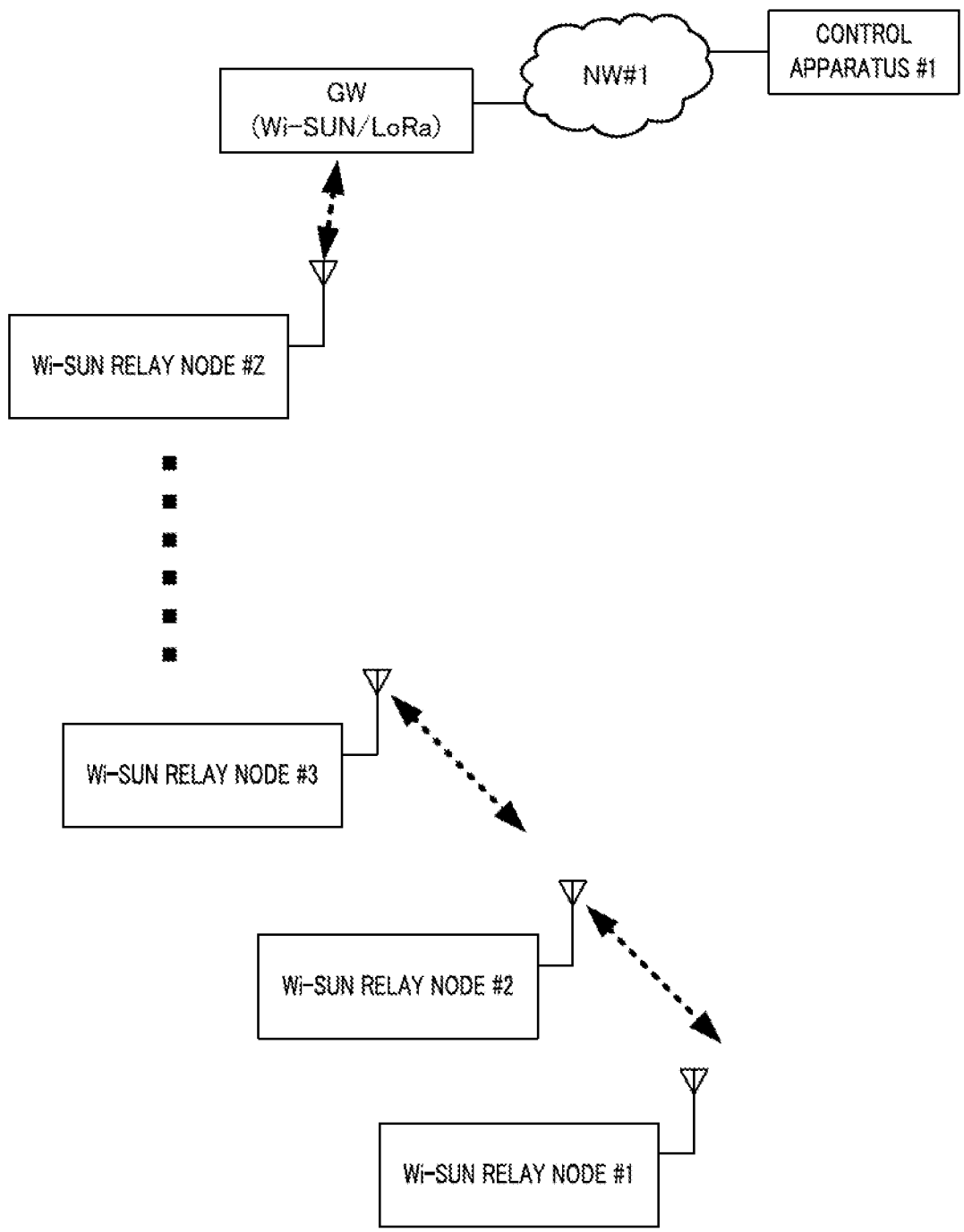
FIG. 41 is a diagram illustrating another exemplary network including a base station (GW) and relay stations (relay nodes)

FIG. 41 is a diagram illustrating another example of a network with a base station (GW) and relay stations (relay nodes). FIG. 41 illustrates a relay network including a base station (GW) and Z Wi-SUN relay nodes. Note that, the GWs support both the LoRa mode and Wi-SUN mode.

For example, the Wi-SUN mode has a short communication distance and a small communicable area compared with the LoRa mode. Therefore, as illustrated in FIG. 41, a network including relay nodes supporting the Wi-SUN mode without any relay node supporting the LoRa mode may be formed.

For example, a Wi-SUN relay node detects interference caused by communication of the Wi-SUN mode and provides notification of notification information including a detection result to an upstream node. The GW provides notification of the notification information provided from a downstream node and notification information including a detection result of detection by the GW to an NW (e.g., control apparatus #1 (see FIG. 1)).

In other words, for example, in the network illustrated in FIG. 41, the communication mode supported by the relay nodes is the Wi-SUN mode, notification of information provided by a relay node may be information on interference caused by communication of the Wi-SUN mode.

Hereinafter, a description will be given of a format of notification information in the network configuration described above. Note that, among uncontrollable interference, uncontrollable interference caused by communication of the LoRa mode may be referred to as "uncontrollable LoRa interference." Further, among uncontrollable interference, uncontrollable interference caused by communication of the Wi-SUN mode may be referred to as "uncontrollable Wi-SUN interference."

Figure 42:
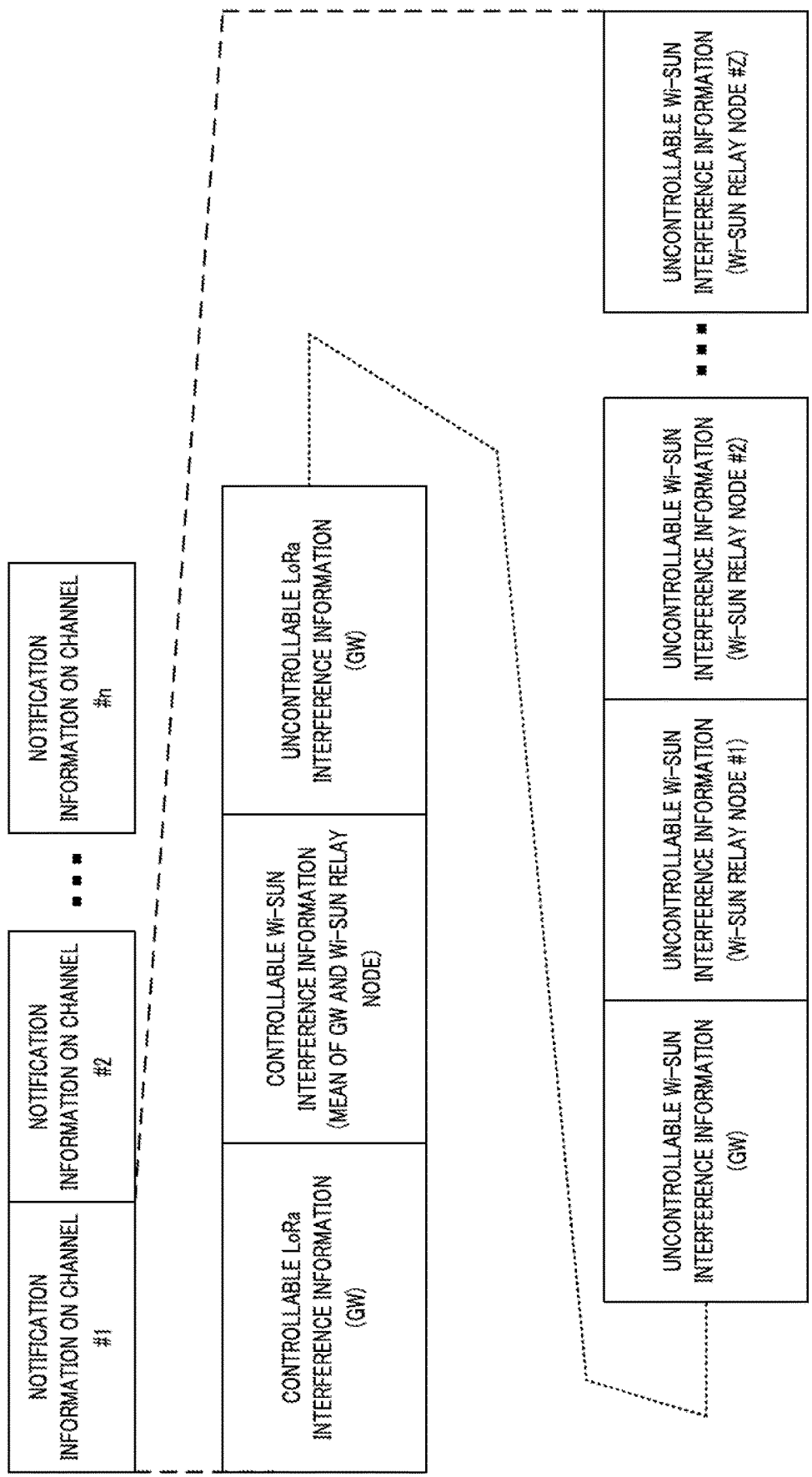
FIG. 42 is a diagram illustrating Example 9 of the format of notification information of a GW, according to the embodiment of the present disclosure.

FIG. 42 is a diagram illustrating Example 9 of the format of notification information of a GW, according to the present embodiment. The format illustrated in FIG. 42 indicates a format of information provided by the GW of the relay node network illustrated in FIG. 41 to an NW (e.g., control apparatus #1).

The format of notification information illustrated in FIG. 42 includes the fields in which pieces of notification information on the respective channels of channel #1 to channel #n are set.

The "notification information on channel #1" field includes a "controllable LoRa interference information" field, a "controllable Wi-SUN interference information" field, an "uncontrollable LoRa interference information" field and Z+1 "uncontrollable Wi-SUN interference information" fields.

In the "controllable LoRa interference information" field, information on controllable LoRa interference detected in a GW, e.g., a detection result of an interference amount of the controllable LoRa interference is set.

In the "controllable Wi-SUN interference information" field, information on controllable Wi-SUN interference, e.g., a detection result of an interference amount of the controllable Wi-SUN interference is set. For example, in the "controllable Wi-SUN interference information" field, a value indicating a mean of interference amounts of the controllable Wi-SUN interference detected respectively in a GW and Wi-SUN relay nodes under the GW is set.

In the "uncontrollable LoRa interference information" field, information on uncontrollable LoRa interference detected in the GW, e.g., a detection result of an interference amount of the controllable LoRa interference is set.

Z+1 "uncontrollable Wi-SUN interference information" fields are associated with a GW and Z relay nodes, respectively. In the "uncontrollable Wi-SUN interference information" field associated with a GW, for example, information on the uncontrollable Wi-SUN interference detected in the GW, such as a detection result of an interference amount of the uncontrollable Wi-SUN interference in the GW is set, for example. Likewise, in the "uncontrollable Wi-SUN interference information" field associated with relay node #i ("i" represents an integer between 1 to Z), information on the uncontrollable Wi-SUN interference detected in Wi-SUN relay node #i, such as a detection result of an interference amount of the uncontrollable Wi-SUN interference in relay node #i is set, for example.

Note that, a GW receives notification information including a detection result of a relay node under the GW from the relay node under the GW. For example, a relay node receives notification information including a detection result of a downstream relay node from the downstream relay node.

The Wi-SUN relay nodes in the relay network of FIG. 41 each detect interference caused by communication of the Wi-SUN mode (controllable Wi-SUN interference and uncontrollable Wi-SUN interference) and provide notification information including the detection result to an upstream node. Therefore, in the format illustrated in FIG. 42, a detection result in a Wi-SUN relay node may not be included in the controllable LoRa interference information and uncontrollable LoRa interference information. Further, although illustration is omitted, the format of notification information transmitted or received by Wi-SUN relay nodes may not include controllable LoRa interference information and uncontrollable LoRa interference information fields.

For example, Wi-SUN relay node #1 illustrated in FIG. 42 provides notification information to Wi-SUN relay node #2 using the format of notification information including the "controllable Wi-SUN interference information" field and "uncontrollable Wi-SUN interference information" field in the field of notification information on each channel. Note that, in the "controllable Wi-SUN interference information" field, a value indicating an interference amount of the controllable Wi-SUN interference detected in Wi-SUN relay node #1 may be set. Further, in the "uncontrollable Wi-SUN interference information" field, a value indicating an interference amount of the uncontrollable Wi-SUN interference detected in Wi-SUN relay node #1 may be set.

Further, for example, Wi-SUN relay node #Y (Y is an integer not less than 2 and not greater than Z) illustrated in FIG. 42 receives notification information including a detection result of a Wi-SUN relay node downstream of Wi-SUN relay node #Y from Wi-SUN relay node #Y−1. Wi-SUN relay node #Y generates notification information to be transmitted to a relay node upstream of Wi-SUN relay node #Y or a GW, by integrating the detection result of the downstream Wi-SUN relay node included in the received notification information with a detection result of Wi-SUN relay node #Y.

Notification information in Wi-SUN relay node #Y is the same as the notification information described using FIG. 6. In Variation 10, a Wi-SUN relay node provides notification information including a detection result of interference (controllable Wi-SUN interference and uncontrollable Wi-SUN interference) caused by communication of the Wi-SUN mode to an upstream node. Therefore, in Variation 10, the "controllable interference information" field and "uncontrollable interference information" field in FIG. 6 may be replaced with the "controllable Wi-SUN interference information" field and "uncontrollable Wi-SUN interference information" field, respectively.

<Example of Flow According to Variation 19>

A processing flow in radio communication apparatus 100 for generating notification of the format illustrated in FIG. 42 will be described.

Figure 43:
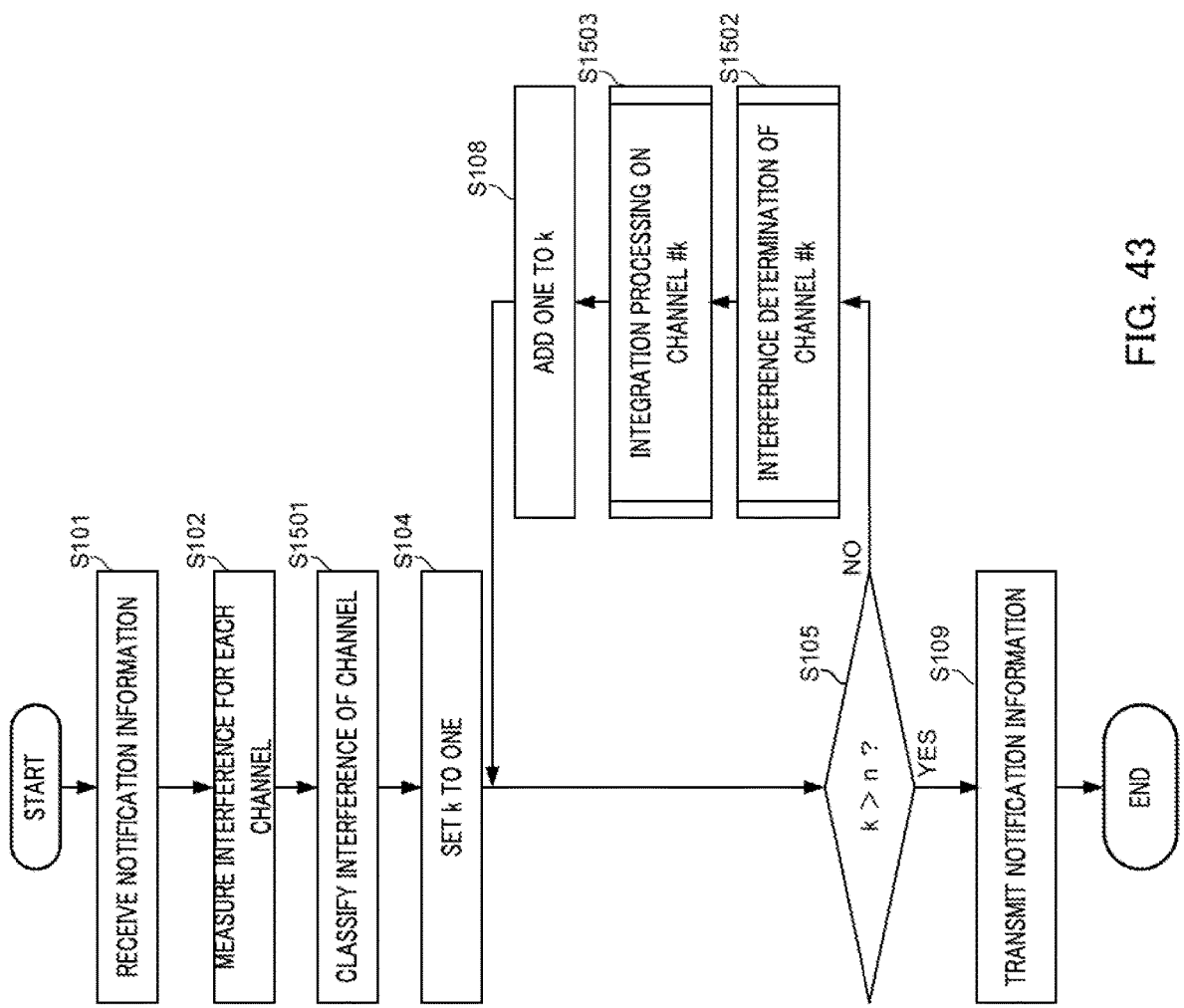
FIG. 43 is a flowchart illustrating a third example of the notification information generation processing according the embodiment of the present disclosure.

FIG. 43 is a flowchart illustrating a third example of the notification information generation processing according to the present embodiment. For example, the flow illustrated in FIG. 43 is performed prior to notification timing of notification information. Note that, in FIG. 43, the processing similar to that in FIG. 9 is denoted by the same reference numeral and its description may be omitted.

Radio communication apparatus 100 classifies interference measured for each channel (S1501). Radio communication apparatus 100 herein classifies the interference measured for each channel, in accordance with the communication modes supported by radio communication apparatus 100.

In a case that radio communication apparatus 100 supports the Wi-SUN mode and LoRa mode (e.g., GW in FIG. 41), radio communication apparatus 100 classifies the measured interference by channel into controllable Wi-SUN interference, controllable LoRa interference, uncontrollable Wi-SUN interference, and uncontrollable LoRa interference. In a case that radio communication apparatus 100 supports the Wi-SUN mode and does not support the LoRa mode (e.g, Wi-SUN relay node in FIG. 41), radio communication apparatus 100 classifies the interference measured for each channel into controllable Wi-SUN interference and uncontrollable Wi-SUN interference.

Radio communication apparatus 100 performs determination processing of interference on channel #k (S1502).

Radio communication apparatus 100 herein performs determination processing on the interference classified in the processing of S1501. In the determination processing, radio communication apparatus 100 generates information on the interference classified in the processing of S1501.

Radio communication apparatus 100 performs integration processing for the information on the interference, generated by radio communication apparatus 100 and the information included in the received notification information (S1503).

<Example of Flow of Processing in S1502>

Figure 44:
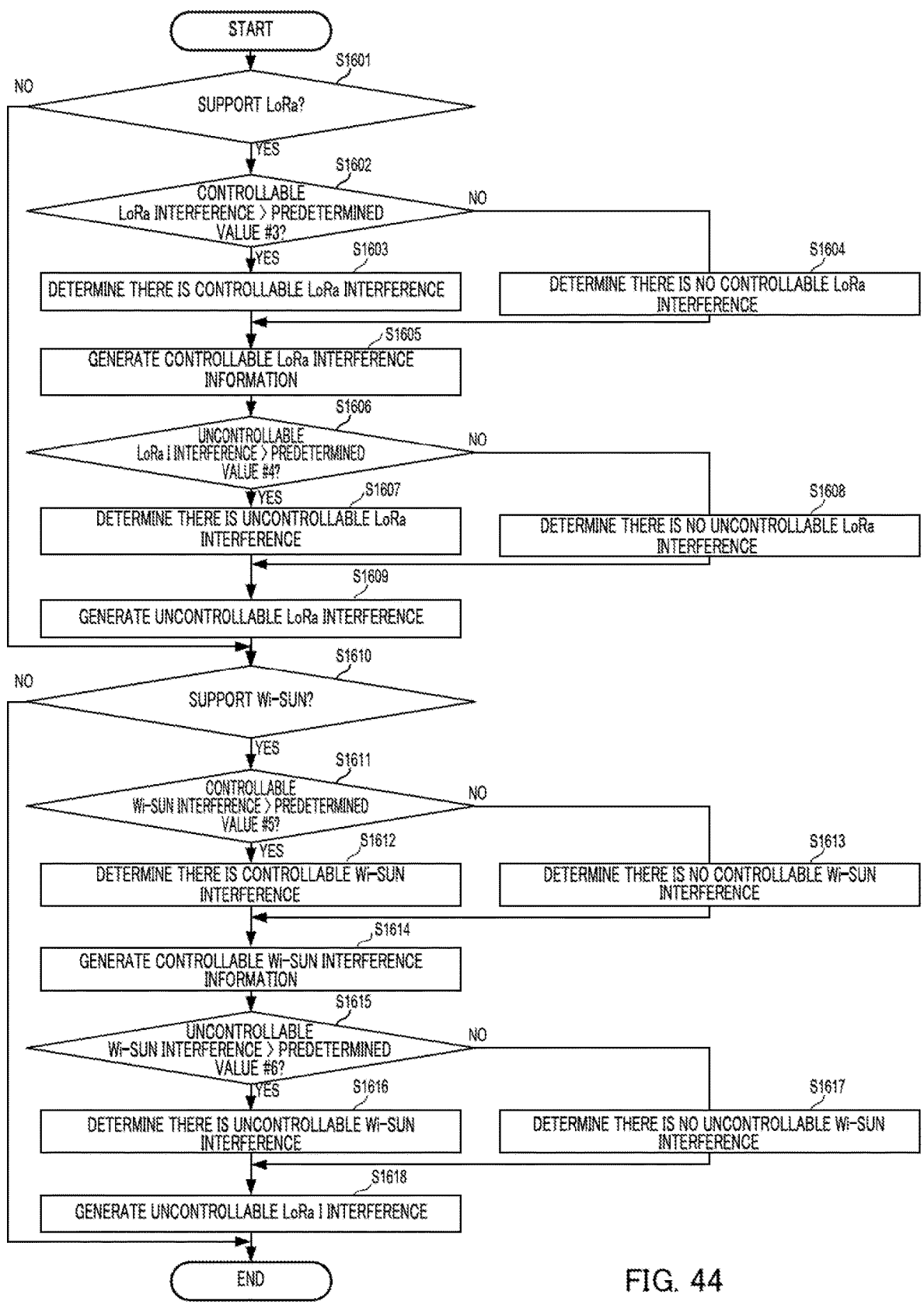
FIG. 44 is a flowchart illustrating a first example of processing to be executed in S1502 of FIG. 43.

Next, a description will be given of a flow of processing to be executed in S1502 of FIG. 43. FIG. 44 is a flowchart illustrating a first example of processing to be executed in S1502 of FIG. 43. Note that, in FIG. 44, the processing similar to that in FIG. 10 is denoted by the same reference numeral and its description may be omitted.

Radio communication apparatus 100 determines whether it supports the LoRa mode (S1601).

When radio communication apparatus 100 does not support the LoRa mode (NO in S1601), the flow shifts to S1610.

When radio communication apparatus 100 supports the LoRa mode (YES in S1601), radio communication apparatus 100 determines whether the interference amount of controllable LoRa interference is greater than predetermined value #3 (S1602).

When the interference amount of controllable LoRa interference is greater than predetermined value #3 (YES in S1602), radio communication apparatus 100 determines that there is controllable LoRa interference (S1603).

When the interference amount of controllable LoRa interference is not greater than predetermined value #3 (NO in S1602), radio communication apparatus 100 determines that there is no controllable LoRa interference (S1604).

Radio communication apparatus 100 generates controllable LoRa interference information (e.g., controllable LoRa interference information on channel #k) for each channel based on the determination result of S1603 or S1604 (S1605). Note that, an exemplary value indicated by the controllable LoRa interference information for each channel is the same as the value indicated by the controllable interference information for each channel illustrated in FIG. 10, so that the description is omitted.

Radio communication apparatus 100 determines whether the interference amount of uncontrollable LoRa interference is greater than predetermined value #4 (S1606).

When the interference amount of uncontrollable LoRa interference is greater than predetermined value #4 (YES in S1606), radio communication apparatus 100 determines that there is uncontrollable LoRa interference (S1607).

When the interference amount of uncontrollable LoRa interference is not greater than predetermined value #4 (NO in S1606), radio communication apparatus 100 determines that there is no uncontrollable LoRa interference (S1608).

Radio communication apparatus 100 generates uncontrollable LoRa interference information (e.g., uncontrollable LoRa interference information on channel #k) for each channel based on the determination result of S1607 or S1608 (S1609). Note that, an exemplary value indicated by the uncontrollable LoRa interference information for each channel is the same as the value indicated by the uncontrollable interference information for each channel illustrated in FIG. 10, so that the description is omitted.

Radio communication apparatus 100 determines whether it supports the Wi-SUN mode (S1610).

When radio communication apparatus 100 does not support the Wi-SUN mode (NO in S1610), the flow of FIG. 44 ends.

When radio communication apparatus 100 supports the Wi-SUN mode (YES in S1610), radio communication apparatus 100 determines whether the interference amount of controllable Wi-SUN interference is greater than predetermined value #5 (S1611).

When the interference amount of controllable Wi-SUN interference is greater than predetermined value #5 (YES in S1611), radio communication apparatus 100 determines that there is controllable Wi-SUN interference (S1612).

When the interference amount of controllable Wi-SUN interference is not greater than predetermined value #5 (NO in S1611), radio communication apparatus 100 determines that there is no controllable Wi-SUN interference (S1613).

Radio communication apparatus 100 generates controllable Wi-SUN interference information (e.g., controllable Wi-SUN interference information on channel #k) for each channel based on the determination result of S1612 or S1613 (S1614). Note that, an exemplary value indicated by the controllable Wi-SUN interference information for each channel is the same as the value indicated by the controllable interference information for each channel illustrated in FIG. 10, so that the description is omitted.

Radio communication apparatus 100 determines whether the interference amount of uncontrollable Wi-SUN interference is greater than predetermined value #6 (S1615).

When the interference amount of uncontrollable Wi-SUN interference is greater than predetermined value #6 (YES in S1615), radio communication apparatus 100 determines that there is uncontrollable Wi-SUN interference (S1616).

When the interference amount of uncontrollable Wi-SUN interference is not greater than predetermined value #6 (NO in S1615), radio communication apparatus 100 determines that there is no uncontrollable Wi-SUN interference (S1617).

Radio communication apparatus 100 generates uncontrollable Wi-SUN interference information (e.g., uncontrollable Wi-SUN interference information on channel #k) for each channel based on the determination result of S1616 or S1617 (S1618). The flow of FIG. 44 ends. For example, in this case, the flow shifts to S1503 in the flow of FIG. 43. Note that, an exemplary value indicated by the uncontrollable Wi-SUN interference information for each channel is the same as the value indicated by the uncontrollable interference information for each channel illustrated in FIG. 10, so that the description is omitted.

<Example of Flow of Processing in S1503>

Next, a description will be given of a flow of processing to be executed in S1503 of FIG. 43.

Figure 45:
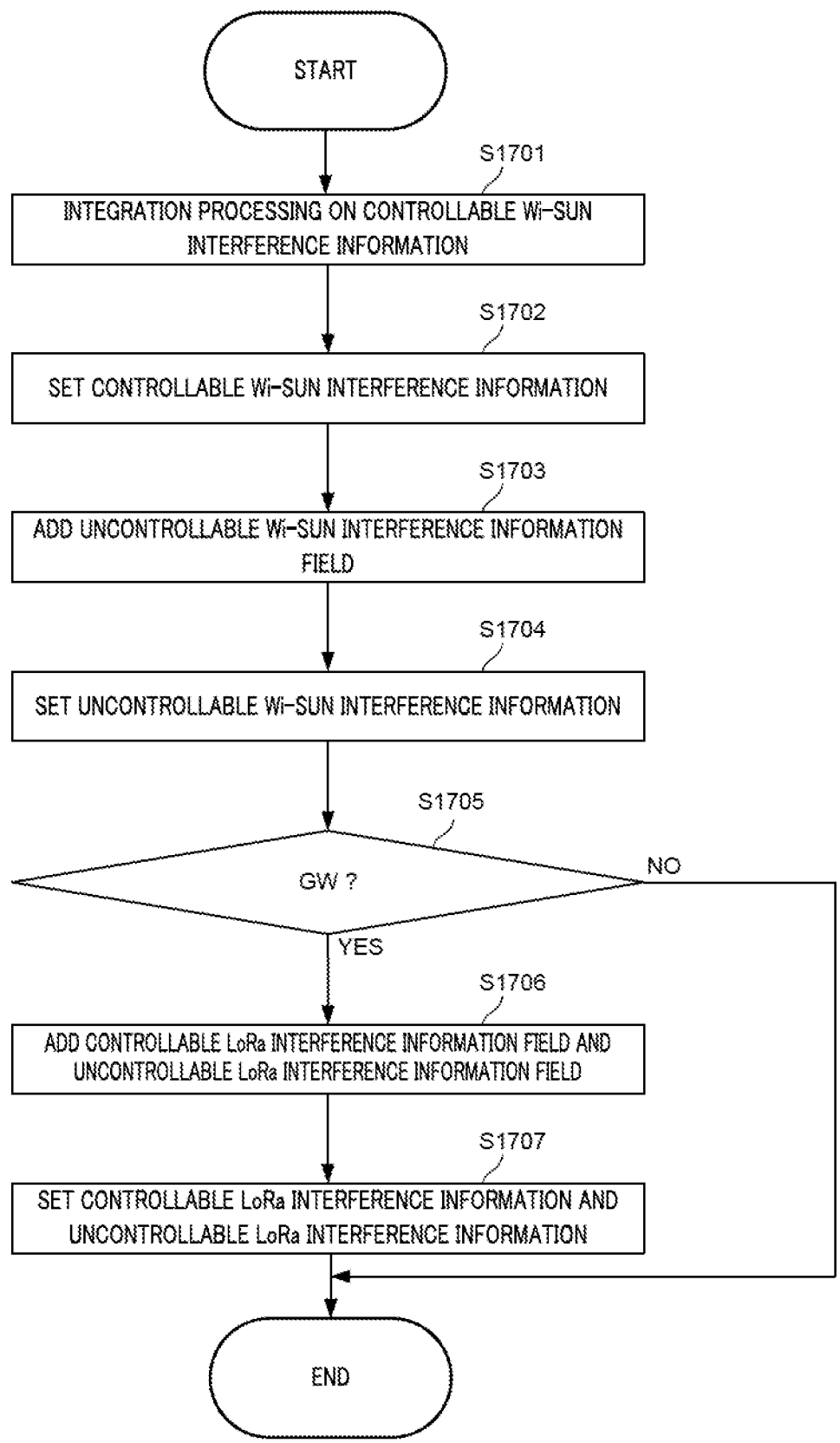
FIG. 45 is a flowchart illustrating a first example of processing to be executed in S1503 of FIG. 43.

FIG. 45 is a flowchart illustrating a first example of processing to be executed in S1503 of FIG. 43.

Radio communication apparatus 100 performs integration processing of controllable Wi-SUN interference information (S1701). For example, radio communication apparatus 100 determines a mean value of the interference amount indicated by the controllable Wi-SUN interference information included in the received notification information and the interference amount indicated by the controllable Wi-SUN interference information generated in radio communication apparatus 100. Note that, an exemplary determination of a mean value has been given using FIG. 11, so that the description is omitted.

Radio communication apparatus 100 sets the controllable Wi-SUN interference information after the integration processing in the "controllable Wi-SUN interference information" field of the notification information transmitted by radio communication apparatus 100 (S1702).

Radio communication apparatus 100 adds an "uncontrollable Wi-SUN interference information" field in the received notification information (S1703).

Radio communication apparatus 100 sets the uncontrollable Wi-SUN interference information in radio communication apparatus 100 in the added "uncontrollable Wi-SUN interference information" field (S1704).

Radio communication apparatus 100 determines whether it is a GW (S1705).

When radio communication apparatus 100 is not a GW (NO in S1705), for example, when radio communication apparatus 100 is a Wi-SUN relay node, the flow of FIG. 45 ends.

When radio communication apparatus 100 is a GW (YES in S1705), radio communication apparatus 100 adds fields for information on LoRa interference ("controllable LoRa interference information" field and "uncontrollable LoRa interference information" field in the received notification information (S1706).

Radio communication apparatus 100 sets the controllable LoRa interference information and uncontrollable LoRa interference information in radio communication apparatus 100 in the added fields (S1707).

Upon completion of the processing of S1707, the integration processing for the interference for channel #k is complete, and the flow in FIG. 45 ends. For example, in this instance, the processing shifts to S108 in the flow of FIG. 43.

In Variation 10 described above, notification of the result of classifying the interference detected by a GW and relay nodes is provided. Then, in the uncontrollable Wi-SUN interference information of notification information, notification of a result of each node is provided, and in the controllable Wi-SUN interference information, notification of a mean among the nodes is provided, so that notification of an interference detection result can be appropriately provided by each apparatus in a network where relay nodes are provided in a band used by various radio systems. Further, in this notification, notification of a mean among the nodes is provided, so that the information amount of notification information can be reduced.

Further, in Variation 10, notification of an interference detection result can be appropriately provided even in a network having a Wi-SUN relay node and no LoRa relay node, so that the optimization of the network can be achieved.

<Variation 11 of Notification Information>

Note that, in the example of FIG. 42, the format of notification information including one "controllable Wi-SUN interference information" field has been described. Then a description has been given of an example in which, in one "controllable Wi-SUN interference information" field, a value indicating a mean of interference amounts of the controllable Wi-SUN interference detected respectively in a GW and Wi-SUN relay nodes under the GW is set. The present disclosure is not limited to this example. Hereinafter, in Variation 11, a description will be given of an example in which the format of notification information includes "controllable Wi-SUN interference information" fields respectively corresponding to a GW and Wi-SUN relay nodes under the GW.

Figure 46:
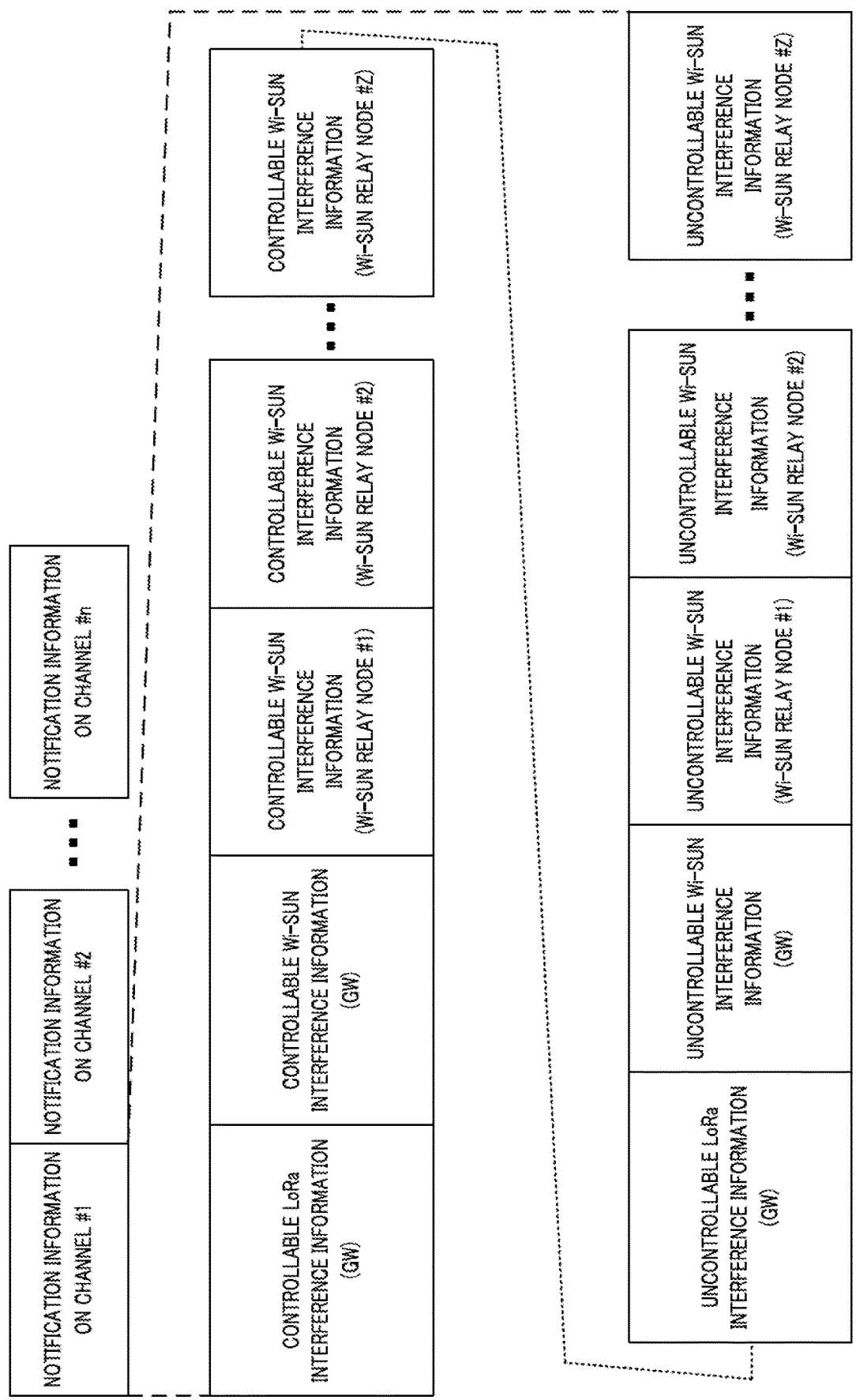
FIG. 46 is a diagram illustrating Example 10 of the format of notification information of a GW, according to the embodiment of the present disclosure.

FIG. 46 is a diagram illustrating Example 10 of the format of transmission notification information of a GW, according to the present embodiment. Note that, in the format in FIG. 46, the same fields as those of the format illustrated in FIG. 42 will not be described.

In the format illustrated in FIG. 46, one "controllable Wi-SUN interference information" field in the format illustrated in FIG. 42 is replaced with Z+1 "controllable Wi-SUN interference information" fields.

Z+1 "controllable Wi-SUN interference information" fields are associated with a GW and Z Wi-SUN relay nodes, respectively. In the "controllable Wi-SUN interference information" field associated with a GW, for example, information on the controllable Wi-SUN interference detected in the GW, such as a detection result of an interference amount of the controllable Wi-SUN interference in the GW is set, for example. Likewise, in the "controllable Wi-SUN interference information" field associated with Wi-SUN relay node #i ("i" represents an integer between 1 to Z), information on the controllable Wi-SUN interference detected in Wi-SUN relay node #i, such as a detection result of an interference amount of the controllable Wi-SUN interference in Wi-SUN relay node #i is set, for example.

<Example of Flow According to Variation 11>

A processing flow in radio communication apparatus 100 for generating notification information of Variation 11 described above will be described.

The processing flow in radio communication apparatus 100 for generating the notification information of Variation 11 is the same as FIG. 43 illustrated in Variation 10. However, the processing of S1503 in FIG. 43 is different from Variation 10. Hereinafter, the processing of S1503 in FIG. 43 will be described.

<Example of Flow of Processing in S1503>

Figure 47:
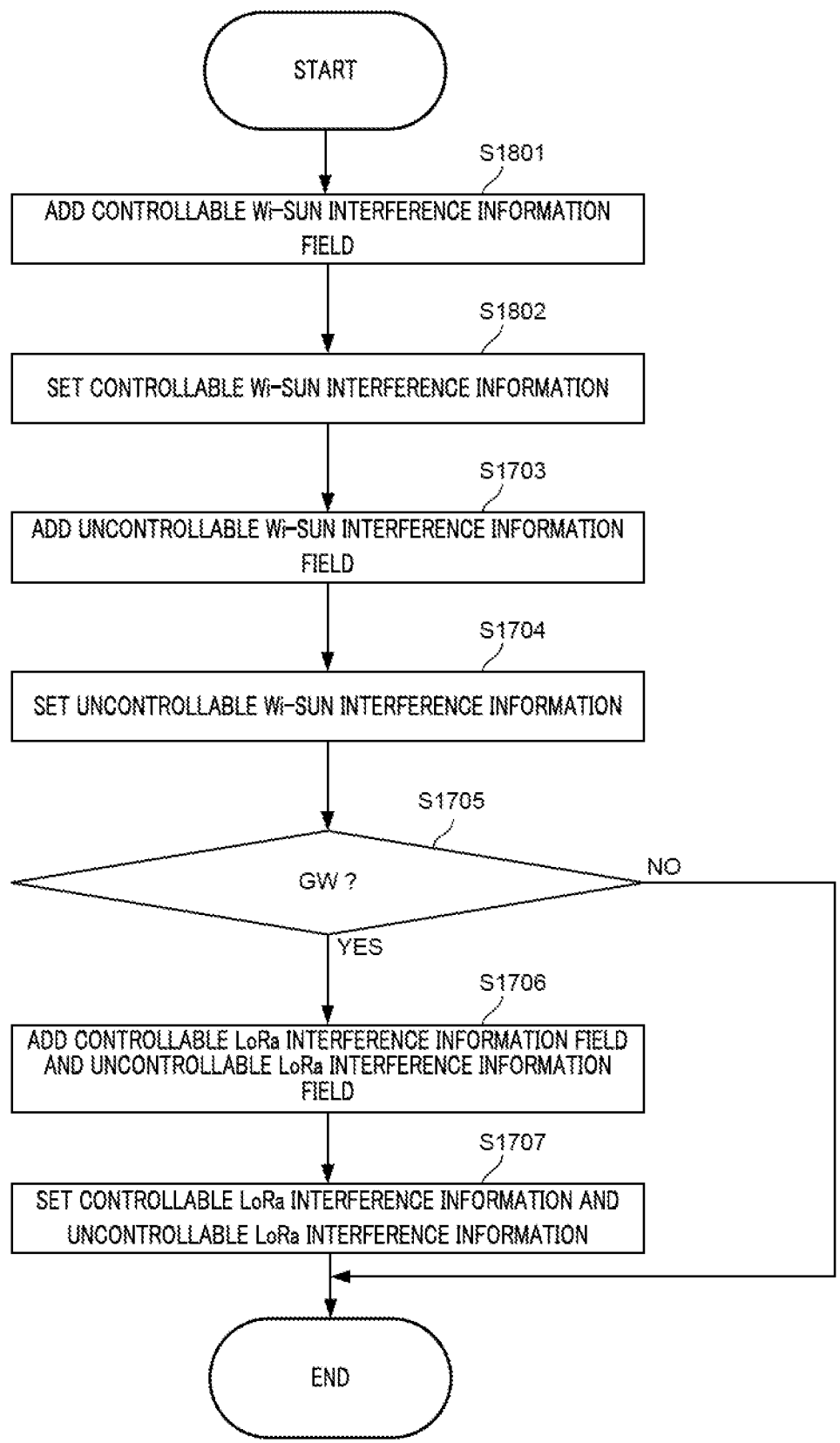
FIG. 47 is a flowchart illustrating a second example of the processing to be executed in S1503 of FIG. 43.

FIG. 47 is a flowchart illustrating a second example of the processing to be executed in S1503 of FIG. 43. Note that, in FIG. 47, the processing similar to that in FIG. 45 is denoted by the same reference numeral and its description may be omitted.

In the flow of FIGS. 47, S1701 and S1702 in FIG. 45 are replaced with S1801 and S1802.

Radio communication apparatus 100 adds a "controllable Wi-SUN interference information" field in the received notification information (S1801).

Radio communication apparatus 100 sets the controllable Wi-SUN interference information in radio communication apparatus 100 in the added "controllable Wi-SUN interference information" field (S1802).

In Variation 11 described above, notification of the result of classifying the interference detected by a GW and relay nodes is provided. Then, in the uncontrollable Wi-SUN interference information and controllable Wi-SUN interference information of notification information, notification of a result of each node is provided, so that notification of an interference detection result can be appropriately provided by each apparatus in a network where relay nodes are provided in a band used by various radio systems.

Further, in Variation 11, notification of an interference detection result can be appropriately provided even in a relay network having a Wi-SUN relay node and no LoRa relay node, so that the network can be optimized. Further, in Variation 11, notification of uncontrollable Wi-SUN interference information and controllable Wi-SUN interference information for each node is provided, so that the network can be optimized even in a case that channel assignment is subjected to centralized control on a NW (e.g., control apparatus #1) side.

Note that, the information included in the format illustrated in FIG. 46 may be provided as notification separately at plural times. For example, notification of the information indicating a detection result of a GW and notification of the information indicating a detection result of a Wi-SUN relay node are provided respectively in formats of notification information different from each other.

Figure 48A:
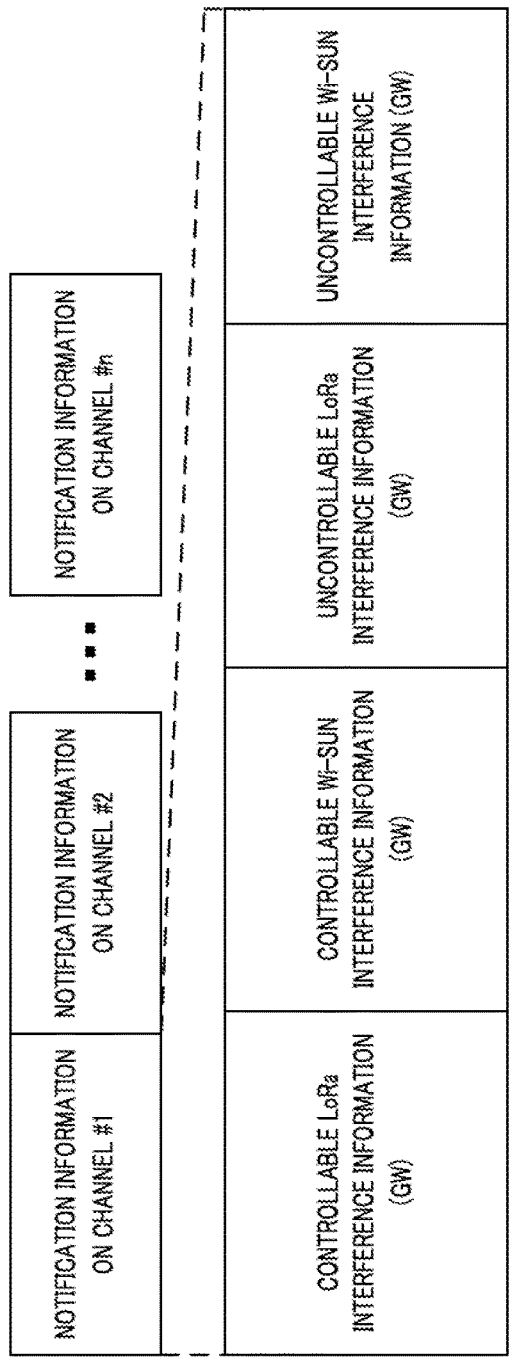
FIG. 48A is a diagram illustrating an example of a format of notification information including information indicating a detection result of a GW.
Figure 48B:
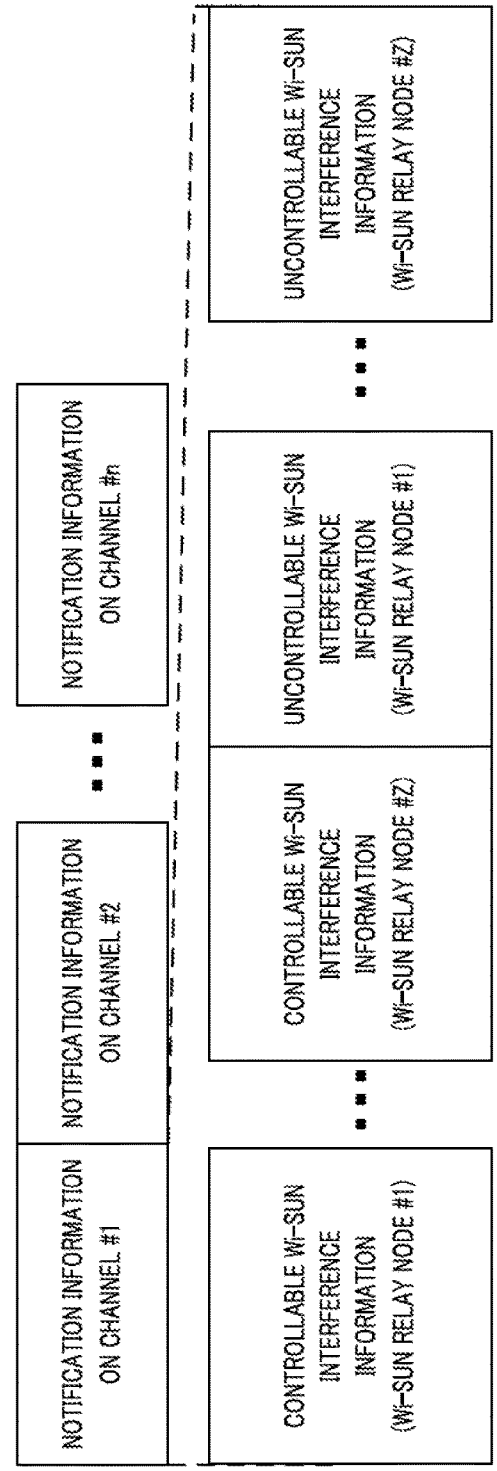
FIG. 48B is a diagram illustrating an example of a format of notification information including information indicating a detection result of a Wi-SUN relay node.

FIG. 48A is a diagram illustrating a format example of notification information including information indicating a detection result of a GW. FIG. 48B is a diagram illustrating a format example of notification information including information indicating a detection result of a Wi-SUN relay node. Note that, in FIGS. 48A and 48B, the same fields as the format illustrated in FIG. 46 will not be described.

The "notification information on channel #1" field in FIG. 48A includes a "controllable LoRa interference information" field, a "controllable Wi-SUN interference information" field, an "uncontrollable LoRa interference information" field and an "uncontrollable Wi-SUN interference information" field.

In the "controllable LoRa interference information" field, information on controllable LoRa interference detected in a GW is set. In the "controllable Wi-SUN interference information" field, information on controllable Wi-SUN interference detected in the GW is set. In the "uncontrollable LoRa interference information" field, information on uncontrollable LoRa interference detected in the GW is set. In the "uncontrollable Wi-SUN interference information" field, information on uncontrollable Wi-SUN interference detected in the GW is set.

The "notification information on channel #1" field in FIG. 48B includes Z "controllable Wi-SUN interference information" fields and Z "uncontrollable Wi-SUN interference information" fields. FIG. 48B illustrates a format of notification information in which a Wi-SUN relay node Z provides notification information to a NW (e.g., control apparatus #1) via a GW or directly.

Z "controllable Wi-SUN interference information" fields are associated with Z Wi-SUN relay nodes, respectively. In the "controllable Wi-SUN interference information" field associated with Wi-SUN relay node #i ("i" represents an integer between 1 to Z), for example, information on the controllable Wi-SUN interference detected in tin Wi-SUN relay node #i is set.

Z "uncontrollable Wi-SUN interference information" fields are associated with Z Wi-SUN relay nodes, respectively. In the "uncontrollable Wi-SUN interference information" field associated with Wi-SUN relay node #i ("i" represents an integer between 1 to Z), for example, information on the uncontrollable Wi-SUN interference detected in tin Wi-SUN relay node #i is set.

As illustrated in FIGS. 48A and 48B, notification of the information indicating a detection result of a GW and notification of the information indicating a detection result of a Wi-SUN relay node are provided respectively in the formats of notification information different from each other. With this notification, even when the information amount of notification information is restricted, notification of an interference detection result can be appropriately provided by each apparatus in a network where a relay node is provided. For example, restriction of the information amount of notification information occurs due to an apparatus configuration of each apparatus in the network and/or a restriction of a packet length.

<Variation 12 of Notification Information>

In Variations 10 and 11 described above, a description has been given with an example of a relay network in which a relay node that supports the Wi-SUN mode and does not support the LoRa mode (Wi-SUN relay node) is present under a GW as illustrated in FIG. 41. The present disclosure is not limited to this case, however. Hereinafter, in Variation 12, a description will be given of an example of a relay network different from that in FIG. 41.

Figure 49:
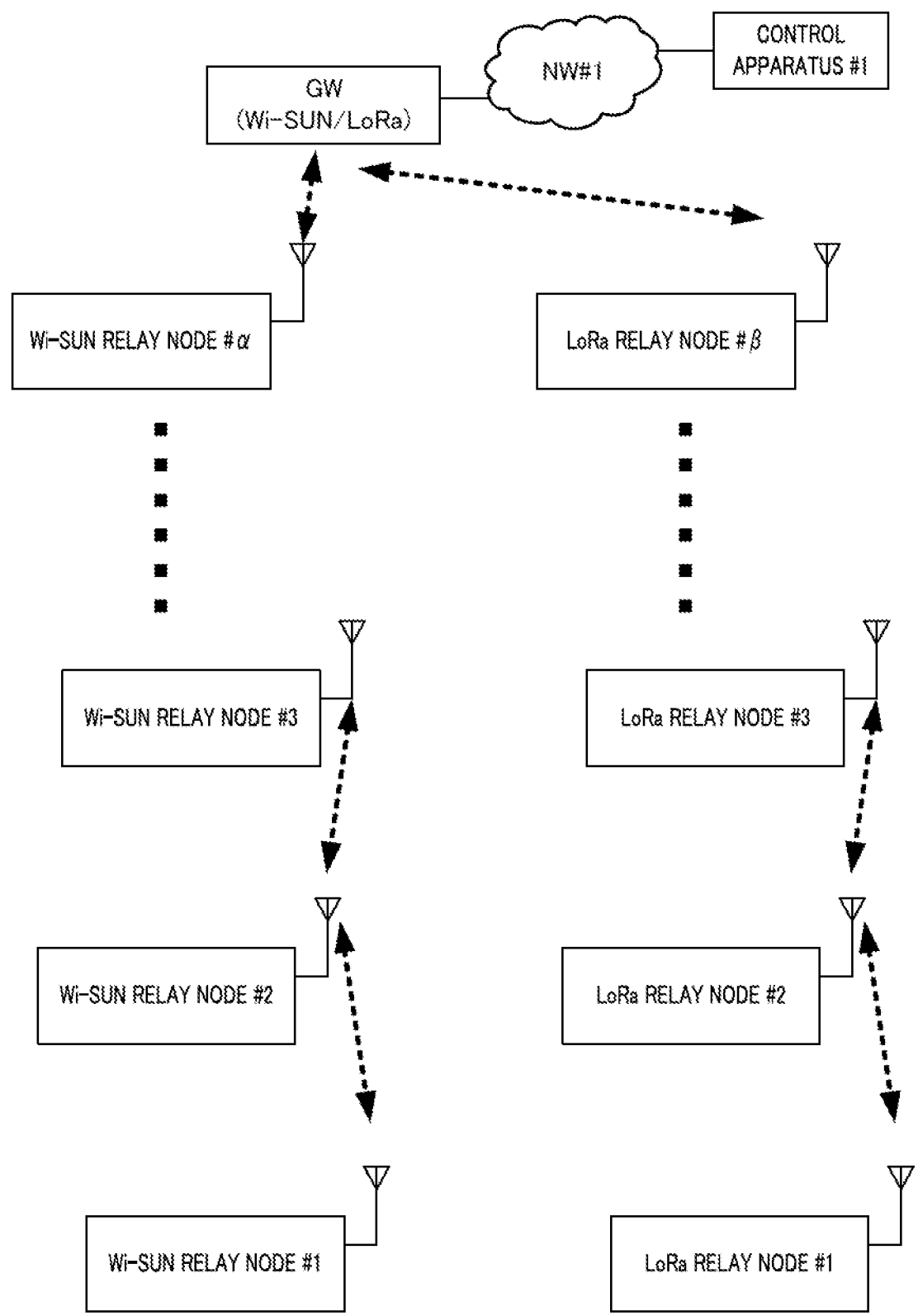
FIG. 49 is a diagram illustrating an exemplary network including a base station (GW) and relay stations (relay nodes)

FIG. 49 is a diagram illustrating an example of another network having a base station (GW) and relay stations (relay nodes). FIG. 49 illustrates a relay network including a base station (GW), $\alpha$ Wi-SUN relay nodes and $\beta$ LoRa relay nodes. Note that "$\alpha$" and "$\beta$" are each an integer not less than 0. Further the GW support both of the LoRa mode and Wi-SUN mode.

For example, an LoRa relay node may be located at a position independent from a Wi-SUN relay node.

For example, the Wi-SUN mode has a short communication distance and a small communicable area compared with the LoRa mode. Therefore, for example, the number of Wi-SUN relay nodes ($\alpha$) may be greater than the number of LoRa relay nodes ($\beta$). However, the present disclosure is not limited thereto, and values which become $\alpha<\beta$ may be selected, or a value which becomes $\alpha=\beta$ may be selected.

Figure 50:
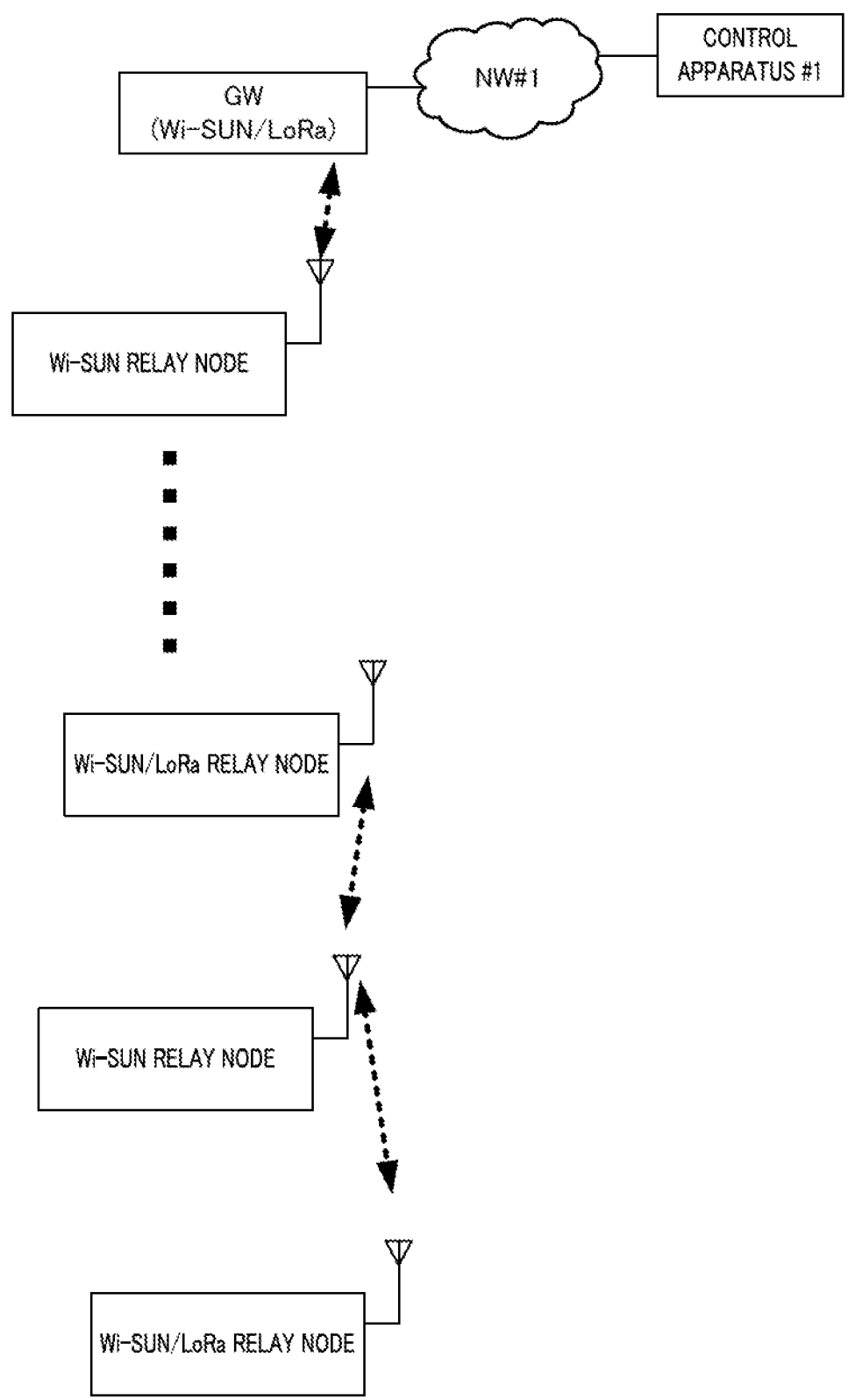
FIG. 50 is a diagram illustrating an exemplary network including a base station (GW) and relay stations (relay nodes)

FIG. 50 is a diagram illustrating an example of another network having a base station (GW) and relay stations (relay nodes). FIG. 50 illustrates a relay network including a base station (GW), Wi-SUN relay nodes and Wi-SUN/LoRa relay nodes. Note that the GW supports both the LoRa mode and Wi-SUN mode. Further, the number of Wi-SUN relay nodes in FIG. 50 is $\gamma$, and the number of Wi-SUN/LoRa relay nodes is $\delta$. Note that "$\gamma$" and "$\delta$" are each an integer not less than 0. Further, the GW supports both the LoRa mode and Wi-SUN mode.

Incidentally, a Wi-SUN/LoRa relay node may be replaced with a Wi-SUN relay node and an LoRa relay node that are located in the same position.

For example, in a case that relay nodes under the GW include an LoRa relay node and a Wi-SUN relay node as illustrated in FIGS. 49 and 50, the number of fields included in the format of notification information may be independently set for each of the communication modes.

Hereinafter, a relay node supporting the LoRa mode is referred to as an "L-node," and a relay node supporting the Wi-SUN mode is referred to as a "W-node." The "L-node" includes an LoRa relay node and a Wi-SUN/LoRa relay node. The "W-node" also includes a Wi-SUN relay node and a Wi-SUN/LoRa relay node.

Figure 51:
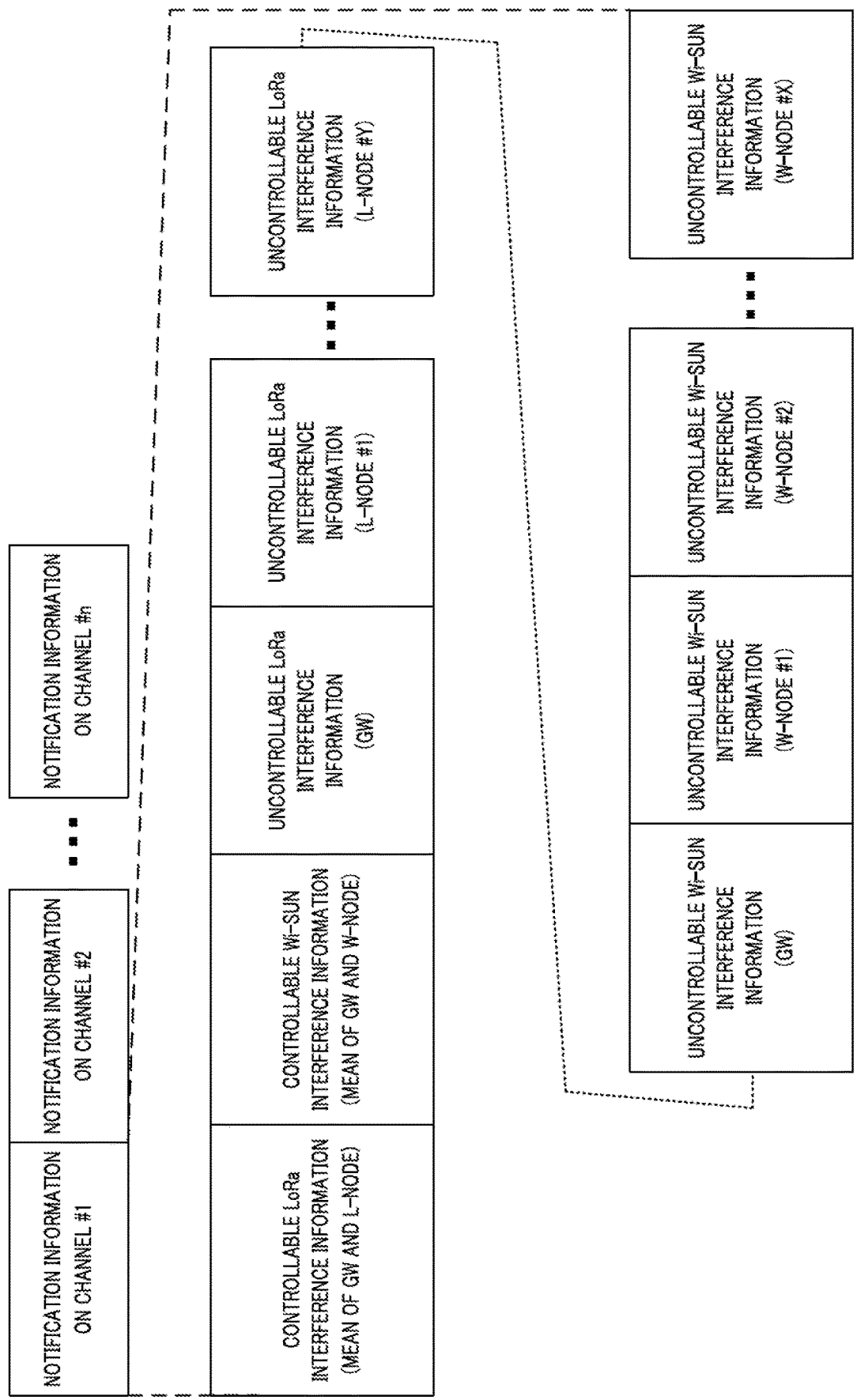
FIG. 51 is a diagram illustrating Example 11 of the format of notification information of a GW, according to the embodiment of the present disclosure.

FIG. 51 is a diagram illustrating Example 11 of the format of transmission notification information of a GW, according to the present embodiment. Note that, in the format in FIG. 51, the same fields as those of the format illustrated in FIG. 42 will not be described.

The format of notification information illustrated in FIG. 51 includes the fields in which pieces of notification information on the respective channels of channel #1 to channel #n are set.

The "notification information on channel #1" field includes a "controllable LoRa interference information" field, a "controllable Wi-SUN interference information" field, Y+1 "uncontrollable LoRa interference information" fields and X+1 "uncontrollable Wi-SUN interference information" fields.

The term "Y" represents the number of relay nodes each supporting the LoRa mode (L-nodes) among the relay nodes under the GW. Note that the number of L-nodes may be the sum of the number of LoRa relay nodes and the number of Wi-SUN/LoRa relay nodes. For example, in the example of FIG. 49, Y=$\beta$. Further, in the example of FIG. 50, Y=$\delta$.

The term "X" represents the number of relay nodes each supporting the Wi-SUN mode (W-nodes) among the relay nodes under the GW. Note that the number of W-nodes may be the sum of the number of Wi-SUN relay nodes and the number of Wi-SUN/LoRa relay nodes. For example, in the example of FIG. 49, X=α. Further, in the example of FIG. 50, X=γ+δ.

Y+1 "uncontrollable LoRa interference information" fields are associated with a GW and Y L-node nodes, respectively. In the "uncontrollable LoRa interference information" field associated with the GW, for example, information on uncontrollable LoRa interference detected in the GW is set. Likewise, in the "uncontrollable LoRa interference information" field associated with L-node #i ("i" represents an integer between 1 to Y−1), information on the uncontrollable LoRa interference detected in L-node #i is set, for example.

X+1 "uncontrollable Wi-SUN interference information" fields are associated with a GW and X W-node nodes, respectively. In the "uncontrollable Wi-SUN interference information" field associated with the GW, for example, information on uncontrollable Wi-SUN interference detected in the GW is set. Likewise, in the "uncontrollable Wi-SUN interference information" field associated with W-node #i ("i" represents an integer between 1 to Y−1), information on the uncontrollable Wi-SUN interference detected in W-node #i is set, for example.

In the "controllable LoRa interference information" field, information on controllable LoRa interference, such as a detection result of an interference amount of the controllable LoRa interference is set. For example, in the "controllable LoRa interference information" field, a value indicating a mean of interference amounts of controllable LoRa interference detected respectively in a GW and Y L-nodes is set.

In the "controllable Wi-SUN interference information" field, information on controllable Wi-SUN interference, such as a detection result of an interference amount of the controllable Wi-SUN interference is set. For example, in the "controllable Wi-SUN interference information" field, a value indicating a mean of interference amounts of controllable Wi-SUN interference detected respectively in a GW and X W-nodes is set.

Notification information to be provide in relay nodes differs between the relay networks illustrated in FIGS. 49 and 50. Hereinafter, a description will be given of the difference.

Figure 52:
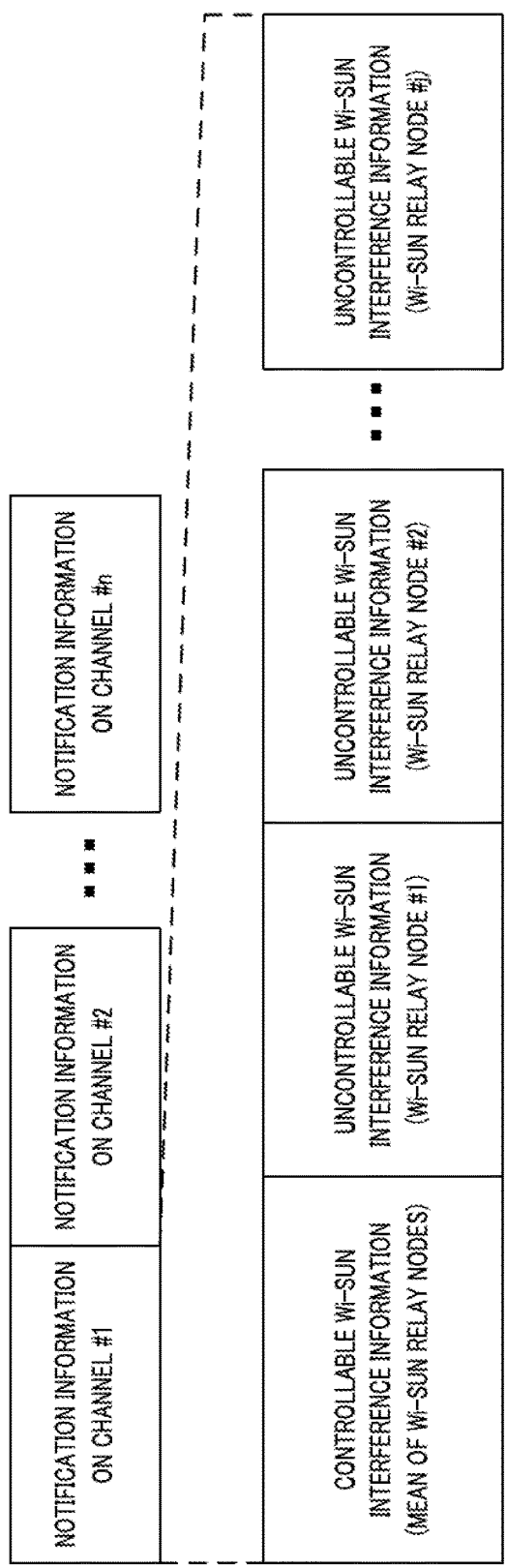
FIG. 52 is a diagram illustrating a first example of a format of notification information provided by a relay node of the relay network illustrated in FIG. 49.

FIG. 52 is a diagram illustrating a first example of a format of notification information provided by relay nodes of the relay networks illustrated in FIGS. 49 and 50. The format illustrated in FIG. 52 is a format of notification information provided to an upstream node by Wi-SUN relay node #j ("j" is an integer not less than 2 and not greater than α) in FIG. 49, for example.

The format of notification information illustrated in FIG. 52 includes the fields in which pieces of notification information on the respective channels of channel #1 to channel #n are set.

The "notification information on channel #1" field includes a "controllable Wi-SUN interference information" field, and j "uncontrollable Wi-SUN interference information" fields.

In the "controllable Wi-SUN interference information" field, information on controllable Wi-SUN interference, such as a detection result of an interference amount of the controllable Wi-SUN interference is set. For example, in the "controllable Wi-SUN interference information" field, a value indicating a mean of interference amounts of controllable Wi-SUN interference detected respectively in Wi-SUN relay node #j and j−1 Wi-SUN relay node(s) downstream of Wi-SUN relay node #j is set.

The j "uncontrollable Wi-SUN interference information" fields are associated with Wi-SUN relay node #j and j−1 Wi-SUN relay node(s) downstream of Wi-SUN relay node #j, respectively. In the "uncontrollable Wi-SUN interference information" field associated with Wi-SUN relay node #j, for example, information on the uncontrollable Wi-SUN interference detected in Wi-SUN relay node #j is set. Likewise, in the "uncontrollable Wi-SUN interference information" field(s) associated with j−1 Wi-SUN relay node(s) downstream of Wi-SUN relay node #j, information on the uncontrollable Wi-SUN interference detected in corresponding Wi-SUN relay node(s) is set.

For example, Wi-SUN relay node #j receives notification information including a detection result of a downstream Wi-SUN relay node. Wi-SUN relay node #j then, using the format of FIG. 52, for example, provides notification of a detection result of a downstream Wi-SUN relay node included in the received notification and a detection result of Wi-SUN relay node #j to a Wi-SUN relay node upstream of Wi-SUN relay node #j or a GW.

Note that, in the relay network in FIG. 49, Wi-SUN relay node #1, which is an end node having no downstream relay node transmits notification information including a detection result of detection by the end node to Wi-SUN relay node #2 upstream of the end node.

Figure 53:
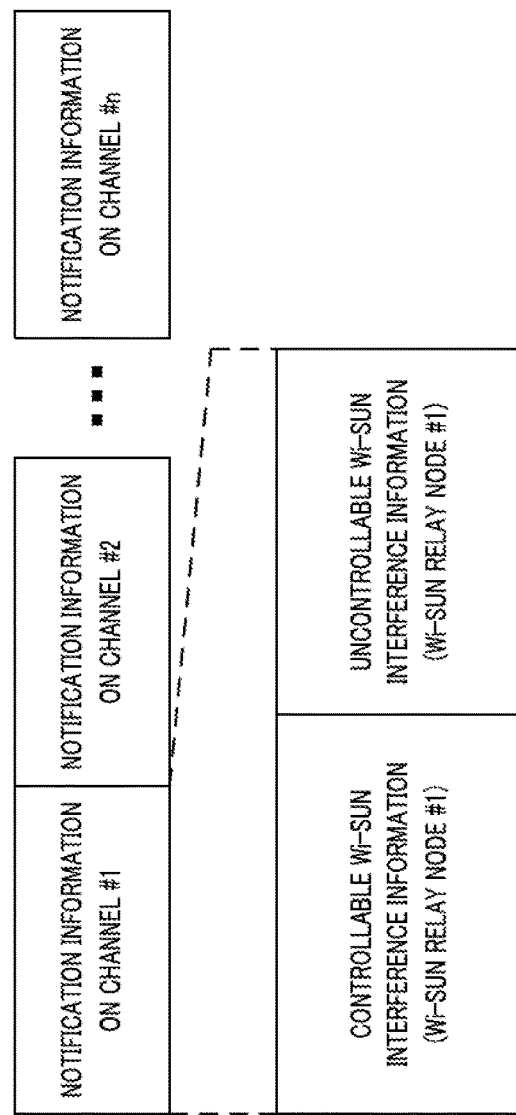
FIG. 53 is a diagram illustrating a second example of the format of notification information provided by a relay node of the relay network illustrated in FIG. 49.

FIG. 53 is a diagram illustrating a second example of the format of notification information provided by relay nodes of the relay network illustrated in FIG. 49. The format illustrated in FIG. 53 is a format of notification information provided to Wi-SUN relay node #2 by Wi-SUN relay node #1 in FIG. 49, for example.

The format of notification information illustrated in FIG. 53 includes the fields in which pieces of notification information on the respective channels of channel #1 to channel #n are set.

The "notification information on channel #1" field includes a "controllable Wi-SUN interference information" field, and an "uncontrollable Wi-SUN interference information" field.

In the "controllable Wi-SUN interference information" field, information on controllable Wi-SUN interference detected in Wi-SUN relay node #1, such as a detection result of an interference amount of the controllable Wi-SUN interference is set. For example, in the "controllable Wi-SUN interference information" field, a value indicating an interference amount of the controllable Wi-SUN interference detected in Wi-SUN relay node #1 is set.

In the "uncontrollable Wi-SUN interference information" field, information on uncontrollable Wi-SUN interference detected in Wi-SUN relay node #1, such as a detection result of an interference amount of the uncontrollable Wi-SUN interference in Wi-SUN relay node #1 is set.

Wi-SUN relay node #1 provides notification information using the format illustrated in FIG. 53 to Wi-SUN relay node #2. Wi-SUN relay node #2 generates, using the format (j=2) illustrated in FIG. 52, a detection result of Wi-SUN relay node #1 included in the received notification information and a detection result detected by Wi-SUN relay node #2. As described above, transmission of notification information from a downstream Wi-SUN relay node to an upstream node provides, to the GW, notification of information integrating the detection results of detection by the respective Wi-SUN relay nodes under the GW.

Figure 54:
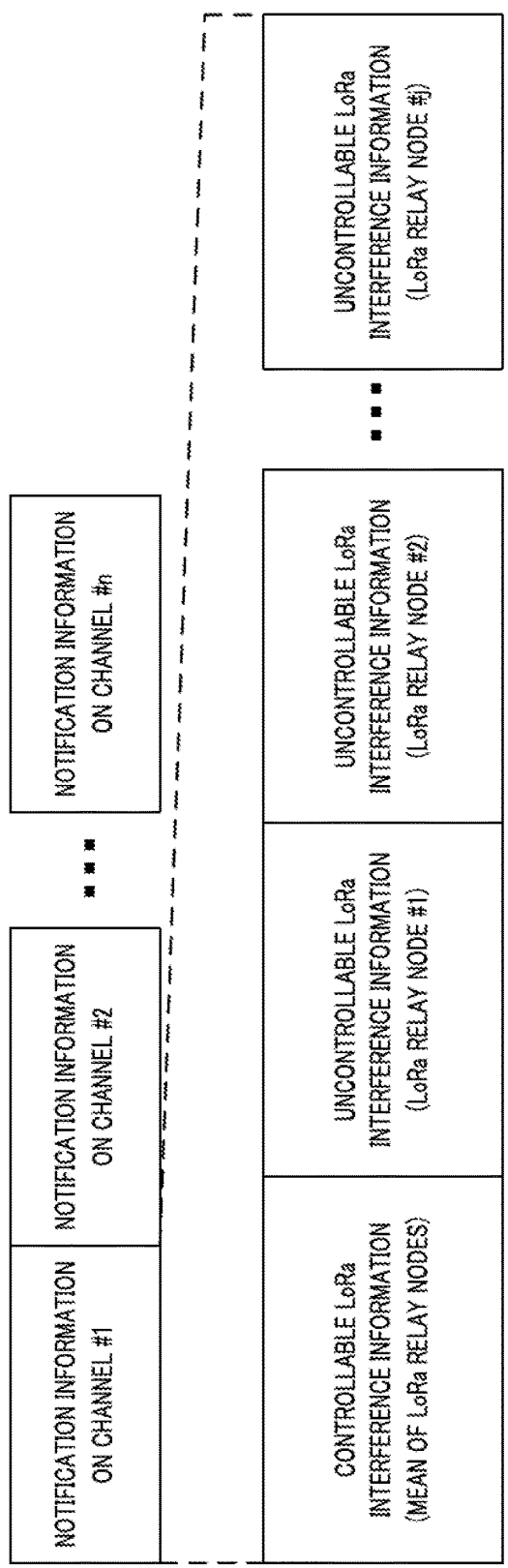
FIG. 54 is a diagram illustrating a third example of the format of notification information provided by a relay node of the relay network illustrated in FIG. 49.

FIG. 54 is a diagram illustrating a third example of the format of notification information provided by relay nodes of the relay network illustrated in FIG. 49. The format illustrated in FIG. 54 is a format of notification information provided to an upstream node by an LoRa relay node #j ("j" is an integer not less than 2 and not greater than β) in FIG. 49, for example.

The format illustrated in FIG. 54 includes the fields in which pieces of notification information on the respective channels of channel #1 to channel #n are set.

The "notification information on channel #1" field includes a "controllable LoRa interference information" field, and j "uncontrollable LoRa interference information" fields.

In the "controllable LoRa interference information" field, information on controllable LoRa interference, such as a detection result of an interference amount of the controllable LoRa interference is set. For example, in the "controllable LoRa interference information" field, a value indicating a mean of interference amounts of the controllable LoRa interference detected respectively in LoRa relay node #j and j−1 LoRa relay node(s) downstream of LoRa relay node #j is set.

The j "uncontrollable LoRa interference information" fields are associated with LoRa relay node #j and j−1 LoRa relay node(s) downstream of LoRa relay node #j, respectively. In the "uncontrollable LoRa interference information" field associated with LoRa relay node #j, for example, information on the uncontrollable LoRa interference detected in LoRa relay node #j is set. Likewise, in the "uncontrollable LoRa interference information" field(s) associated with j−1 LoRa relay node(s) downstream of LoRa relay node #j, information on the uncontrollable LoRa interference detected in corresponding LoRa relay node(s) is set.

For example, LoRa relay node #j receives notification information including a detection result of a downstream LoRa relay node. LoRa relay node #j then, using the format of FIG. 54, for example, provides notification of a detection result of a downstream LoRa relay node included in the received notification and a detection result of LoRa relay node #j to an LoRa relay node upstream of LoRa relay node #j or a GW.

Note that, in the relay network in FIG. 49, LoRa relay node #1, which is an end node having no downstream relay node transmits notification information including a detection result of detection by the end node to LoRa node #2 upstream of the end node.

Figure 55:
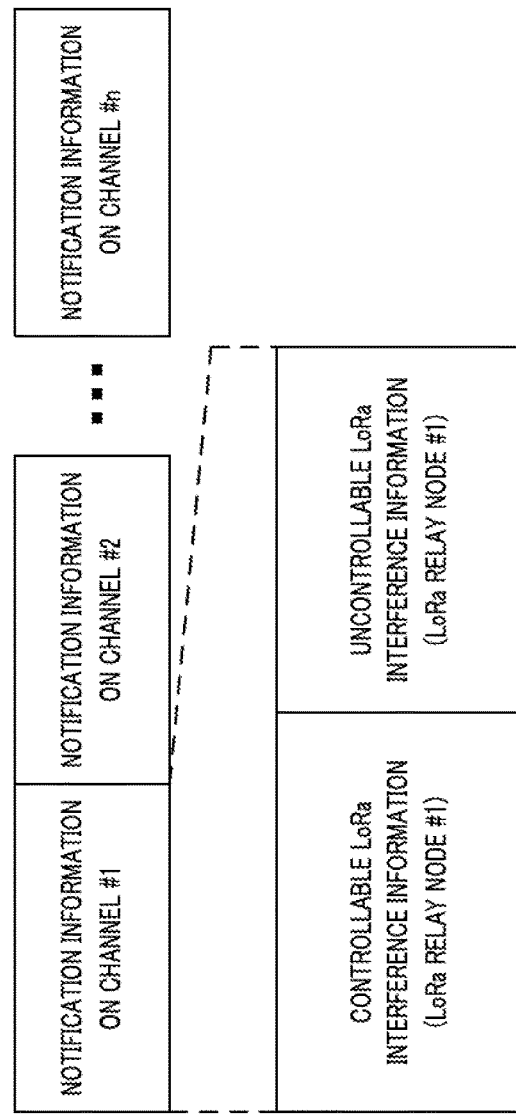
FIG. 55 is a diagram illustrating a fourth example of the format of notification information provided by a relay node of the relay network illustrated in FIG. 49.

FIG. 55 is a diagram illustrating a fourth example of the format of notification information provided by relay nodes of the relay network illustrated in FIG. 49. The format illustrated in FIG. 55 is a format of notification information provided to LoRa relay node #2 by LoRa relay node #1 in FIG. 49, for example.

The format of notification information illustrated in FIG. 55 includes the fields in which pieces of notification information on the respective channels of channel #1 to channel #n are set.

The "notification information on channel #1" field includes a "controllable LoRa interference information" field, and an "uncontrollable LoRa interference information" field.

In the "controllable LoRa interference information" field, information on controllable LoRa interference detected in LoRa relay node #1, such as a detection result of an interference amount of the controllable interference is set. For example, in the "controllable LoRa interference information" field, a value indicating an interference amount of the controllable LoRa interference detected in LoRa relay node #1 is set.

In the "uncontrollable LoRa interference information" field, information on uncontrollable LoRa interference detected in LoRa relay node #1, such as a detection result of an interference amount of the uncontrollable LoRa interference in LoRa relay node #1 is set.

LoRa relay node #1 provides notification information using the format illustrated in FIG. 55 to LoRa relay node #2. LoRa relay node #2 generates, using the format (j=2) illustrated in FIG. 54, a detection result of LoRa relay node #1 included in the received notification information and a detection result detected by LoRa relay node #2. As described above, transmission of notification information from a downstream LoRa relay node to an upstream node provides, to the GW, notification of information integrating the detection results of detection by the respective LoRa relay nodes under the GW.

As described above, in the relay network illustrated in FIG. 49, a distinction is made between a partial network including an LoRa relay node and a partial network including a Wi-SUN relay node. Thus, each relay node provides notification of information on interference for a corresponding communication mode.

Figure 56:
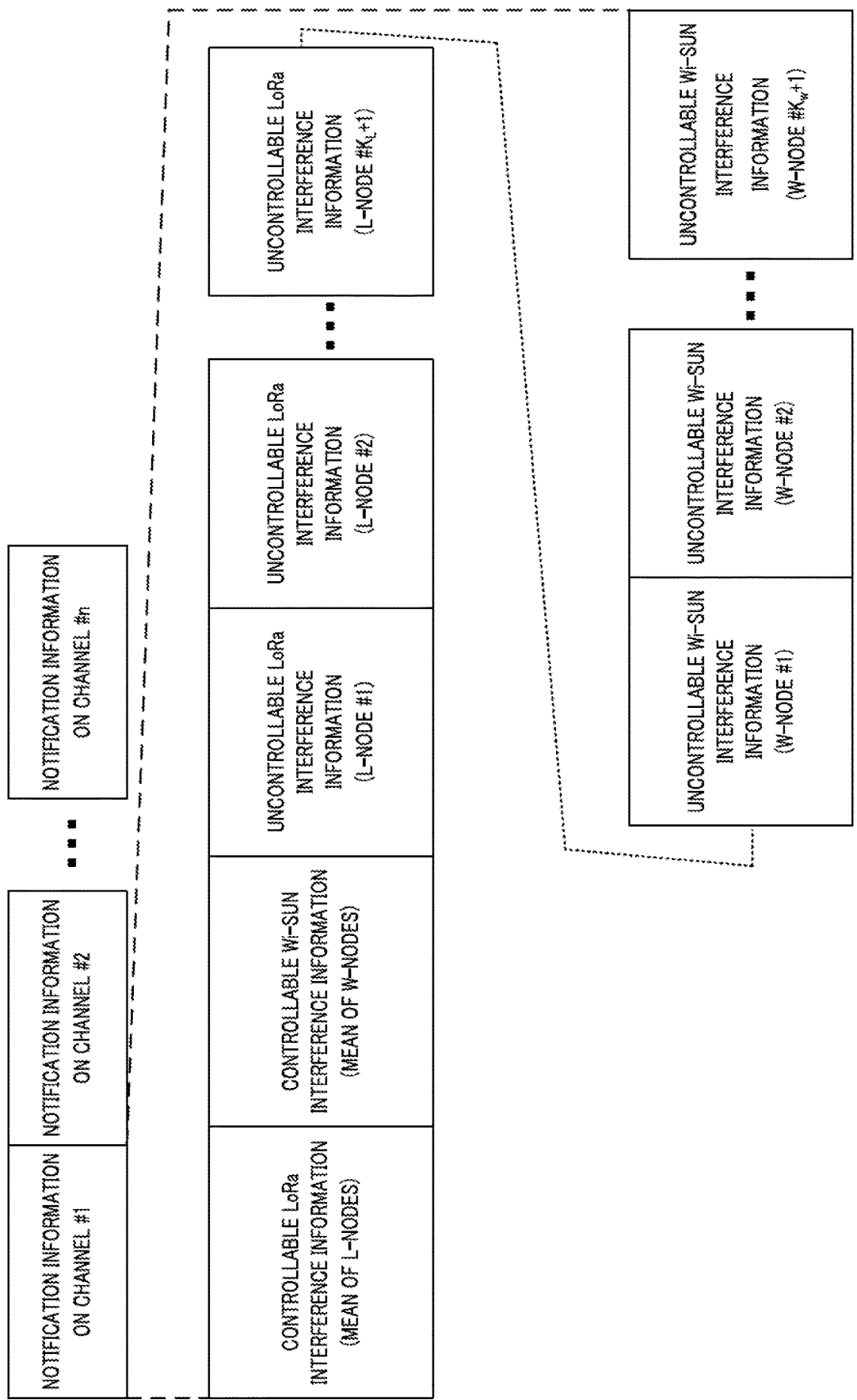
FIG. 56 is a diagram illustrating a first example of a format of notification information provided by a relay node of the relay network illustrated in FIG. 50.

FIG. 56 is a diagram illustrating a first example of a format of notification information provided by relay nodes included in the relay network illustrated in FIG. 50.

The format illustrated in FIG. 56 is a format of notification information provided to an upstream node by Wi-SUN/LoRa relay node #$K_c$ (omitted in FIG. 50), for example. Note that, FIG. 56 illustrates an example in which $K_W$ W-nodes and $K_L$ L-nodes are present under Wi-SUN/LoRa relay node #$K_c$. Note that, $K_W$ may be an integer not less than 0 and not greater than γ+δ−1, and $K_L$ may be an integer not less than 0 and not greater than δ−1.

The format of notification information illustrated in FIG. 56 includes the fields in which pieces of notification information on the respective channels of channel #1 to channel #n are set.

The "notification information on channel #1" field includes a "controllable LoRa interference information" field, a "controllable Wi-SUN interference information" field, $K_L$+1 "uncontrollable LoRa interference information" fields, and $K_W$+1 "uncontrollable Wi-SUN interference information" fields.

In the "controllable Wi-SUN interference information" field, information on controllable Wi-SUN interference, such as a detection result of an interference amount of the controllable Wi-SUN interference is set. For example, in the "controllable Wi-SUN interference information" field, a value indicating a mean of interference amounts of the controllable Wi-SUN interference detected respectively in Wi-SUN/LoRa relay node #$K_C$ and $K_W$ W-nodes downstream of Wi-SUN/LoRa relay node #$K_C$ is set.

$K_W$+1 "uncontrollable Wi-SUN interference information" fields are associated with Wi-SUN/LoRa relay node #$K_C$ and $K_W$ W-nodes downstream of Wi-SUN/LoRa relay node #$K_C$, respectively. In the "uncontrollable Wi-SUN interference information" field associated with Wi-SUN/LoRa relay node #$K_C$, for example, information on the uncontrollable Wi-SUN interference detected in Wi-SUN/LoRa relay node #$K_C$ is set, for example. Likewise, in the "uncontrollable Wi-SUN interference information" fields associated with $K_W$ W-nodes, respectively, information on the uncontrollable Wi-SUN interference detected in corresponding W-nodes is set, for example.

In the "controllable LoRa interference information" field, information on controllable LoRa interference, such as a detection result of an interference amount of the controllable LoRa interference is set. For example, in the "controllable LoRa interference information" field, a value indicating a mean of interference amounts of the controllable LoRa interference detected respectively in Wi-SUN/LoRa relay node #$K_C$ and $K_L$ L-nodes downstream of Wi-SUN/LoRa relay node #$K_C$ is set.

$K_L$+1 "uncontrollable LoRa interference information" fields are associated with Wi-SUN/LoRa relay node #$K_C$ and $K_L$ L-nodes downstream of Wi-SUN/LoRa relay node #$K_C$, respectively. In the "uncontrollable Wi-SUN interference information" field associated with Wi-SUN/LoRa relay node #$K_C$, for example, information on the uncontrollable LoRa interference detected in Wi-SUN/LoRa relay node #$K_C$ is set, for example. Likewise, in the "uncontrollable LoRa interference information" fields associated with $K_L$ L-nodes, respectively, information on the uncontrollable LoRa interference detected in corresponding L-nodes is set, for example.

Wi-SUN/LoRa relay node #$K_C$ provides notification of the notification information using the format illustrated in FIG. 56 to an upstream relay node or a GW.

Note that, in the relay network in FIG. 50, Wi-SUN/LoRa relay node #1, which is an end node having no downstream relay node transmits notification information including a detection result of detection by the end node to relay node #2 upstream of the end node.

Figure 57:
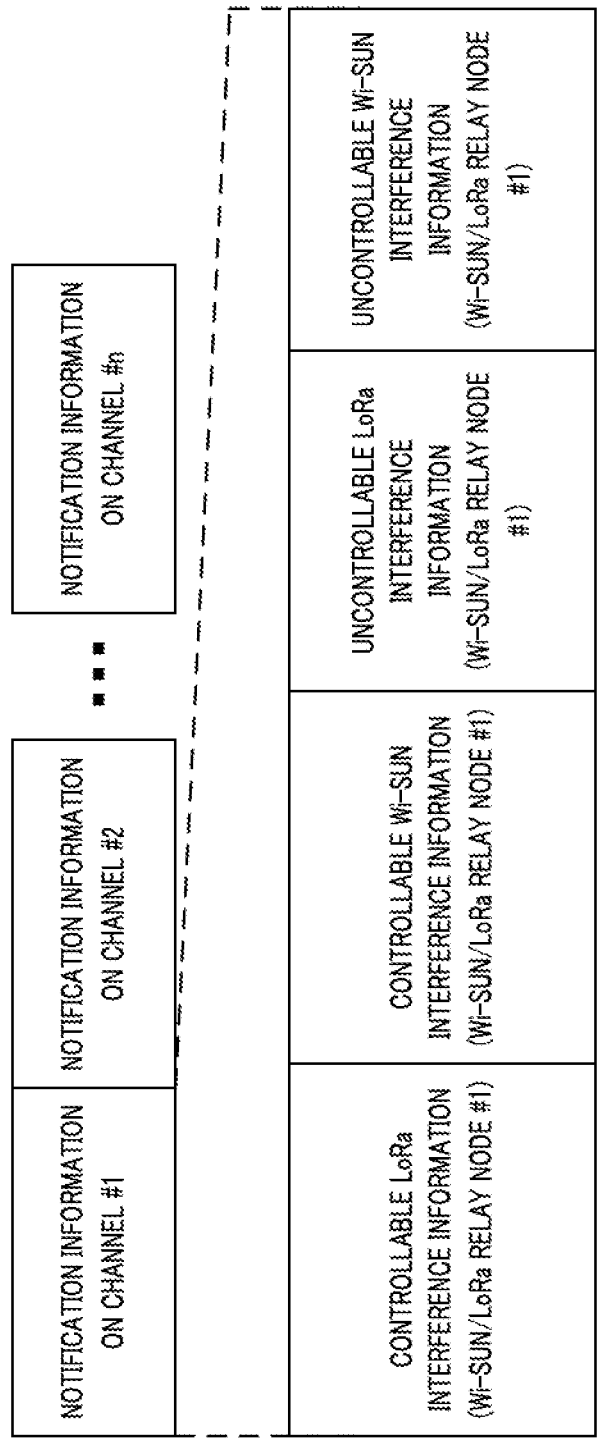
FIG. 57 is a diagram illustrating a second example of the format of notification information provided by a relay node of the relay network illustrated in FIG. 50.

FIG. 57 is a diagram illustrating a second example of the format of notification information provided by relay nodes included in the relay network illustrated in FIG. 50. The format illustrated in FIG. 57 is a format of notification information provided to an upstream node by Wi-SUN/LoRa relay node #1 of FIG. 50, for example.

Note that, the "controllable Wi-SUN interference information" field and "uncontrollable Wi-SUN interference information" field in FIG. 57 are the same as the "controllable Wi-SUN interference information" field and "uncontrollable Wi-SUN interference information" field in FIG. 55.

Further, the "controllable LoRa interference information" field and "uncontrollable LoRa interference information" field in FIG. 57 are the same as the "controllable LoRa interference information" field and "uncontrollable LoRa interference information" field in FIG. 55.

In other words, the format of notification information of a case where the end node is a Wi-SUN/LoRa relay node includes fields identical to the case where the end node is a Wi-SUN relay node (e.g., FIG. 53) and fields identical to the case where the end node is an LoRa relay node (e.g., FIG. 55).

Note that, as illustrated in FIG. 50, even in a relay network including a Wi-SUN/LoRa relay node, the format of notification information of the end node may be the same as in FIG. 53 when the end node is a Wi-SUN relay node. Further, when the end node is an LoRa relay node, the format of notification information of the end node may be the same as in FIG. 55

<Example of Flow According to Variation 12>

A processing flow in radio communication apparatus 100 for generating notification information of Variation 12 described above will be described.

The processing flow in radio communication apparatus 100 for generating the notification information of Variation 12 is the same as FIG. 43 illustrated in Variation 10. However, the processing of S1503 in FIG. 43 is different from Variation 10. Hereinafter, the processing of S1503 in FIG. 43 will be described.

<Example of Flow of Processing in S1503>

Figure 58:
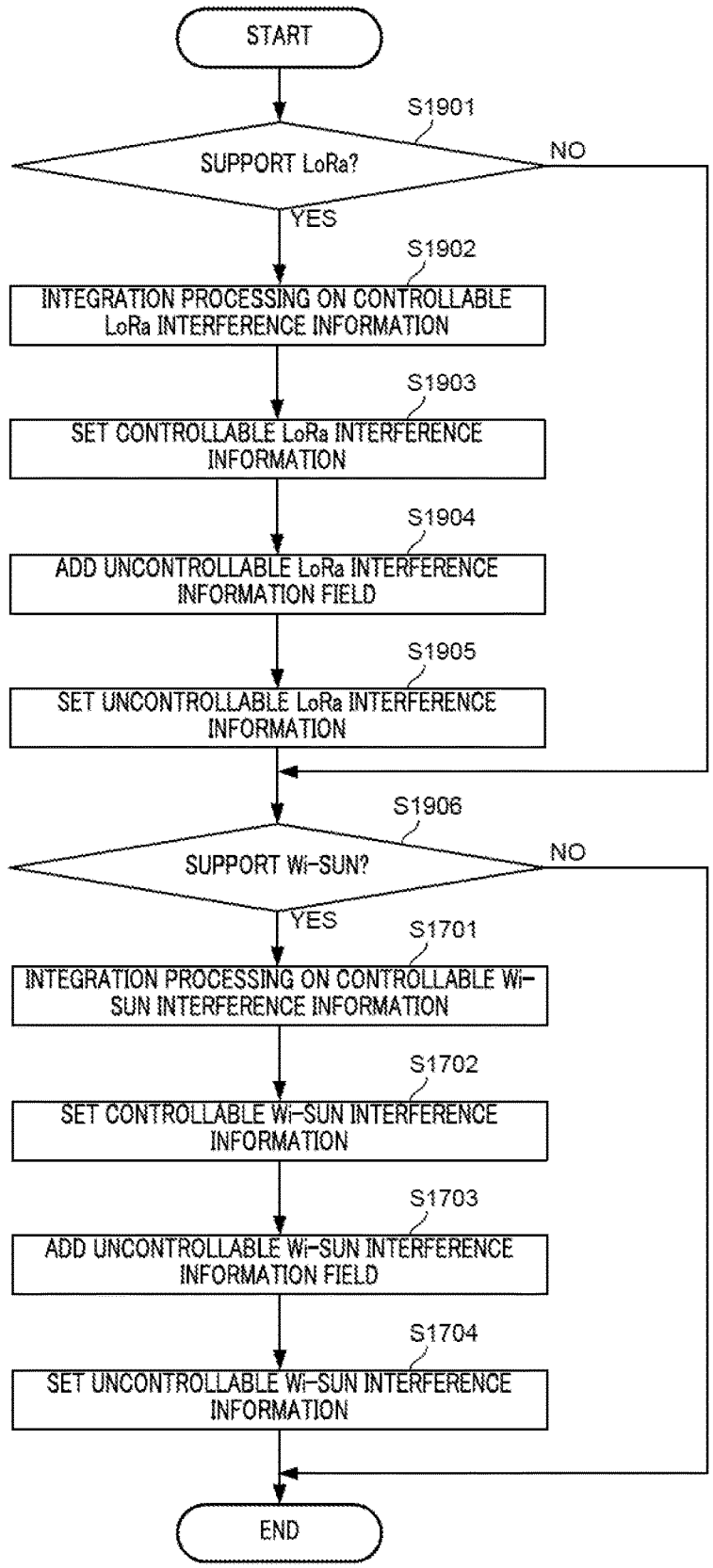
FIG. 58 is a flowchart illustrating a third example of the processing to be executed in S1503 of FIG. 43.

FIG. 58 is a flowchart illustrating a third example of the processing to be executed in S1503 of FIG. 43. Note that, in FIG. 58, the processing similar to that in FIG. 45 is denoted by the same reference numeral and its description may be omitted.

Radio communication apparatus 100 determines whether it supports the LoRa mode (S1901).

When radio communication apparatus 100 does not support the LoRa mode (NO in S1601), the flow shifts to S1906.

When radio communication apparatus 100 supports the LoRa mode (YES in S1901), radio communication apparatus 100 performs integration processing for controllable LoRa interference information (S1902). For example, radio communication apparatus 100 determines a mean value of the interference amount indicated by the controllable LoRa interference information included in the received notification information and the interference amount indicated by the controllable LoRa interference information generated in radio communication apparatus 100. Note that, an exemplary determination of a mean value has been given using FIG. 11, so that the description is omitted.

Radio communication apparatus 100 sets the controllable LoRa interference information after the integration processing in the "controllable LoRa interference information" field of the notification information transmitted by radio communication apparatus 100 (S1903).

Radio communication apparatus 100 adds an "uncontrollable LoRa interference information" field in the received notification information (S1904).

Radio communication apparatus 100 sets the uncontrollable LoRa interference information in radio communication apparatus 100 in the added "uncontrollable LoRa interference information" field (S1905).

Radio communication apparatus 100 determines whether it supports the Wi-SUN mode (S1906).

When radio communication apparatus 100 does not support the Wi-SUN mode (NO in S1906), the flow of FIG. 58 ends.

When radio communication apparatus 100 supports the Wi-SUN mode (YES in S1906), the flow shifts to S1701. Upon completion of the processing of S1701, the flow of FIG. 58 ends.

In Variation 12 described above, notification of a result after classification of the interference detected by a GW and relay nodes is provided. In the uncontrollable Wi-SUN interference information and uncontrollable LoRa interference information of notification information, notification of a result for each node is provided. In the controllable Wi-SUN interference information and controllable LoRa interference information, notification of a mean among nodes is provided. Accordingly, in a band used by various radio systems, notification of an interference detection result can be appropriately provided by each apparatus in a network where a relay node is provided. Further, in this notification, for controllable Wi-SUN interference information and controllable LoRa interference information, notification of a mean among the nodes is provided. Thus, the information amount of notification information can be reduced.

Moreover, in Variation 12, notification of an interference detection result can be appropriately provided even in a relay network having both of a relay node supporting the Wi-SUN mode and a relay node supporting the LoRa mode. Thus, the network can be optimized. For example, even in a case that the number of relay nodes supporting the Wi- SUN mode and the number of relay nodes supporting the LoRa mode are different, notification can be appropriately provided.

<Variation 13 of Notification Information>

Note that, information different from the information on an interference detection result may be added to notification information. Hereinafter, in Variation 13, a description will be given of a first example in which information on the number of relay nodes included in a relay network is included in notification information.

Figure 59:
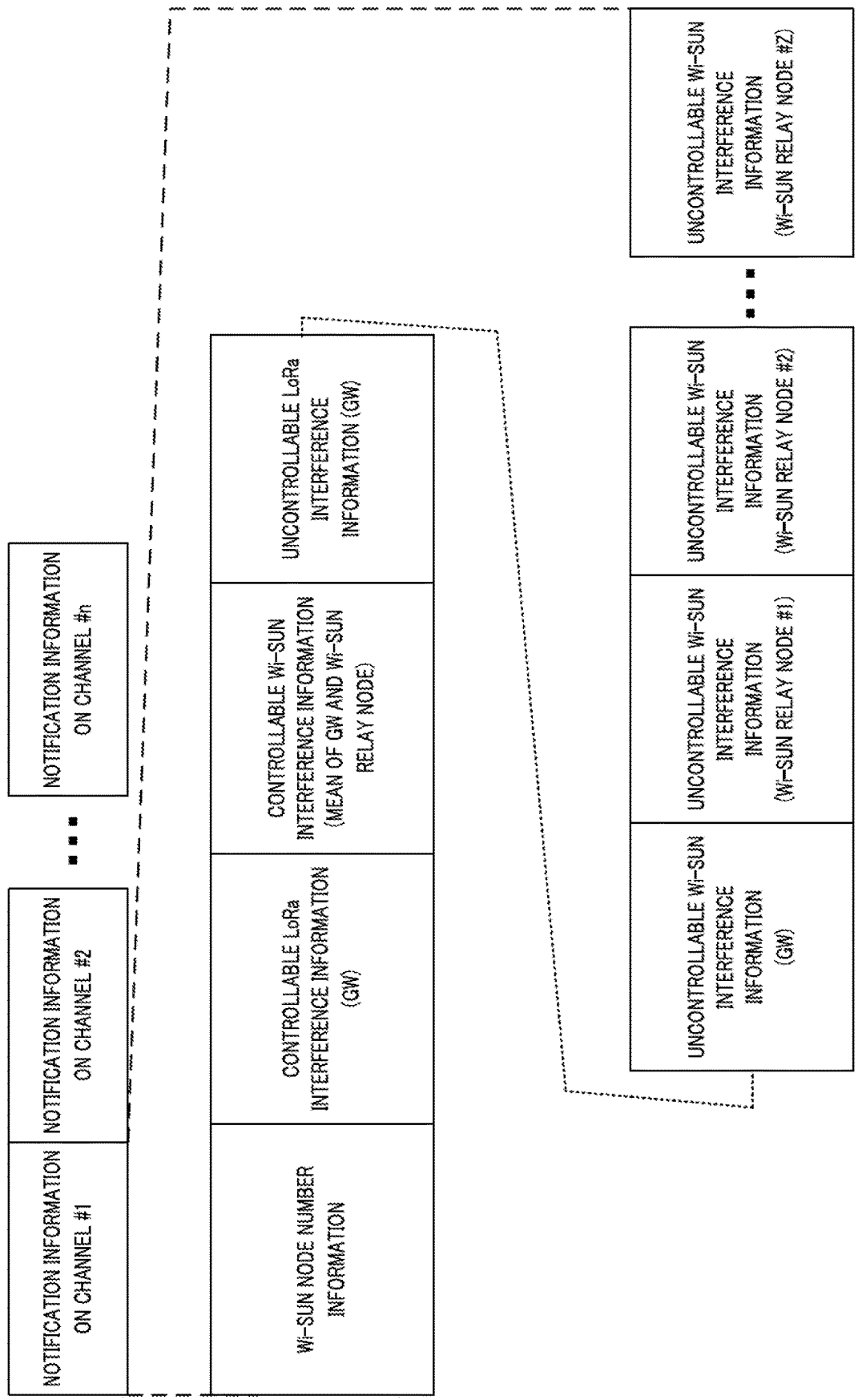
FIG. 59 is a diagram illustrating Example 11 of the format of notification information of a GW, according to the embodiment of the present disclosure.

FIG. 59 is a diagram illustrating Example 11 of the format of transmission notification information of a GW, according to the present embodiment. In the format illustrated in FIG. 59, fields identical to those of the format illustrated in FIG. 42 will not be described.

The format of notification information illustrated in FIG. 59 includes the fields in which pieces of notification information on the respective channels of channel #1 to channel #n are set.

The "notification information on channel #1" field includes fields identical to those in FIG. 42 and a "Wi-SUN node number information" field.

In the "Wi-SUN node number information" field, information on the number of Wi-SUN relay nodes among relay nodes under the GW is set, for example. In a case of the GW of the relay network illustrated in FIG. 41, the number Z of Wi-SUN relay nodes is set in the "Wi-SUN node number information" field.

Note that, in the "Wi-SUN node number information" field, information on the number of relay nodes supporting the Wi-SUN mode r among relay nodes under the GW is set, for example. In this case, a total number of the number of Wi-SUN relay nodes and the number of Wi-SUN/LoRa relay nodes may be set in the "Wi-SUN node number information" field.

<Example of Flow According to Variation 13>

A processing flow in radio communication apparatus 100 for generating notification information of Variation 13 described above will be described.

The processing flow in radio communication apparatus 100 for generating the notification information of Variation 13 is the same as FIG. 43 illustrated in Variation 10. However, the processing of S1503 in FIG. 43 is different from Variation 10. Hereinafter, the processing of S1503 in FIG. 43 will be described.

<Example of Flow of Processing in S1503>

Figure 60:
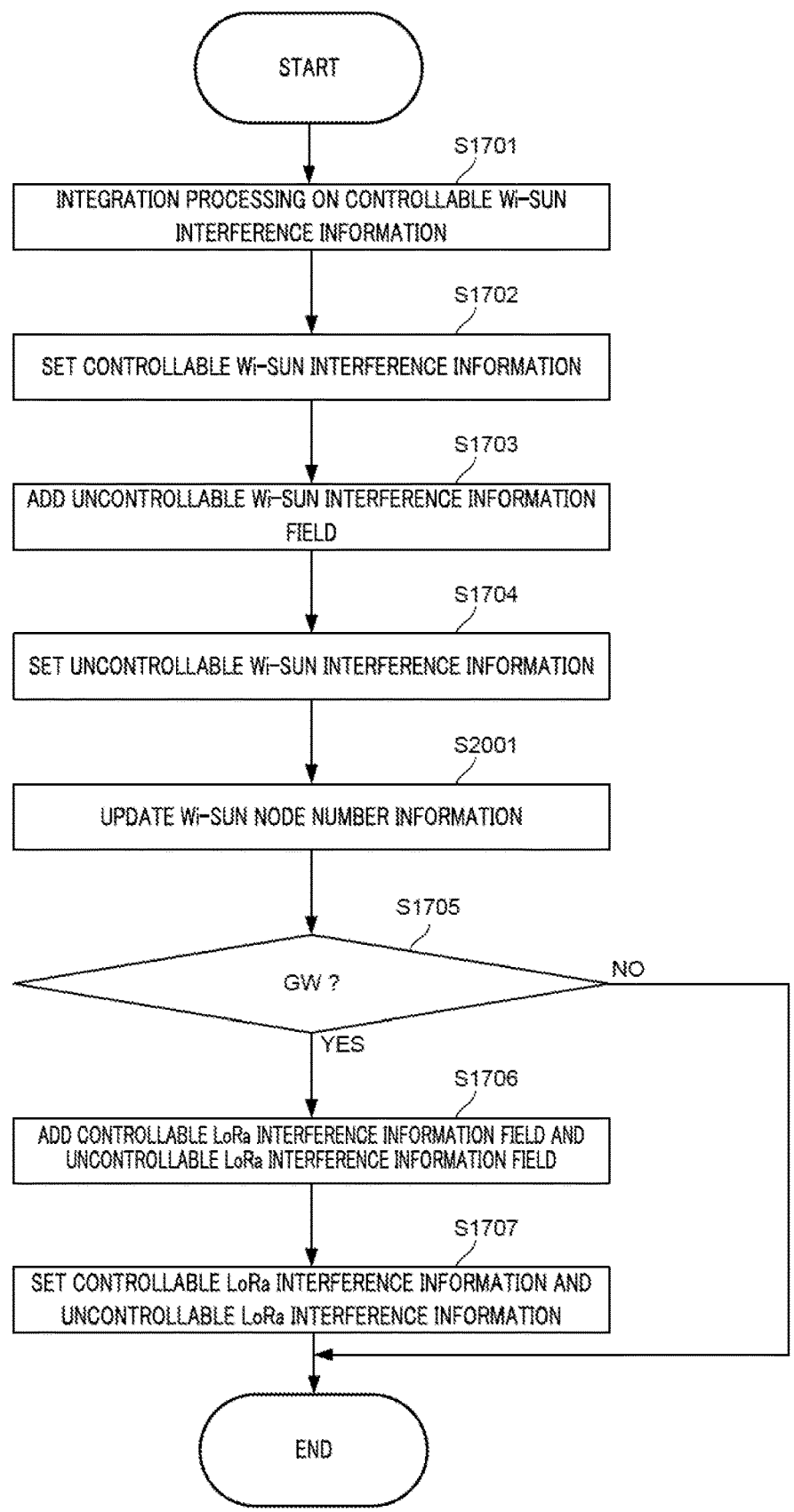
FIG. 60 is a flowchart illustrating a fourth example of the processing to be executed in S1503 of FIG. 43.

FIG. 60 is a flowchart illustrating a fourth example of the processing to be executed in S1503 of FIG. 43. Note that, in FIG. 60, the processing similar to that in FIG. 45 is denoted by the same reference numeral and its description may be omitted.

In the flow of FIG. 60, S2001 is added to FIG. 45.

Radio communication apparatus 100 updates the "Wi-SUN node number information" field (S2001). For example, radio communication apparatus 100 performs update processing by adding one to the value in the "Wi-SUN node number information" field of the received notification information.

In Variation 13 described above, notification of a result after classification of the interference detected by a GW and relay nodes is provided. In the uncontrollable Wi-SUN interference information of notification information, notification of a result for each node is provided, and notification of a mean among nodes is provided in the controllable Wi-SUN interference information. Accordingly, in a band used by various radio systems, notification of an interference detection result can be appropriately provided by each apparatus in a network where a relay node is provided. Further, in this notification, for controllable Wi-SUN interference information, notification of a mean among nodes is provided. Thus, the information amount of notification information can be reduced. Further, in this notification, notification of the number of relay nodes supporting the Wi-SUN mode can be provided, so that notification of an interference detection result can be appropriately provided, and the network can be optimized even in a case where the number of relay nodes changes.

The number of relay nodes is sometimes increased due to a drastic increase in data traffic in a situation where the number of users using a network increases (e.g., hours) in facilities where a large number of users using a network visit (e.g., stadiums, theme parks, shopping malls) and/or in locations where large events are held. Further, the number of relay nodes is sometimes reduced due to a drastic decrease in traffic in a situation where the number of users using the network decreases (e.g., hours), for example, outside of business hours of the facilities and/or after the end of events. As described above, there are cases where the number of relay nodes changes from time to time and moment to moment. Even in these cases, the network can be optimized by providing notification of the number of relay nodes.

Further, notification of the number of Wi-SUN relay nodes included in the Wi-SUN node number information" field need not be provided every time notification of interference information, such as controllable Wi-SUN interference information is provided. For example, notification of the number of Wi-SUN relay nodes need not be provided when the number of Wi-SUN relay nodes is the same as the last time (e.g., time at which notification of interference information is made right before this time) or an increase or decrease in the number of Wi-SUN relay nodes is within a predetermined range compared with the last time, even when the time to provide notification of interference information comes. For this reason, how often notification of the number of Wi-SUN relay nodes is provided may be set fewer than how often notification of interference information is provided. Note that, notification of the information on the frequency of providing notification of the number of Wi-SUN relay nodes may be provided by a higher layer message, for example.

<Variation 14 of Notification Information>

Hereinafter, in Variation 14, a description will be given of a second example in which information on the number of relay nodes included in a relay network is included in notification information.

Figure 61:
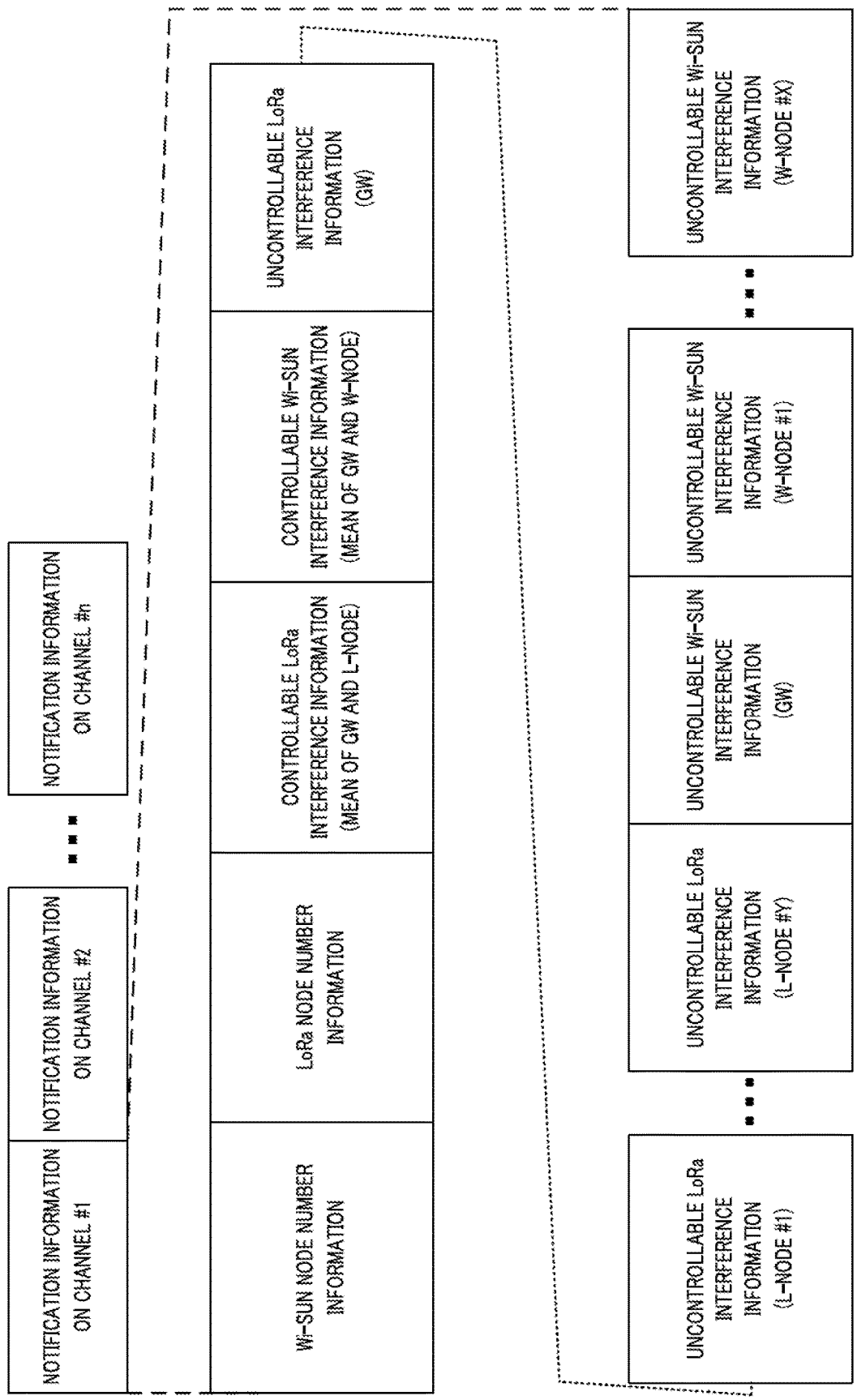
FIG. 61 is a diagram illustrating Example 12 of the format of notification information of a GW, according to the embodiment of the present disclosure.

FIG. 61 is a diagram illustrating Example 12 of the format of transmission notification information of a GW, according to the present embodiment. In the format illustrated in FIG. 61, fields identical to those of the format illustrated in FIG. 51 will not be described.

The format of notification information illustrated in FIG. 61 includes the fields in which pieces of notification information on the respective channels of channel #1 to channel #n are set.

The "notification information on channel #1" field includes fields identical to those in FIG. 51, a "Wi-SUN node number information" field, and an "LoRa node number information" field.

In the "Wi-SUN node number information" field, information on the number of relay nodes supporting the Wi-SUN mode (W-nodes) among relay nodes under the GW is set, for example. In this case, a total number of the number of Wi-SUN relay nodes and the number of Wi-SUN/LoRa relay nodes may be set in the "Wi-SUN node number information" field.

In the "LoRa node number information" field, information on the number of relay nodes supporting the LoRa mode (L-nodes) among relay nodes under the GW is set, for example. In this case, a total number of the number of LoRa relay nodes and the number of Wi-SUN/LoRa relay nodes may be set in the "LoRa node number information" field.

<Example of Flow According to Variation 14>

A processing flow in radio communication apparatus 100 for generating notification information of Variation 14 described above will be described.

The processing flow in radio communication apparatus 100 for generating the notification information of Variation 114 is the same as FIG. 43 illustrated in Variation 10. However, the processing of S1503 in FIG. 43 is different from Variation 10. Hereinafter, the processing of S1503 in FIG. 43 will be described.

<Example of Flow of Processing in S1503>

Figure 62:
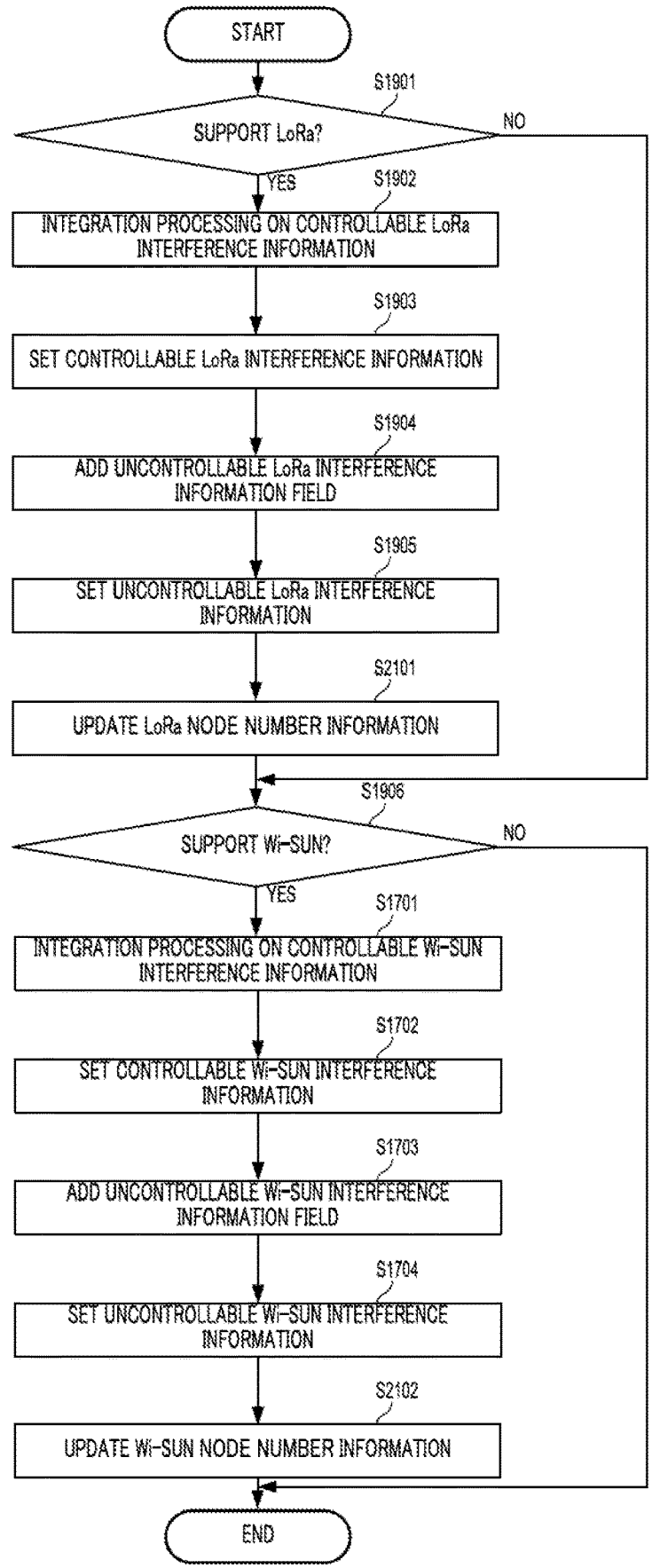
FIG. 62 is a flowchart illustrating a fifth example of the processing to be executed in S1503 of FIG. 43.

FIG. 62 is a flowchart illustrating a fourth example of the processing to be executed in S1503 of FIG. 43. Note that, in FIG. 62, the processing similar to that in FIGS. 45 and 58 is denoted by the same reference numeral and its description may be omitted.

In the flow of FIGS. 62, S2101 and S2102 are added to FIG. 58.

Radio communication apparatus 100 updates the "LoRa node number information" field (S2101) after the processing of S1905. For example, radio communication apparatus 100 performs update processing by adding one to the value in the "LoRa node number information" field of the received notification information.

Radio communication apparatus 100 updates the "Wi-SUN node number information" field (S2102) after the processing of S1704. For example, radio communication apparatus 100 performs update processing by adding one to the value in the "Wi-SUN node number information" field of the received notification information.

In Variation 14 described above, notification of a result after classification of the interference detected by a GW and relay nodes is provided. In the uncontrollable Wi-SUN interference information of notification information, notification of a result for each node is provided, and notification of a mean among nodes is provided in the controllable Wi-SUN interference information. Accordingly, in a band used by various radio systems, notification of an interference detection result can be appropriately provided by each apparatus in a network where a relay node is provided. Further, in this notification, for controllable Wi-SUN interference information, notification of a mean among nodes is provided. Thus, the information amount of notification information can be reduced. Further, in this notification, notification of the number of relay nodes supporting the Wi-SUN mode and the number of relay nodes supporting the LoRa mode can be provided, so that notification of an interference detection result can be appropriately provided, and the network can be optimized even in a case where the number of relay nodes changes.

The number of relay nodes is sometimes increased due to a drastic increase in data traffic in a situation where the number of users using a network increases (e.g., hours) in facilities where a large number of users using a network visit (e.g., stadiums, theme parks, shopping malls) and/or in locations where large events are held. Further, the number of relay nodes is sometimes reduced due to a drastic decrease in traffic in a situation where the number of users using the network decreases (e.g., hours), for example, outside of business hours of the facilities and/or after the end of events. As described above, there are cases where the number of relay nodes changes from time to time and moment to moment. Even in these cases, the network can be optimized by providing notification of the number of relay nodes.

Further, notification of the number of Wi-SUN relay nodes included in the Wi-SUN node number information" field as well as the number of LoRa relay nodes included in the LoRa node number information" field need not be provided every time notification of interference information is provided. For example, notification of the number of Wi-SUN relay nodes need not be provided when the number of Wi-SUN relay nodes is the same as the last time (e.g., time at which notification of interference information is made right before this time) or an increase or decrease in the number of Wi-SUN relay nodes is within a predetermined range compared with the last time, even when the time to provide notification of interference information comes. For this reason, how often notification of the number of Wi-SUN relay nodes is provided may be set fewer than how often notification of interference information is provided. Note that, notification of the information on the frequency of providing notification of the number of Wi-SUN relay nodes may be provided by a higher layer message, for example. Further, as to the number of LoRa relay nodes, as with the number of Wi-SUN relay nodes, how often notification of the number of LoRa relay nodes is provided may be set fewer than how often notification of interference information is provided. Note that, notification of the information on the frequency of providing notification of the number of LoRa relay nodes may be provided by a higher layer message, for example. Further, the frequency of providing notification of the number of Wi-SUN relay nodes may be set independently from the frequency of providing notification of the number of LoRa relay nodes.

In this embodiment, the format of notification information has been described with the "notification information on channel #1" field as an exemplary field. A field of notification information on a channel different from channel #1 may include the same fields as the "notification information on channel #1" field. Alternatively, a field may be set independently for each channel.

The variations of this embodiment described above may be used in combination as appropriate.

For example, any fields of the variations described above may be independently set in accordance with channels. In this case, for example, a "notification information on channel #$C_1$ ("$C_1$" is an integer not less than 1 and not greater than n) field and a "notification information on channel #$C_2$ ("$C_2$" is an integer not less than 1 and not greater than n and different from $C_1$)" field may include different fields from each other.

As an example, when channel #$C_1$ is a Wi-SUN dedicated channel, then the "notification information on channel #$C_1$" field may not include a "controllable LoRa interference information" field and uncontrollable LoRa interference information" field. Further, when channel #$C_2$ is a LoRa dedicated channel, then the "notification information on channel #$C_2$" field may not include a "controllable Wi-SUN interference information" field and uncontrollable Wi-SUN interference information" field.

In the LoRa mode, spreading processing is performed using a parameter called Spreading Factor (SF), which is a parameter related to the spreading rate. In this instance, the controllable LoRa interference information and/or uncontrollable LoRa interference information may include information on interference classified for each SF. For example, in the case of the relay network illustrated in FIG. 41, notification of the information on interference classified for each SF may be provided by a GW and not provided by a Wi-SUN relay node.

In the embodiment and variations described above, a description has been given of a notification method for information on classification of interference and classified interference in an LPWA system. The present disclosure is not limited thereto. When interference monitoring is performed in a radio system different from the LPWA system, the present disclosure may be applied. Further, the present disclosure may be applied even in a case where both of an LPWA system and a radio system different from the LPWA system are present.

In the embodiment and variations described above, a description has been given with the LoRa mode and the Wi-SUN mode as exemplary communication modes. The present disclosure is not limited thereto. The LoRa mode may be replaced with any communication mode that performs spectrum spreading, such as a Code Division Multiple Access (CDMA) communication mode. The Wi-SUN mode may be replaced with any communication mode that does not perform spectrum spreading, such as an Orthogonal Frequency Division Multiplexing (OFDM) communication mode. Further, the present disclosure may be applied in a case where any one of a communication mode that perform spectrum spreading and a communication mode that does not perform spectrum spreading is used.

Note that, the term, such as "part" or "portion" or the term ending with a suffix, such as "-er" "-or" or "-ar" in the above-described embodiment may be replaced with another term, such as "circuit (circuitry)," "device," "unit," or "module."

The term "channel" in the above embodiment may be replaced with another term, such as "frequency," "frequency channel," "band," "carrier," "subcarrier," or "(frequency) resources."

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. Further, an FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality or a transportation system (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a radio base station backhaul line a wireless LAN system, a satellite system, and/or the like, and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Various embodiments have been described with reference to the drawings hereinabove. Obviously, the present disclosure is not limited to these examples. Obviously, a person skilled in the art would arrive at variations and modification examples within a scope described in claims, and it is understood that these variations and modifications are within the technical scope of the present disclosure. Further, each component of the above-mentioned embodiments may be combined optionally without departing from the spirit of the disclosure.

Specific examples of the present disclosure have been described thus far, but these examples are only exemplary, and are not to limit the claims. Techniques recited in the claims include, for example, variations and/or modifications of the specific examples exemplified above.

The disclosures of Japanese Patent Application No. 2019-152013, filed on Aug. 22, 2019 and Japanese Patent Application No. 2019-204190, filed on Nov. 11, 2019, each including the specification, drawings, and abstract, are incorporated herein by reference in their entirety.

INDUSTRIAL APPLICABILITY

The present disclosure is suitable for radio communication systems.

REFERENCE SIGNS LIST

100 Radio communication apparatus
101 Receiver

102 Demodulator/decoder
103 Interference classifier
104 Controllable interference processor
105 Radio interference processor
106 Ambient noise processor
107 Notification information generator
108 Notification information controller
109 Communication controller
110 Control signal generator
111 Encoder/modulator
112 Transmitter

The invention claimed is:

1. A radio communication apparatus that supports a first radio system and that belongs to a first network in which a plurality of radio communication apparatuses perform relay by radio connection, the radio communication apparatus comprising:
 a receiver, which in operation, receives first notification information from at least one of the plurality of radio communication apparatuses on a downstream side of the radio communication apparatus in the first network;
 an interference classifier, which in operation, classifies interference into first interference and second interference different from the first interference, the interference being detected in each of a plurality of channels, the first interference being from a first radio apparatus that supports the first radio system and that belongs to the first network;
 a controller, which in operation, generates second notification information based on a first classification result of interference included in the first notification information and on a second classification result of interference in the interference classifier, the second notification information including at least one of information on the first interference and/or information on the second interference; and
 a transmitter, which in operation, transmits the second notification information to at least one of the plurality of radio communication apparatuses on an upstream side of the radio communication apparatus in the first network.

2. The radio communication apparatus according to claim 1, wherein
 the information on the first interference included in the second notification information indicates a statistical amount calculated based on information on the first interference included in the first notification information in the at least one of the plurality of radio communication apparatuses on the downstream side, and on information on the first interference based on the second classification result, and
 the information on the second interference included in the second notification information indicates, in a distinguished manner, information on the second interference included in the first notification information, and information on the second interference based on the second classification result.

3. The radio communication apparatus according to claim 2, wherein the information on the first interference included in the second notification information indicates a statistical amount of the first interference in at least two of the plurality of radio communication apparatuses.

4. The radio communication apparatus according to claim 2, wherein the statistical amount is at least one of a mean value, a maximum value, a minimum value, and/or a median value of interference amounts of the first interference respectively in the at least two of the plurality of radio communication apparatuses.

5. The radio communication apparatus according to claim 1, wherein the information on the second interference included in the second notification information indicates an N interference amount(s) (where "N" is an integer not less than 1) in an ascending order among interference amounts indicated by at least one of the second interference in at least two of the plurality of radio communication apparatuses.

6. The radio communication apparatus according to claim 1, wherein the information on the second interference included in the second notification information indicates a number of interference amounts each being less than a threshold among interference amounts indicated by at least one of the second interference in at least two of the plurality of radio communication apparatuses.

7. The radio communication apparatus according to claim 6, wherein the second notification information includes a number of the radio communication apparatus and at least one of the plurality of radio communication apparatuses on the downstream side of the radio communication apparatus.

8. The radio communication apparatus according to claim 1, wherein the second notification information includes information representing an interference amount of uncontrollable interference detected in a specific one of the plurality of radio communication apparatuses.

9. The radio communication apparatus according to claim 1, wherein the second notification information indicates a classification result of interference independently of each of the plurality of channels.

10. The radio communication apparatus according to claim 1, wherein the information on the first interference included in the second notification information is distinguished for each communication mode corresponding to a signal caused by the first interference.

11. The radio communication apparatus according to claim 1, wherein
 the second interference is classified into third interference from the first radio apparatus that supports the first radio system and that belongs to the first network, and fourth interference from a radio apparatus that supports a second radio system different from the first radio system,
 the fourth interference is classified in accordance with a priority, and
 the information on the second interference included in the second notification information includes information on the third interference and information on relatively high priority interference in the fourth interference.

12. The radio communication apparatus according to claim 11, wherein the information on the second interference indicates a number of pieces in which a mean of the third interference and the relatively high priority interference in the fourth interference is less than a threshold.

13. The radio communication apparatus according to claim 1, wherein a frequency of providing notification of information on the first interference and a frequency of providing notification of information on the second interference are set independently from each other.

14. The radio communication apparatus according to claim 1, wherein the information on the second interference included in the second notification information is distinguished for each communication mode corresponding to a signal caused by the second interference.

15. A notification method in a radio communication apparatus that supports a first radio system and that belongs to a first network in which a plurality of radio communication apparatuses perform relay by radio connection, the notification method comprising:
- receiving first notification information from at least one of the plurality of radio communication apparatuses on a downstream side of the radio communication apparatus in the first network;
- classifying interference into first interference and second interference different from the first interference, the interference being detected in each of a plurality of channels, the first interference being from a first radio apparatus that supports the first radio system and that belongs to the first network;
- generating second notification information based on a first classification result of interference included in the first notification information and on a second classification result of interference in an interference classifier, the second notification information including at least one of information on the first interference and/or information on the second interference; and
- transmitting the second notification information to at least one of the plurality of radio communication apparatuses on an upstream side of the radio communication apparatus in the first network.

* * * * *